(12) United States Patent
Dupont et al.

(10) Patent No.: US 12,104,484 B2
(45) Date of Patent: Oct. 1, 2024

(54) WELL LOG CORRELATION AND PROPAGATION SYSTEM

(71) Applicant: Schlumberger Technology Corporation, Sugar Land, TX (US)

(72) Inventors: Emilien Dupont, Menlo Park, CA (US); Sergey Doronichev, Menlo Park, CA (US); Velizar Vesselinov, Katy, TX (US); Valerian Guillot, Cambridge (GB); Carlos Boneti, Saratoga, CA (US); Jose Celaya Galvan, Sunnyvale, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/516,294

(22) Filed: Nov. 21, 2023

(65) Prior Publication Data

US 2024/0102380 A1 Mar. 28, 2024

Related U.S. Application Data

(63) Continuation of application No. 17/048,411, filed as application No. PCT/US2019/028037 on Apr. 18, 2019, now Pat. No. 11,828,167.

(60) Provisional application No. 62/660,651, filed on Apr. 20, 2018.

(51) Int. Cl.
*G01V 1/50* (2006.01)
*E21B 41/00* (2006.01)
*E21B 47/04* (2012.01)

(52) U.S. Cl.
CPC .............. *E21B 47/04* (2013.01); *E21B 41/00* (2013.01); *G01V 1/50* (2013.01); *G01V 2200/16* (2013.01); *G01V 2210/6169* (2013.01)

(58) Field of Classification Search
CPC ...... E21B 47/04; G01V 1/50; G01V 2200/16; G01V 2210/6169
See application file for complete search history.

(56) References Cited

U.S. PATENT DOCUMENTS

2015/0088424 A1\* 3/2015 Burlakov ................. G01V 1/40
702/6

OTHER PUBLICATIONS

Lineman DJ, Mendelson JD, Toksoz MN. Well to well log correlation using knowledge-based systems and dynamic depth warping. InSPWLA Annual Logging Symposium Jun. 29, 1987 (pp. SPWLA-1987). SPWLA. (Year: 1987).\*

(Continued)

*Primary Examiner* — Chuen-Meei Gan
(74) *Attorney, Agent, or Firm* — Jeffrey D. Frantz

(57) ABSTRACT

A system can include a processor; memory operatively coupled to the processor; and processor-executable instructions stored in the memory to instruct the system to: receive a marker on a well log for a well in a geographic region; and iteratively propagate the marker automatically to a plurality of well logs for other wells in the geographic region.

19 Claims, 43 Drawing Sheets

(56) References Cited

OTHER PUBLICATIONS

Salvador S, Chan P. FastDTW: Toward accurate dynamic time warping in linear time and space. InKDD workshop on mining temporal and sequential data Aug. 22, 2004 (vol. 6, pp. 70-80). (Year: 2004).*

Yu Y, Kelley C, Mardanova I. Automatic horizon picking in 3D seismic data using optical filters and minimum spanning tree (patent pending). InSEG Technical Program Expanded Abstracts 2011 Jan. 2011 (pp. 965-969). Society of Exploration Geophysicists. (Year: 2011).*

* cited by examiner

1010

1020

1030

Confidence Score = $(1+a*warp\_dist)^{-1}$
(e.g., range 0 to 1)

WELL LOG CORRELATION AND PROPAGATION SYSTEM

RELATED APPLICATIONS

This application is a continuation of U.S. Non-Provisional application Ser. No. 17/048,411, filed Oct. 16, 2020, which is a U.S. National Stage Application of International Application No. PCT/US2019/028037, filed Apr. 18, 2019, which claims priority to and the benefit of U.S. Provisional Application No. 62/660,651, filed Apr. 20, 2018, each of which is incorporated by reference herein its entirety for all purposes.

BACKGROUND

Interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.).

SUMMARY

A system can include a processor; memory operatively coupled to the processor; and processor-executable instructions stored in the memory to instruct the system to: receive a marker on a well log for a well in a geographic region; and iteratively propagate the marker automatically to a plurality of well logs for other wells in the geographic region. A method can include receiving a marker on a well log for a well in a geographic region; and iteratively propagating the marker automatically to a plurality of well logs for other wells in the geographic region. One or more computer-readable storage media can include computer-executable instructions executable to instruct a computing system to: receive a marker on a well log for a well in a geographic region; and iteratively propagate the marker automatically to a plurality of well logs for other wells in the geographic region. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
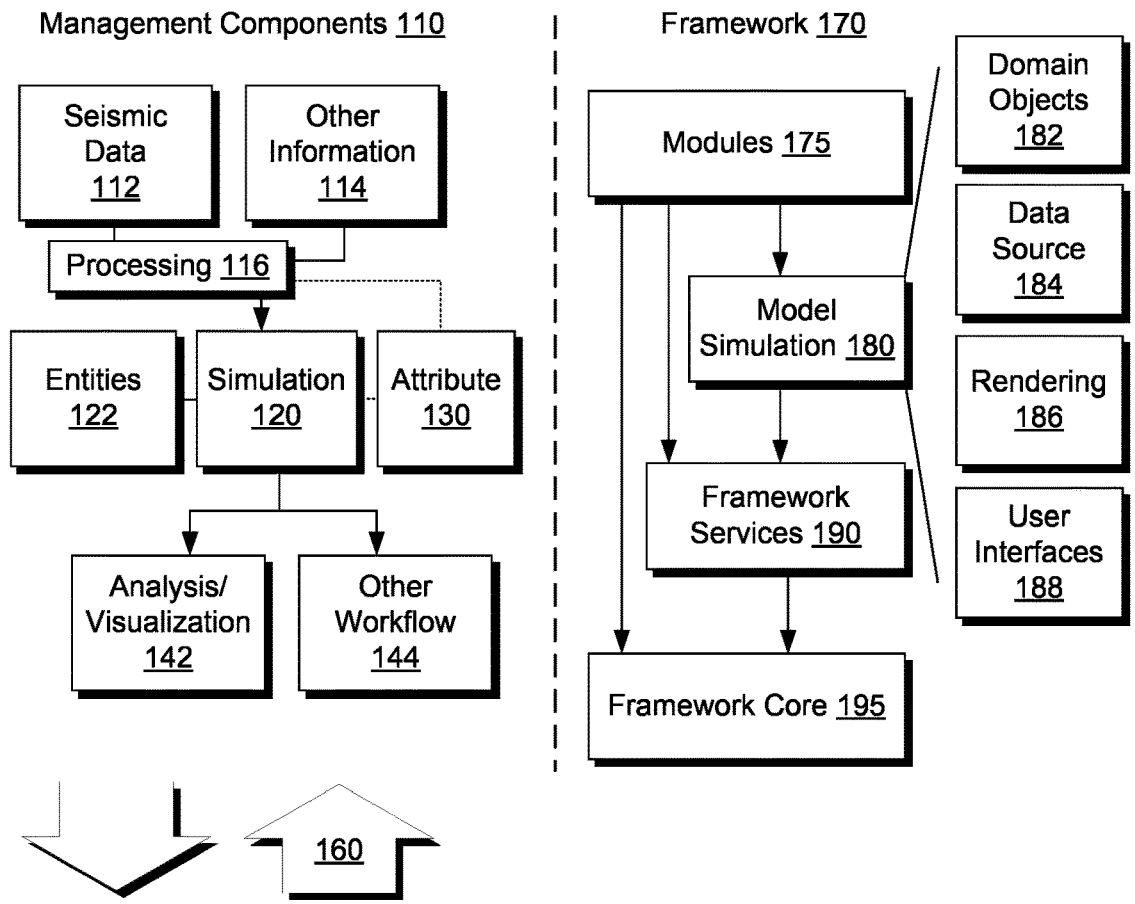
FIG. 1 illustrates an example system that includes various components for modeling a geologic environment and various equipment associated with the geologic environment.
Figure 1:
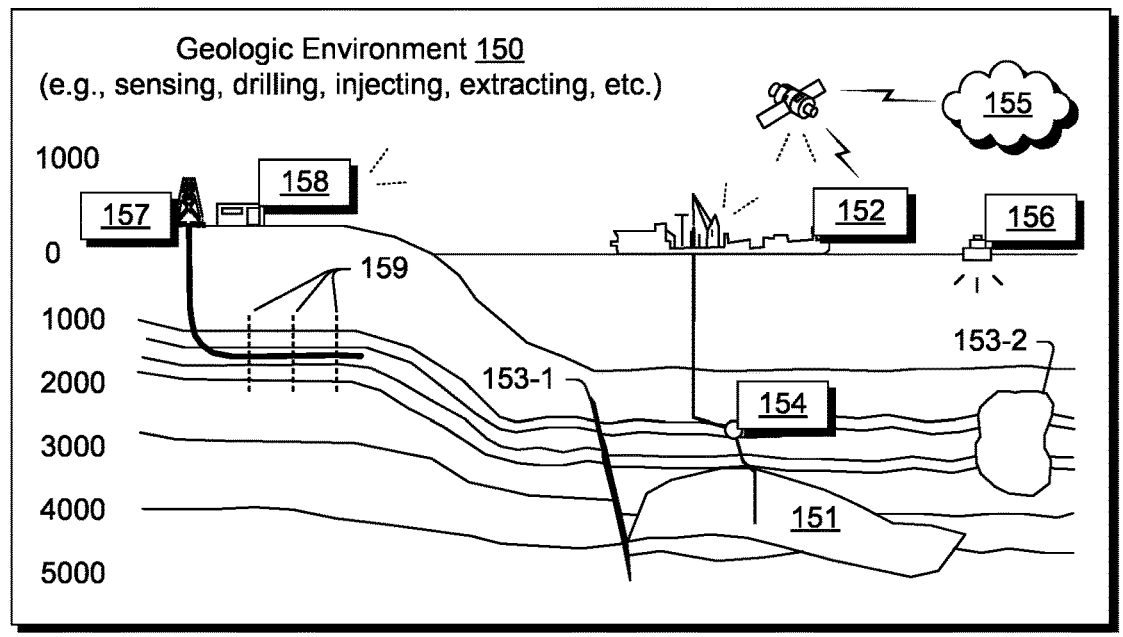

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. An example of an object-based framework is the MICROSOFT .NET framework (Redmond, Washington), which provides a set of extensible object classes. In the .NET framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE reservoir simulator (Schlumberger Limited, Houston Texas), the INTERSECT reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as steam-assisted gravity drainage (SAGD), etc.).

In an example embodiment, the management components 110 may include features of a framework such as the PETREL seismic to simulation software framework (Schlumberger Limited, Houston, Texas). The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a framework environment marketed as the OCEAN framework environment (Schlumberger Limited, Houston, Texas) allows for integration of add-ons (or plug-ins) into a PETREL framework workflow. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the OCEAN framework where the model simulation layer 180 is the PETREL model-centric software package that hosts OCEAN framework applications. In an example embodiment, the PETREL software may be considered a data-driven application. The PETREL software can include a framework for model building and visualization.

As an example, seismic data may be processed using a framework such as the OMEGA framework (Schlumberger Limited, Houston, TX). The OMEGA framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA framework.

A framework for processing data may include features for 2D line and 3D seismic surveys. Modules for processing seismic data may include features for prestack seismic interpretation (PSI), optionally pluggable into a framework such as the OCEAN framework. A workflow may be specified to include processing via one or more frameworks, plug-ins, add-ons, etc. A workflow may include quantitative interpretation, which may include performing pre- and post-stack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL software, for example, that operates on seismic data, seismic attribute(s), etc. As an example, a workflow may be a process implementable in the OCEAN framework. As an example, a workflow may include one or more worksteps that access a module such as a plug-in (e.g., external executable code, etc.).

As an example, a framework may be implemented within or in a manner operatively coupled to the DELFI cognitive exploration and production (E&P) environment (Schlumberger Limited, Houston, Texas), which is a secure, cognitive, cloud-based collaborative environment that integrates data and workflows with digital technologies, such as artificial intelligence and machine learning. As an example, such an environment can provide for operations that involve one or more computational frameworks. For example, various types of computational frameworks may be utilized within an environment such as a drilling plan framework, a seismic-to-simulation framework (e.g., PETREL framework, Schlumberger Limited, Houston, Texas), a measurements framework (e.g., TECHLOG framework, Schlumberger Limited, Houston, Texas), a mechanical earth modeling (MEM) framework (PETROMOD framework, Schlumberger Limited, Houston, Texas), an exploration risk, resource, and value assessment framework (e.g., GEOX, Schlumberger Limited, Houston, Texas), a reservoir simulation framework (INTERSECT, Schlumberger Limited, Houston, Texas), a surface facilities framework (e.g., PIPESIM, Schlumberger Limited, Houston, Texas). As an example, one or more methods may be implemented at least in part via a framework (e.g., a computational framework) and/or an environment (e.g., a computational environment).

As an example, the system 100 may be implemented for performing one or more workflows associated with sequence stratigraphy. For example, basin-filling sedimentary deposits can be organized as sequences and can be interpreted in a depositional framework of eustasy, sedimentation and subsidence through time to correlate strata and predict the stratigraphy of relatively unknown areas. Sequences may tend to show cyclicity of changes in relative sea level and widespread unconformities, processes of sedimentation and sources of sediments, climate and tectonic activity over time. Sequence stratigraphic analyses can promote a more thorough understanding of an evolution of a basin and, for example, allow for interpretations of potential source rocks and reservoir rocks in frontier areas (e.g., having seismic data but little well data) and in more mature hydrocarbon provinces. Prediction of reservoir continuity can be facilitated via sequence stratigraphy, particularly in mature hydrocarbon provinces.

A framework (e.g., TECHLOG, PETREL, etc.) can provide for performing one or more types of well correlation workflows, which can include connection of points from well to well, for example, where data indicate that the points (e.g., locations) are likely to have been deposited at a common chronostratigraphic time and/or possess similar and/or related characteristics. A framework can include well correlation features that can display logs, core images, seismic data, grid data, and completions and simulation results, which may be played through time. As an example, such a framework may be utilized to geosteer horizontal and highly deviated wells with one or more logging while drilling (LWD) tools, optionally in real time. As an example, deviated wells may be displayed overlain on seismic or 3D grid properties.

As an example, the PETREL framework can allow for cross sections that can be interactively created and shared across one or more projects and, for example, be directly edited in a 2D or map window (e.g., via one or more graphical user interfaces). As an example, a GUI tool can provide for picking features (e.g., generating a marker that is a point of interest at a certain depth on a log), estimating logs by trained neural networks, and performing interactive log conditioning that can facilitate robust stratigraphic interpretation. Computational resources can allow the PETREL framework to handle advanced visualization, for example, for thousands of wells simultaneously.

Various features of the PETREL framework provide for interpretation of discrete properties interactively; automatically (or manually) picking and editing well tops on a cross section and visualization of effects directly in 3D and vice versa; editing existing logs and/or generating new ones from a number of curves by using a well log calculator, log editor, or interactive log conditioning toolbar; generating ghost curves for multiple logs simultaneously, for example, with stretch and squeeze tools and automatic drop of markers; displaying logs, core images, point data, image interpretations (e.g., rose diagrams and tadpoles) from the Schlumberger FMI fullbore formation microimager, FMI-HD high-definition formation microimager, QUANTA GEO photorealistic reservoir geology service, checkshots, and synthetic seismograms; interpreting raster logs with high resolution; creating backdrop seismic data, generic surfaces, 3D grid geometry, 3D grid properties with optional transparency, completions, and simulation results with an associated dynamic time player; visualizing and interpreting on deviated wells in a cross section; and geosteering horizontal and/or highly deviated wells, optionally in real time, for example, with multiple measurements and borehole images being rendered to one or more displays (e.g., via one or more GUIs).

As an example, information acquired by a tool (e.g., a borehole tool, a downhole tool, etc.) may be analyzed using a framework such as the TECHLOG framework. The TECHLOG framework includes: core system features; geology features; geomechanics features; geophysics features; petrophysics features; production features; reservoir engineering features; and shale features.

Data-based interpretation may aim to identify and/or classify one or more subsurface boundaries based at least in part on one or more parameters, which can include one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As to seismology, sensor data concerning P-waves and/or S-waves may be utilized to characterize a subsurface region. A P-wave is an elastic body wave or sound wave in which particles oscillate in the direction the wave propagates. An S-wave is an elastic body wave in which particles oscillate perpendicular to the direction in which the wave propagates. As an example, P-waves incident on an interface at other than normal incidence can produce reflected and transmitted S-waves, in that case known as converted waves.

As an example, a portion or portions of a formation or formations of a basin or basins may exhibit anisotropy. As examples of parameters that can characterize anisotropy of media (e.g., seismic anisotropy, etc.), consider the Thomsen parameters $\varepsilon$, $\delta$ and $\gamma$. The Thomsen parameter $\delta$ can characterize anisotropy of a near-vertical P-wave; as to the Thomsen parameter $\varepsilon$, it can characterize P-wave anisotropy; and, as to the Thomsen parameter $\gamma$, it can characterize S-wave anisotropy.

As an example, a method can include inverting, for example, from data to a model, which may be a structural model of a geologic region (e.g., a portion of a basin, etc.). An inversion process can be performed utilizing various types of information, particularly acquired data from one or more sensors where the inversion process aims to generate a model that exhibits at least some consistency with the information. An inversion process can include solving an inverse problem, which may be formulated via various equations and solved using computational resources (e.g., one or more processors, memory, etc.). In seismology, surface seismic data, vertical seismic profiles and well log data can be used to perform inversion, the result of which can be a model of Earth layers and their thickness, density and P- and S-wave velocities. Inversion can benefit from known information and/or behaviors. As to data quality, inversion can benefit from a high signal-to-noise ratio and a large bandwidth.

A well log can be a record (e.g., a recording) of well log signals and/or signal-based output. A well log can be a record of results of electronic measurements of physical quantities acquired in a continuum fashion (e.g., time series and/or depth series), which may be at one or more different well depths.

As an example, an inversion technique may be applied to generate a model that may include one or more parameters such as one or more of the Thomsen parameters. For example, one or more types of data may be received and used in solving an inverse problem that outputs a model (e.g., a reflectivity model, an impedance model, a fluid flow model, etc.). As an example, an inversion process may be a joint inversion where, for example, various types of data may be utilized to generate a model.

As an example, seismic data may be processed in a technique called "depth imaging" to form an image (e.g., a depth image) of reflection amplitudes in a depth domain for a particular target structure (e.g., a geologic subsurface region of interest).

As an example, seismic data may be processed to obtain an elastic model pertaining to elastic properties of a geologic subsurface region. For example, consider elastic properties such as density, compressional (P) impedance, compression velocity ($v_p$)-to-shear velocity ($v_s$) ratio, anisotropy, etc. As an example, an elastic model can provide various insights as to a surveyed region's lithology, reservoir quality, fluids, etc.

As an example, a computational framework can include features that facilitate interpretation of subsurface well logs by automatically and/or semi-automatically correlating points from one log to another. For example, given a log that has been interpreted by a human (e.g., in the sense of having identified different points of interest in the log), a framework may automatically interpret a set of neighboring logs.

As mentioned, well log information may be processed using one or more frameworks (e.g., consider the PETREL framework, the TECHLOG framework, etc.). As mentioned, the PETREL framework may automatically (or manually) provide for picking and editing well tops on a cross section. Such an approach may be more robust for relatively flat formations when compared to formations that can vary (e.g., across a basin, etc.). For example, a framework suited for relatively flat formations may generate results that are uncertain for formations that include one or more portions that are not relatively flat. Lateral geologic variations can confound propagation of points (e.g., picked markers) from one log to another log. As an example, a marker can be generated via picking such that a marker is a picked marker. For example, an interpretation process can include rendering a log to a display and picking a feature of the log where picking generates a marker that is a point of interest at a certain depth on the log (e.g., or a range of depths on the log, etc.).

As an example, a computational framework can provide for output of uncertainty metrics associated with log correlation and/or log propagation (e.g., well to well) where such a framework may enhance robustness for formations that can include one or more types of lateral geologic variations. As an example, such a computational framework can include a propagation mechanism that implements one or more minimum spanning trees (e.g., or optionally another graph-based propagation or traversal structure), which may be initiated by a single seed or multiple seeds. As an example, a computational framework may propagate in a neighbor to neighbor approach and/or in a more dispersed approach (e.g., with or without proximity constraints, etc.). As an example, in a multiple seed approach, two propagation mechanisms may "meet" where a boundary may be defined, which may be, for example, a boundary between geologically different regions (e.g., as to depth, lithology, etc.).

As an example, a seed can be a seed in depth (e.g., measured depth, total depth, etc., depending on circumstances, geometry, etc.). As an example, a single log of a single well may be a source of one or more seeds that can propagate in a manner that correlates the single log to one or more logs of one or more other wells. As an example, a method can include log correlation and log propagation where results thereof can facilitate sequence stratigraphy and/or one or more other processes.

As an example, a computational framework can include features that, given a set of well logs in a field, minimize the number of picks (interpretations) a human (or humans) make manually. Such an approach may reduce the number of picks, at least in part by iteratively and automatically correlating one or more human picked logs to at least a portion of the other logs.

As an example, a computational framework may aim to reduce the number of human picks by a factor of 10 or more (e.g., where a human performs less than approximately 10 percent of the work). As an example, such a computational framework may automatically identify (e.g., highlight, etc.) one or more logs that can benefit from human intervention (e.g., quality control), which may accelerate a correlation and propagation process. As an example, such a computational framework may automatically orders logs for improved visualization. As an example, such a computational framework may assist one or more humans by automatically performing tedious correlations and pointing the one or more humans to "interesting" areas (e.g., consider faults, pinch outs, etc.).

As an example, a fault can be a break or planar surface in brittle rock across which there is observable displacement. For example, in a formation that has been faulted, various layers can be displaced. In such an example, where one portion is shifted upward on one side of the fault, a well log from a well in that portion may include picked markers (e.g., points) that are at a different depth from the surface than corresponding markers (e.g., points) of a well log from a well that is to the other side of the fault. Such well logs may present particular issues as to correlation and/or propagation.

As to a pinch out (e.g., or pinch-out), it can be a type of stratigraphic trap. For example, consider termination by thinning or tapering out ("pinching out") of a reservoir against a nonporous sealing rock that creates a favorable geometry to trap hydrocarbons, particularly if the adjacent sealing rock is a source rock such as a shale. In such an example, as a trap may exist for collection of hydrocarbons, a pinch out can be of particular interest. As an example, a pinch out can be a reduction in bed thickness resulting from onlapping stratigraphic sequences.

As an example, a method can include selecting a set of logs to correlate (e.g., a field or basin that includes hundreds of wells or thousands of wells or more) where an computational algorithm can be applied to a fraction of wells (e.g., a relatively small fraction such as 20 percent or less); defining picks or markers on a chosen input log (e.g., at a depth of 1502 m on a log for well ABC a marker XYZ may be picked/set manually by a human); computing a minimum spanning tree (MST) on a graph defined by locations of the well logs; propagating the input log marker to neighboring markers in the graph using a FastDTW (e.g., an approach to dynamic time warping (DTW)) that can take into account geological structure trends; once the markers have been found in the neighbors, propagating to the neighbor's neighbors (as available); iterating until a desired portion of the graph has been processed and/or reached (e.g., consider a breadth first search); after an input pick has been propagated to a desired portion of the graph, calculating confidence score on the wells of the desired portion of the graph (e.g., as included in the MST); pointing a human (or humans) to pick/assess those with lowest confidence (e.g., ask to accept or revise predicted pick); repeating with one or more new picks such that for each well log there can be two predictions; picking the predictions of each well log with the highest confidence; and iterating until one or more criteria are satisfied (e.g., error, number of iterations, confidence, etc.). As to DTW, it can be utilized for measuring similarity between two temporal sequences. As to the FastDTW approach, it can be utilized in a manner that demands lesser computational resources or that may generate results in lesser time than a basic DTW approach.

Figure 2:
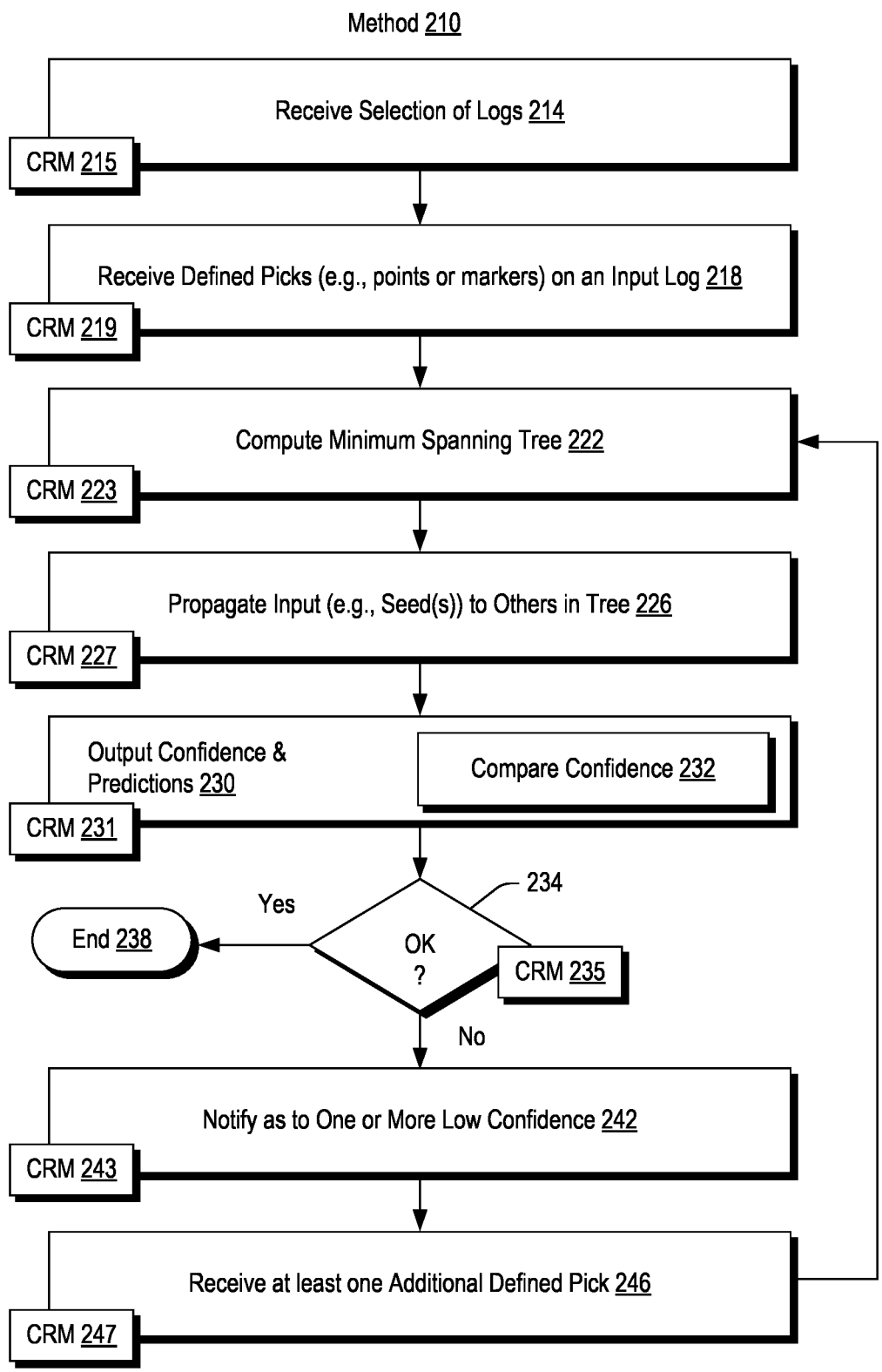
FIG. 2 illustrates an example of an interpretation method.

FIG. 2 shows an example of a method 210 that includes a reception block 214 for receiving a selection well logs of a plurality of wells (e.g., wellbores), a reception block 218 for receiving defined picks on an input well log (e.g., one of the selected well logs), a computation block 222 for computing a minimum spanning tree for at least a portion of the well logs, a propagation block 226 for propagating the input to others in the tree, an output block 230 for outputting confidence and predictions and for subsequent iterations optionally comparing confidences per a comparison block 232, a decision block 234 for deciding whether the confidences are acceptable (e.g., or that one or more criteria are satisfied), a termination block 238 for terminating the method 210 and outputting one or more results thereof (e.g., for input to one or more workflows, etc.) upon a "yes" decision at the decision block 234, a notification block 242 for issuing a notification or notifications as to one or more low confidence well logs (e.g., as to correlation of a pick or picks) upon a "no" decision at the decision block 234, and a reception block 246 for receiving at least one additional defined pick (e.g., a prior defined pick that was not utilized, a newly defined pick, etc.), which may be utilized in an iteration loop until the decision block 234 decides that confidence (e.g., or one or more other criteria) have been satisfied.

The method 210 is shown in FIG. 2 in association with various computer-readable media (CRM) blocks 215, 219, 223, 227, 231, 235, 243 and 247. Such blocks generally include instructions suitable for execution by one or more processors (or cores) to instruct a computing device or system to perform one or more actions. While various blocks are shown, a single medium may be configured with instructions to allow for, at least in part, performance of various actions of the method 210. As an example, a CRM block can be a computer-readable storage medium that is non-transitory, not a carrier wave and not a signal. As an example, such blocks can include instructions that can be stored in memory and can be executable by one or more of processors.

Figure 3:
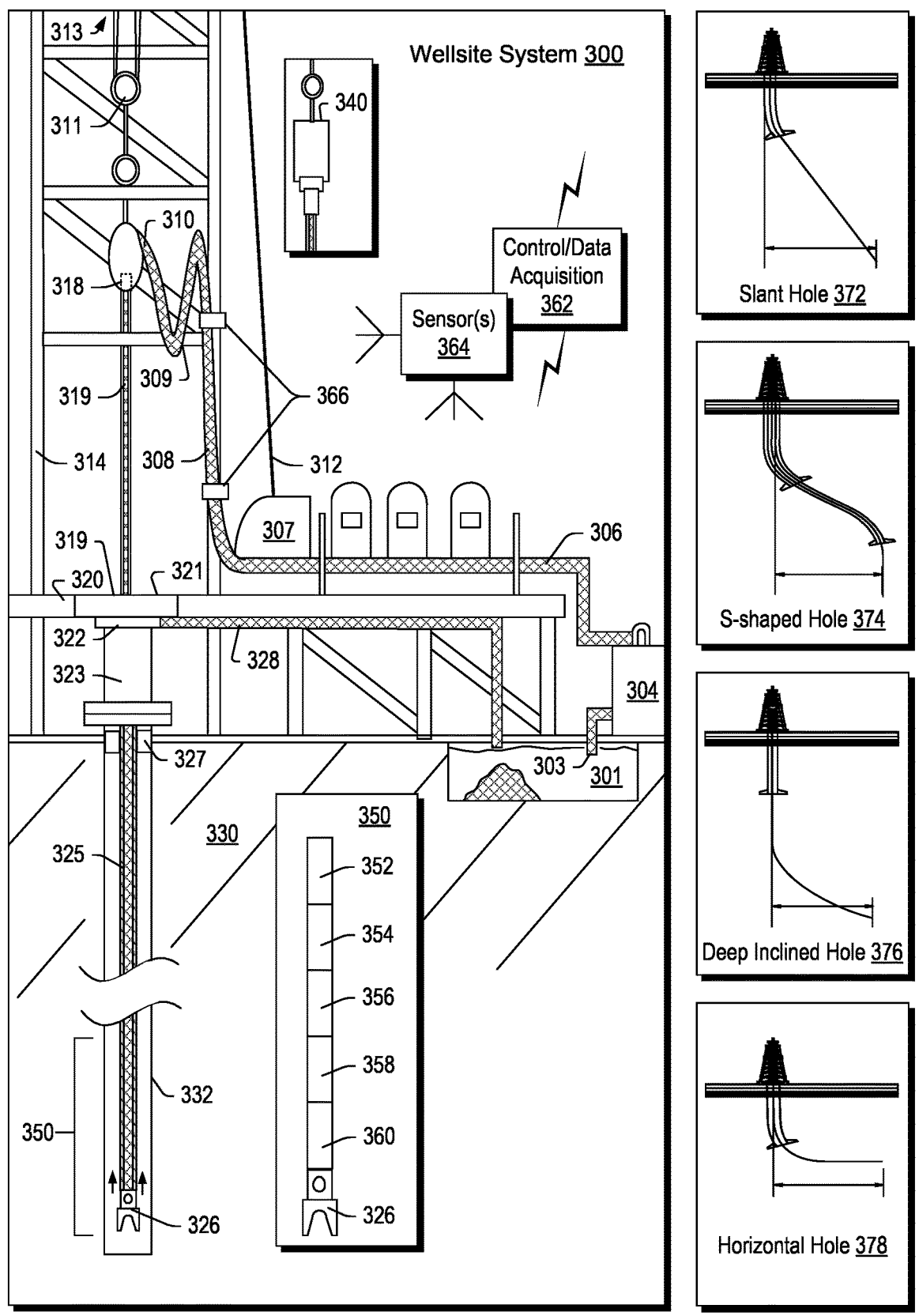
FIG. 3 illustrates examples of equipment including examples of downhole tools and examples of bores.
Figure 4:
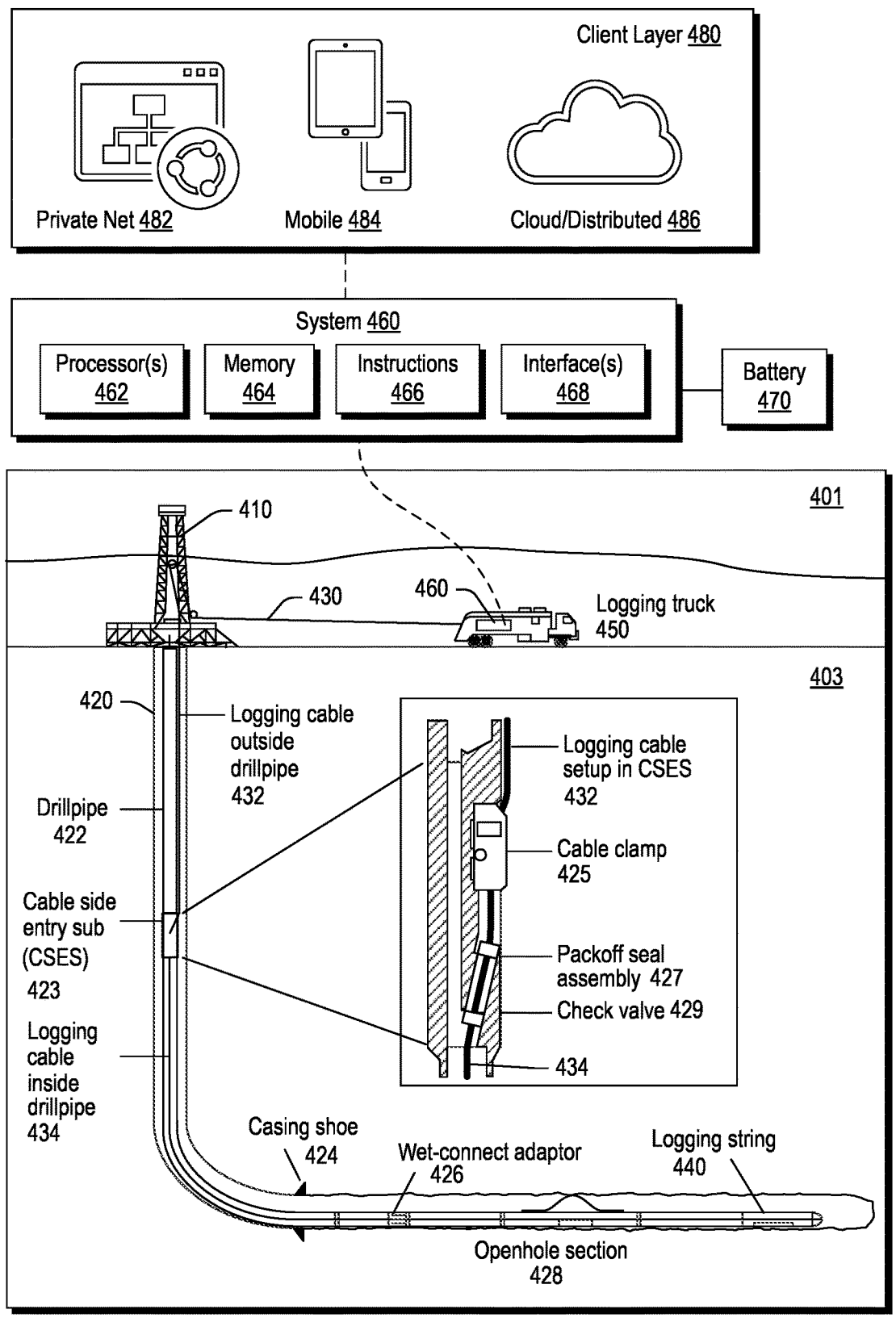
FIG. 4 illustrates examples of equipment including examples of downhole tools.

FIGS. 3 and 4 illustrate various examples of equipment that may be utilized in one or more workflows that include, at least in part, acquiring well log data. As an example, a method may be implemented during use of such equipment, using data acquired by such equipment, etc.

FIG. 3 shows an example of a wellsite system 300 (e.g., at a wellsite that may be onshore or offshore). As shown, the wellsite system 300 can include a mud tank 301 for holding mud and other material (e.g., where mud can be a drilling fluid), a suction line 303 that serves as an inlet to a mud pump 304 for pumping mud from the mud tank 301 such that mud flows to a vibrating hose 306, a drawworks 307 for winching drill line or drill lines 312, a standpipe 308 that receives mud from the vibrating hose 306, a kelly hose 309 that receives mud from the standpipe 308, a gooseneck or goosenecks 310, a traveling block 311, a crown block 313 for carrying the traveling block 311 via the drill line or drill lines 312, a derrick 314, a kelly 318 or a top drive 340, a kelly drive bushing 319, a rotary table 320, a drill floor 321, a bell nipple 322, one or more blowout preventers (BOPs) 323, a drillstring 325, a drill bit 326, a casing head 327 and a flow pipe 328 that carries mud and other material to, for example, the mud tank 301.

In the example system of FIG. 3, a borehole 332 is formed in subsurface formations 330 by rotary drilling; noting that various example embodiments may also use directional drilling.

As shown in the example of FIG. 3, the drillstring 325 is suspended within the borehole 332 and has a drillstring assembly 350 that includes the drill bit 326 at its lower end. As an example, the drillstring assembly 350 may be a bottom hole assembly (BHA).

The wellsite system 300 can provide for operation of the drillstring 325 and other operations. As shown, the wellsite system 300 includes the platform and the derrick 314 positioned over the borehole 332. As mentioned, the wellsite system 300 can include the rotary table 320 where the drillstring 325 pass through an opening in the rotary table 320.

As shown in the example of FIG. 3, the wellsite system 300 can include the kelly 318 and associated components, etc., or a top drive 340 and associated components. As to a kelly example, the kelly 318 may be a square or hexagonal metal/alloy bar with a hole drilled therein that serves as a mud flow path. The kelly 318 can be used to transmit rotary motion from the rotary table 320 via the kelly drive bushing 319 to the drillstring 325, while allowing the drillstring 325 to be lowered or raised during rotation. The kelly 318 can pass through the kelly drive bushing 319, which can be driven by the rotary table 320. As an example, the rotary table 320 can include a master bushing that operatively couples to the kelly drive bushing 319 such that rotation of the rotary table 320 can turn the kelly drive bushing 319 and hence the kelly 318. The kelly drive bushing 319 can include an inside profile matching an outside profile (e.g., square, hexagonal, etc.) of the kelly 318; however, with slightly larger dimensions so that the kelly 318 can freely move up and down inside the kelly drive bushing 319.

As to a top drive example, the top drive 340 can provide functions performed by a kelly and a rotary table. The top drive 340 can turn the drillstring 325. As an example, the top drive 340 can include one or more motors (e.g., electric and/or hydraulic) connected with appropriate gearing to a short section of pipe called a quill, that in turn may be screwed into a saver sub or the drillstring 325 itself. The top drive 340 can be suspended from the traveling block 311, so the rotary mechanism is free to travel up and down the derrick 314. As an example, a top drive 340 may allow for drilling to be performed with more joint stands than a kelly/rotary table approach.

In the example of FIG. 3, the mud tank 301 can hold mud, which can be one or more types of drilling fluids. As an example, a wellbore may be drilled to produce fluid, inject fluid or both (e.g., hydrocarbons, minerals, water, etc.).

In the example of FIG. 3, the drillstring 325 (e.g., including one or more downhole tools) may be composed of a series of pipes threadably connected together to form a long tube with the drill bit 326 at the lower end thereof. As the drillstring 325 is advanced into a wellbore for drilling, at some point in time prior to or coincident with drilling, the mud may be pumped by the pump 304 from the mud tank 301 (e.g., or other source) via the lines 306, 308 and 309 to a port of the kelly 318 or, for example, to a port of the top drive 340. The mud can then flow via a passage (e.g., or passages) in the drillstring 325 and out of ports located on the drill bit 326 (see, e.g., a directional arrow). As the mud exits the drillstring 325 via ports in the drill bit 326, it can then circulate upwardly through an annular region between an outer surface(s) of the drillstring 325 and surrounding wall(s) (e.g., open borehole, casing, etc.), as indicated by directional arrows. In such a manner, the mud lubricates the drill bit 326 and carries heat energy (e.g., frictional or other energy) and formation cuttings to the surface where the mud (e.g., and cuttings) may be returned to the mud tank 301, for example, for recirculation (e.g., with processing to remove cuttings, etc.).

The mud pumped by the pump 304 into the drillstring 325 may, after exiting the drillstring 325, form a mudcake that lines the wellbore which, among other functions, may reduce friction between the drillstring 325 and surrounding wall(s) (e.g., borehole, casing, etc.). A reduction in friction may facilitate advancing or retracting the drillstring 325. During a drilling operation, the entire drill string 325 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 326 of the drill string 325 at a bottom of a wellbore, pumping of the mud commences to lubricate the drill bit 326 for purposes of drilling to enlarge the wellbore. As mentioned, the mud can be pumped by the pump 304 into a passage of the drillstring 325 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 325) may be transmitted uphole to an uphole device, which may relay such information to other equipment for processing, control, etc.

As an example, telemetry equipment may operate via transmission of energy via the drillstring 325 itself. For example, consider a signal generator that imparts coded energy signals to the drillstring 325 and repeaters that may receive such energy and repeat it to further transmit the coded energy signals (e.g., information, etc.).

As an example, the drillstring 325 may be fitted with telemetry equipment 352 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 3, an uphole control and/or data acquisition system 362 may include circuitry to sense pressure pulses generated by telemetry equipment 352 and, for example, communicate sensed pressure pulses or information derived therefrom for process, control, etc.

The assembly 350 of the illustrated example includes a logging-while-drilling (LWD) module 354, a measuring-while-drilling (MWD) module 356, an optional module 358, a roto-steerable system and motor 360, and the drill bit 326.

The LWD module 354 may be housed in a suitable type of drill collar and can contain one or a plurality of selected types of logging tools. It will also be understood that more than one LWD and/or MWD module can be employed, for example, as represented by the MWD module 356 of the drillstring assembly 350. Where the position of an LWD module is mentioned, as an example, it may refer to a module at the position of the LWD module 354, the MWD module 356, etc. An LWD module can include capabilities for measuring, processing, and storing information, as well as for communicating with the surface equipment. In the illustrated example, the LWD module 354 may include a seismic measuring device.

The MWD module 356 may be housed in a suitable type of drill collar and can contain one or more devices for measuring characteristics of the drillstring 325 and the drill bit 326. As an example, the MWD module 356 may include equipment for generating electrical power, for example, to power various components of the drillstring 325. As an example, the MWD module 356 may include the telemetry equipment 352, for example, where the turbine impeller can generate power by flow of the mud; it being understood that other power and/or battery systems may be employed for purposes of powering various components. As an example, the MWD module 356 may include one or more of the following types of measuring devices: a weight-on-bit measuring device, a torque measuring device, a vibration measuring device, a shock measuring device, a stick slip measuring device, a direction measuring device, and an inclination measuring device.

FIG. 3 also shows some examples of types of holes that may be drilled. For example, consider a slant hole 372, an S-shaped hole 374, a deep inclined hole 376 and a horizontal hole 378.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 3, the wellsite system 300 can include one or more sensors 364 that are operatively coupled to the control and/or data acquisition system 362. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 300. As an example, a sensor or sensor may be at an offset wellsite where the wellsite system 300 and the offset wellsite are in a common field (e.g., oil and/or gas field).

As an example, one or more of the sensors 364 can be provided for tracking pipe, tracking movement of at least a portion of a drillstring, etc.

As an example, the system 300 can include one or more sensors 366 that can sense and/or transmit signals to a fluid conduit such as a drilling fluid conduit (e.g., a drilling mud conduit). For example, in the system 300, the one or more sensors 366 can be operatively coupled to portions of the standpipe 308 through which mud flows. As an example, a downhole tool can generate pulses that can travel through the mud and be sensed by one or more of the one or more sensors 366. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 300 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the term can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

FIG. 4 shows an example of an environment 401 that includes a subterranean portion 403 where a rig 410 is positioned at a surface location above a bore 420. In the example of FIG. 4, various wirelines services equipment can be operated to perform one or more wirelines services including, for example, acquisition of data from one or more positions within the bore 420.

In the example of FIG. 4, the bore 420 includes drillpipe 422, a casing shoe, a cable side entry sub (CSES) 423, a wet-connector adaptor 426 and an openhole section 428. As an example, the bore 420 can be a vertical bore or a deviated bore where one or more portions of the bore may be vertical and one or more portions of the bore may be deviated, including substantially horizontal.

In the example of FIG. 4, the CSES 423 includes a cable clamp 425, a packoff seal assembly 427 and a check valve 429. These components can provide for insertion of a logging cable 430 that includes a portion 432 that runs outside the drillpipe 422 to be inserted into the drillpipe 422 such that at least a portion 434 of the logging cable runs inside the drillpipe 422. In the example of FIG. 4, the logging cable 430 runs past the wet-connect adaptor 426 and into the openhole section 428 to a logging string 440.

As shown in the example of FIG. 4, a logging truck 450 (e.g., a wirelines services vehicle) can deploy the wireline 430 under control of a system 460. As shown in the example of FIG. 4, the system 460 can include one or more processors 462, memory 464 operatively coupled to at least one of the one or more processors 462, instructions 466 that can be, for example, stored in the memory 464, and one or more interfaces 468. As an example, the system 460 can include one or more processor-readable media that include processor-executable instructions executable by at least one of the one or more processors 462 to cause the system 460 to control one or more aspects of equipment of the logging string 440 and/or the logging truck 450. In such an example, the memory 464 can be or include the one or more processor-readable media where the processor-executable instructions can be or include instructions. As an example, a processor-readable medium can be a computer-readable storage medium that is not a signal and that is not a carrier wave.

FIG. 4 also shows a battery 470 that may be operatively coupled to the system 460, for example, to power the system 460. As an example, the battery 470 may be a back-up battery that operates when another power supply is unavailable for powering the system 460 (e.g., via a generator of the wirelines truck 450, a separate generator, a power line, etc.). As an example, the battery 470 may be operatively coupled to a network, which may be a cloud network. As an example, the battery 470 can include smart battery circuitry and may be operatively coupled to one or more pieces of equipment via a SMBus or other type of bus.

As an example, the system 460 can be operatively coupled to a client layer 480. In the example of FIG. 4, the client layer 480 can include features that allow for access and interactions via one or more private networks 482, one or more mobile platforms and/or mobile networks 484 and via the "cloud" 486, which may be considered to include distributed equipment that forms a network such as a network of networks. As an example, the system 460 can include circuitry to establish a plurality of connections (e.g., sessions). As an example, connections may be via one or more types of networks. As an example, connections may be client-server types of connections where the system 460 operates as a server in a client-server architecture. For example, clients may log-in to the system 460 where multiple clients may be handled, optionally simultaneously.

As to types of measurements, these can include, for example, one or more of resistivity, gamma ray, density, neutron porosity, spectroscopy, sigma, magnetic resonance, elastic waves, pressure, and sample data (e.g., as may be acquired while drilling to enable timely quantitative formation evaluation).

As an example, data can include geochemical data. For example, consider data acquired using X-ray fluorescence (XRF) technology, Fourier transform infrared spectroscopy (FTIR) technology and/or wireline geochemical technology.

XRF technology involves emission of characteristic "secondary" (or fluorescent) X-rays from a material that has been excited by bombardment with high-energy X-rays or gamma rays. XRF technology may be implemented for elemental analysis and chemical analysis, for example, as to research in geochemistry. As an example, in core analysis, XRF technology may be implemented to help determine mineral content. For example, elemental volumes may be inverted to mineral volumes by assuming certain standard formulae for mineral composition.

FTIR technology can involve analysis of an infrared spectrum of absorption, emission, photoconductivity or Raman scattering of a solid, liquid or gas. As an example, FTIR may be applied as a technique for quantitative mineralogical analysis of a sample of rock by measuring the effect of midrange infrared radiation transmitted through the sample. In such an example, the radiation excites vibrations in the chemical bonds within the mineral molecules at particular frequencies characteristic of each bond. The transmitted radiation may be compared with spectral standards for a variety of minerals, for example, to determine abundance of one or more minerals in the sample. As to sample preparation, consider, as an example, grinding a core plug to provide a representative sample that may be dispersed in a potassium bromide matrix and then subject to measurement and analysis.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the LITHO SCANNER technology marketed by Schlumberger Limited (Houston, Texas). As an example, a LITHO SCANNER tool may be a gamma ray spectroscopy tool. As an example, a workflow may include emission of neutrons by a pulsed neutron generator (PNG) of a tool to induce emission of gamma rays from a formation via interactions such as inelastic scattering interactions and thermal neutron capture interactions, which can produce gamma rays with a specific set of characteristic energies. In turn, gamma rays may be detected by a $LaBr_3$:Ce scintillator coupled to a high-temperature spectroscopy photomultiplier, producing signals that can be integrated, digitized, and processed by a high-performance pulse-height analyzer. Such an analyzer may determine, for example, pulse height (proportional to energy) of individually detected gamma rays and accumulate pulse-height histograms (spectra) that tally counts versus pulse height. Spectra may be acquired, for example, during and after each neutron burst, which helps to enable separation of inelastic and capture gamma rays. As an example, an individual spectrum may be decomposed into a linear combination of standard spectra from individual elements, which can involve adjustment for one or more environmental and/or electronic factors. As an example, coefficients of linear combination of standard spectra may be converted to elemental weight fractions, for example, via a modified geochemical oxides closure model, an inversion approach, etc. As to interpretation, various approaches may be implemented to generate mineralogy and lithologic fractions from the elemental concentration logs. As an example, a sequential spectral lithographic processing approach may be used, which is based on the derivation of empirical relationships between elemental concentrations and mineral concentrations. As another example, an iterative inversion technique may be implemented (e.g., consider the TECHLOG QUANTI multicomponent inversion ELAN module).

As an example, a method may include acquiring data (e.g., and/or receiving data) as measured via one or more techniques. Such techniques may include a micro-resistivity technique, a density and photoelectric factor or index technique, an image calibration technique, a dielectric and conductivity dispersion technique, a neutron porosity technique, an ultrasound technique, etc.

As an example, a workflow may utilize geochemical data, and optionally other data, for one or more processes (e.g., stratigraphic modeling, basin modeling, completion designs, drilling, production, injection, etc.). As an example, lithology scanner tool data may be used in a workflow or workflows that implement one or more frameworks.

Table 1, below, shows some examples of data, which may be referred to as "log" data (e.g., well log data) that are associated with petrophysical and rock physics properties calculation and analysis.

TABLE 1

Examples of Log Data

| Name | Uses |
|---|---|
| Gamma Ray (GR) | Lithology interpretation, shale volume calculation, calculate clay volume, permeability calculation, porosity calculation, wave velocity calculation, etc. |
| Spontaneous Potential (SP) | Lithology interpretation, Rw and Rwe calculation, detect permeable zone, etc. |
| Caliper (CALI) | Detect permeable zone, locate a bad hole |
| Shallow Resistivity (LLS and ILD) | Lithology interpretation, finding hydrocarbon bearing zone, calculate water saturation, etc. |
| Deep Resistivity (LLD and ILD) | Lithology interpretation, finding hydrocarbon bearing zone, calculate water saturation, etc. |
| Density (RHOB) | Lithology interpretation, finding hydrocarbon bearing zone, porosity calculation, rock physics properties (AI, SI, σ, etc.) calculation, etc. |
| Neutron Porosity (NPHI) | Finding hydrocarbon bearing zone, porosity calculation, etc. |
| Sonic (DT) | Porosity calculation, wave velocity calculation, rock physics properties (AI, SI, σ, etc.) calculation, etc. |
| Photoelectric (PEF) | Mineral determination (for lithology interpretation) |

FIGS. 1, 3 and 4 show various examples of equipment in various examples of environments. As an example, one or more workflows may be implemented to perform operations using equipment in one or more environments. As an example, a workflow may aim to understand an environment. As an example, a workflow may aim to drill into an environment, for example, to form a bore defined by surrounding earth (e.g., rock, fluids, etc.). As an example, a workflow may aim to acquire data from a downhole tool disposed in a bore where such data may be acquired via a drilling tool (e.g., as part of a bottom hole assembly) and/or a wireline tool. As an example, a workflow may aim to support a bore, for example, via casing. As an example, a workflow may aim to fracture an environment, for example, via injection of fluid. As an example, a workflow may aim to produce fluids from an environment via a bore. As an example, a workflow may utilize one or more frameworks that operate at least in part via a computer (e.g., a computing device, a computing system, etc.).

As mentioned, a log can be a well log. A well log can be, for example, a series of measurements versus depth or time, or both, of one or more physical quantities in or around a well. A log can be a recording of information as acquired via one or more sensors. As mentioned, as to a gamma ray sensor, gamma rays may be detected by a $LaBr_3$:Ce scintillator coupled to a high-temperature spectroscopy photomultiplier, producing signals that can be integrated, digitized, and processed by a high-performance pulse-height analyzer. In such an example, a well log can be a record (e.g., a recording) of sensor signal-based output. Transmission of signals and/or signal-based output from a device may be via fiber, wire and/or wireless machinery. For example, circuitry may be utilized that includes one or more wires and/or fibers that can transmit signals and/or signal-based output electrically and/or optically. As to wireless transmission, one or more antennas may be utilized that can receive and/or transmit electromagnetic energy that includes signals and/or signal-based output. As an example, wireless transmission may be via a medium such as a drilling fluid (e.g., mud, etc.). In such an example, mud pulses may be utilized in a process known as mud-pulse telemetry.

As an example, a log may be a depth series of data. For example, consider a log as a depth series of data with respect to true vertical depth (TVD). TVD can be defined as the vertical distance from a point in a well to a point at the surface, which may be associated with a piece of equipment (e.g., elevation of the rotary kelly bushing (RKB) also known as a rotary bushing or kelly drive bushing such as the kelly drive bushing 319 of FIG. 3, etc.). TVD is a type of depth measurement that can be used by a driller; while, another type is measured depth (MD). TVD can be utilized in determining pressures, which are caused in part by the hydrostatic head of fluid in a wellbore. Measured depth (MD), due to intentional and/or unintentional curves in a wellbore tends to be longer than true vertical depth (TVD). As an example, in a framework such as the PETREL framework, various depth tracks may exist for a plurality of wells, which may be given in standard sea level true vertical depth (SSTVD) where sea level is a common reference elevation for each of the wells, which may start at different depths and have different scales. As an example, one or more well logs may be accessed where data are given as a function of MD. In such an example, where coordinates of corresponding well trajectories are known (e.g., accessible), a method can include transforming the well logs from being a function of MD to being a function of TVD, for example, as TVD below sea level (BSL or b.s.l.). As an example, for a geographic region, elevation of formation tops may varies by hundreds of meters where an SSTVD-based scale can facilitate comparisons between "common" features in well logs (e.g., via a propagation process, etc.). While SSTVD is mentioned, the acronym TVDSS may be utilized to represent TVD minus the elevation above mean sea level of a depth reference point of a well (e.g., TVD subsea). As mentioned, a depth reference point may be a kelly drive bushing or another portion of well-related equipment (e.g., drill floor, etc.).

As explained, as a well may deviate from vertical, there may be a measured depth (MD) for a point measured along a path of a wellbore and a true vertical depth (TVD) as an absolute vertical distance between a datum and a point in the wellbore. A datum may be selected from various data such as ground level (GL), drilling rig floor (DF), rotary table (RT), kelly bushing (KB or RKB), mean sea level (MSL), etc.

As an example, a method may implement a process referred to as elevation correction. Such a process may involve using a compensating factor to bring measurements to a common datum or reference plane. Well log headers of well log data files can include an elevation such as that of a drilling rig's kelly drive bushing and, for example, height of rig location above sea level, so that well log depths can be elevation corrected to sea level.

As an example, a method can include transforming logs to a particular depth series form that provides for propagation. For example, a transformation may utilize a common reference and/or a common scale. In instances where RKB or other well-related equipment variations are minimal for a plurality of wells, a common start depth may be suitable; whereas, where variations exist a sea level or other standard type of elevation may be utilized as a reference. As an example, where scale transformations are made, a method can include interpolation such that upsampling and/or downsampling may occur to make comparisons using a common sample per unit depth factor. As an example, interpolation may include spline fitting and/or one or more other techniques. As an example, one or more logs may be preprocessed as part of a propagation process workflow where pre-processing may aim to facilitate propagation of a formation top from one log to another.

Figure 5:
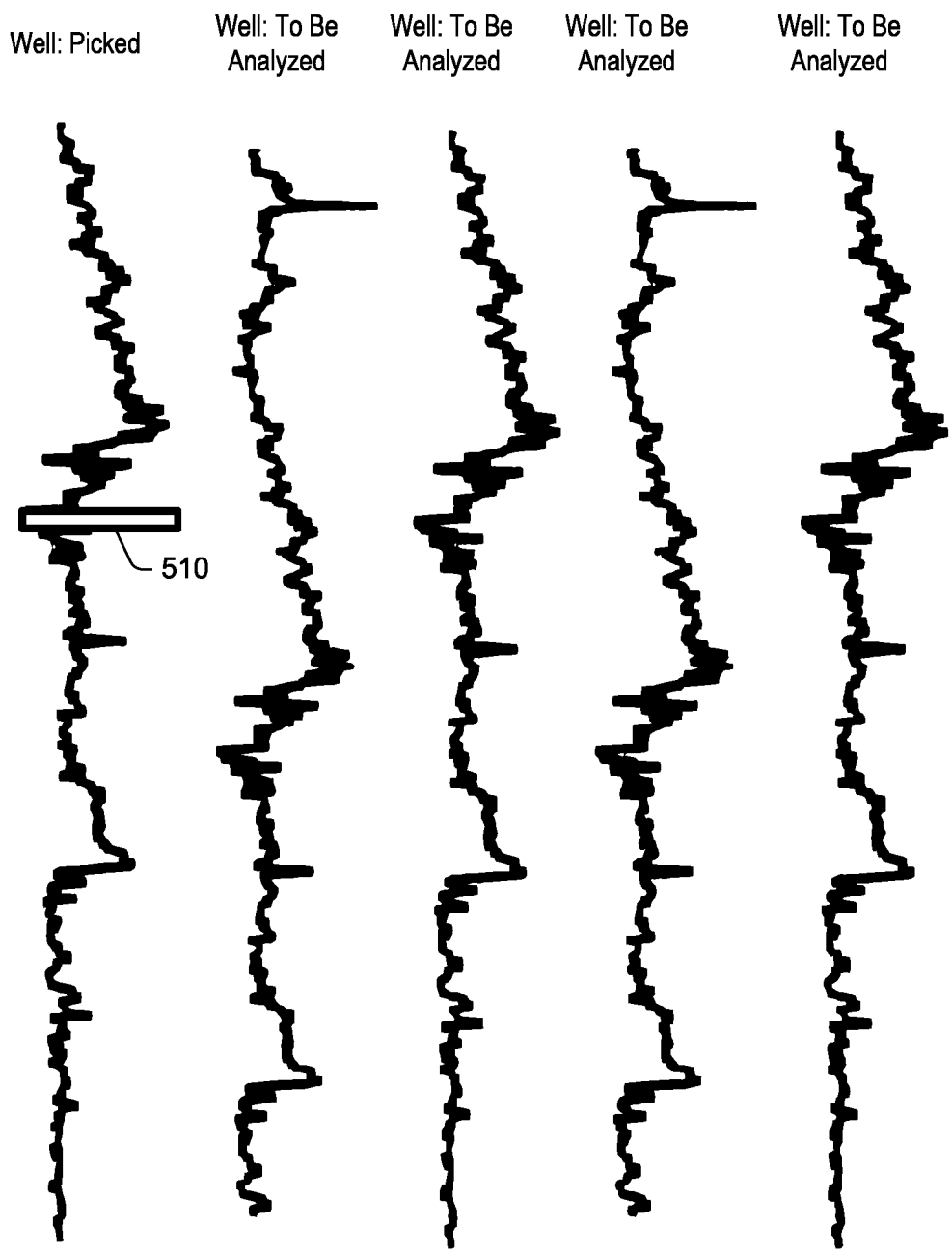
FIG. 5 illustrates examples of well logs along with a process of predicting one or more picks on a series of context logs from a single log that has associated user provided interpretation information (e.g., a user interpreted log)

FIG. 5 shows an example set of logs (e.g., well logs) 500 and an input marker 510 as being an example of a user picked marker on one of the logs in the set of logs. In FIG. 5, the one log is referred to as being a "picked" well or "picked" well log where "picked" refers to a process of picking a portion of a log as corresponding to a geological feature such as, for example, a formation feature such as, for example, a formation top (e.g., a boundary of a layer of a geological region through which the well passes). A method such as the method 210 of FIG. 2 may be utilized to propagate the picked marker 510 (e.g., a defined pick) to one or more of the other logs in the set of logs, which are labeled as "to be analyzed".

Figure 6:
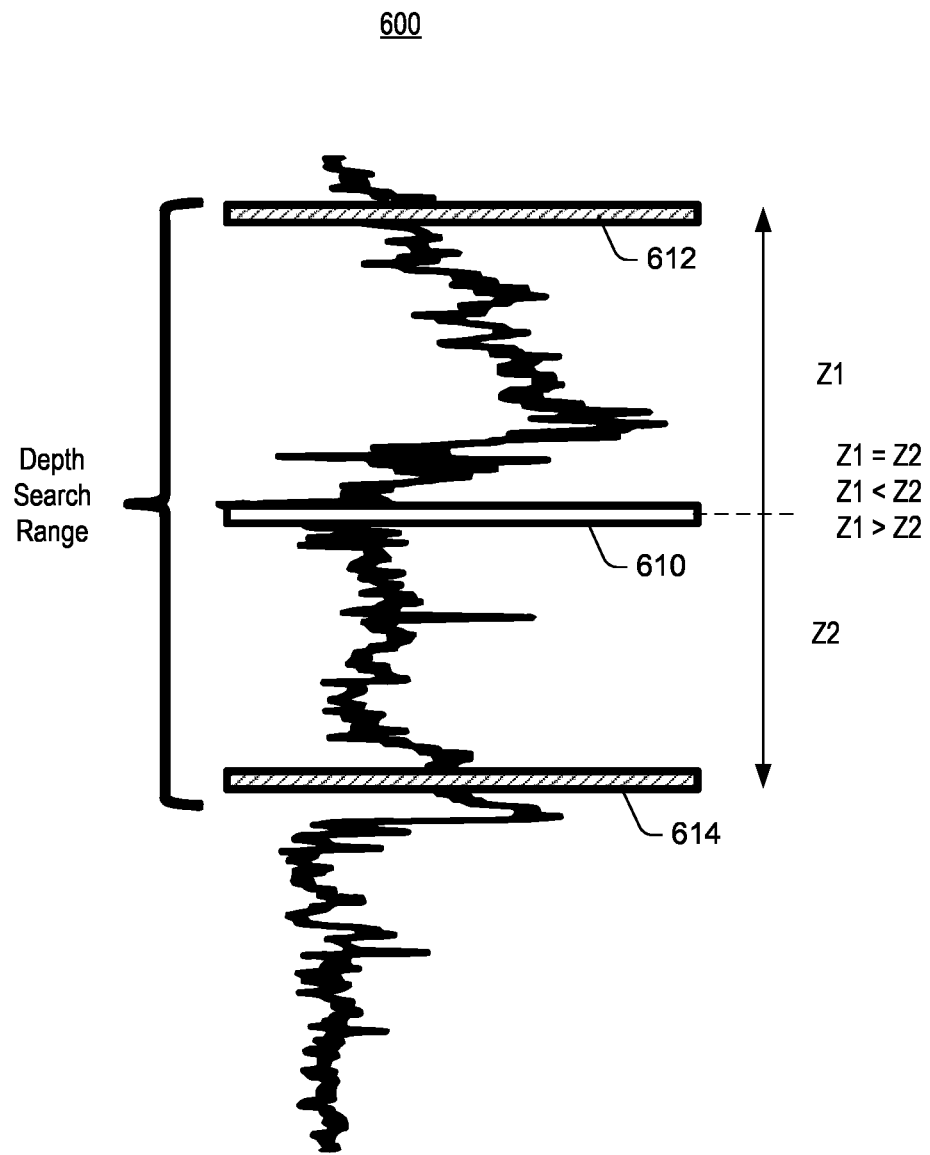
FIG. 6 illustrates an example of a depth search range with respect to a marker on a well log.

FIG. 6 shows an example of a process 600 that includes choosing a search range that is centered around a picked marker 610 such that a pattern is defined that can be utilized in one or more matching attempts (e.g., correlations, etc.). As shown in the example of FIG. 6, a range may be symmetric and of the order of meters such as, for example, approximately 200 m above a marker and approximately 200 m below a marker. In the example of FIG. 6, the upper dimension is shown as Z1 and the lower dimension is shown as Z2 where various equations indication that Z1 and Z2 can be equal or different, where Z1 may be greater than Z2 or where Z2 may be greater than Z1. As an example, greater than or equal to equations may be utilized. As an example, a range may be asymmetric with respect to a picked marker. In the example of FIG. 6, the upper limit of the depth search range is indicated as 612 and the lower limit of the depth search range is indicate as 614. In the example of FIG. 6, Z1 is equal to Z2 such that the picked marker 610 is in the middle of the depth search range.

In the example of FIG. 6, the depth of the search range can be true vertical depth or another suitable depth for purposes of propagation. As an example, increasing search range can increase accuracy at the expense of runtime and/or computational resources. Various trials performed utilized 200 m as illustrated in the example of FIG. 6 for Z1 and Z2. As mentioned, the selected range can define a pattern or motif that a method can attempt to match (e.g., correlate, etc.). As an example, a log can be a depth series, for example, sensor-based data referenced with respect to depth, which may be a true vertical depth, a measured depth, etc.

As an example, a method can include transforming a depth dimension. For example, consider a method that transforms a measured depth to a true vertical depth or other type of depth (e.g., an elevation referenced depth, etc.). As an example, where a well is substantially vertical, measured depth (MD) may correspond to true vertical depth (TVD); whereas, for a deviated well, MD and TVD can differ (e.g., consider a horizontal portion of a deviated well).

As an example, a method may utilize a multidimensional approach. For example, consider log data that is stored in association with three-dimensional coordinates. As an example, a method can include utilizing one or more sensor-based datum for a depth. For example, consider a horizontal portion of a well where material properties may be relatively constant in rock bounding the wellbore of the well. In such an example, one or more values may be averaged and assigned a particular depth. As explained, one or more of various approaches can be utilized to provide logs with respect to depth (e.g., a log as a depth series of sensor-based measurement values).

Figure 7:
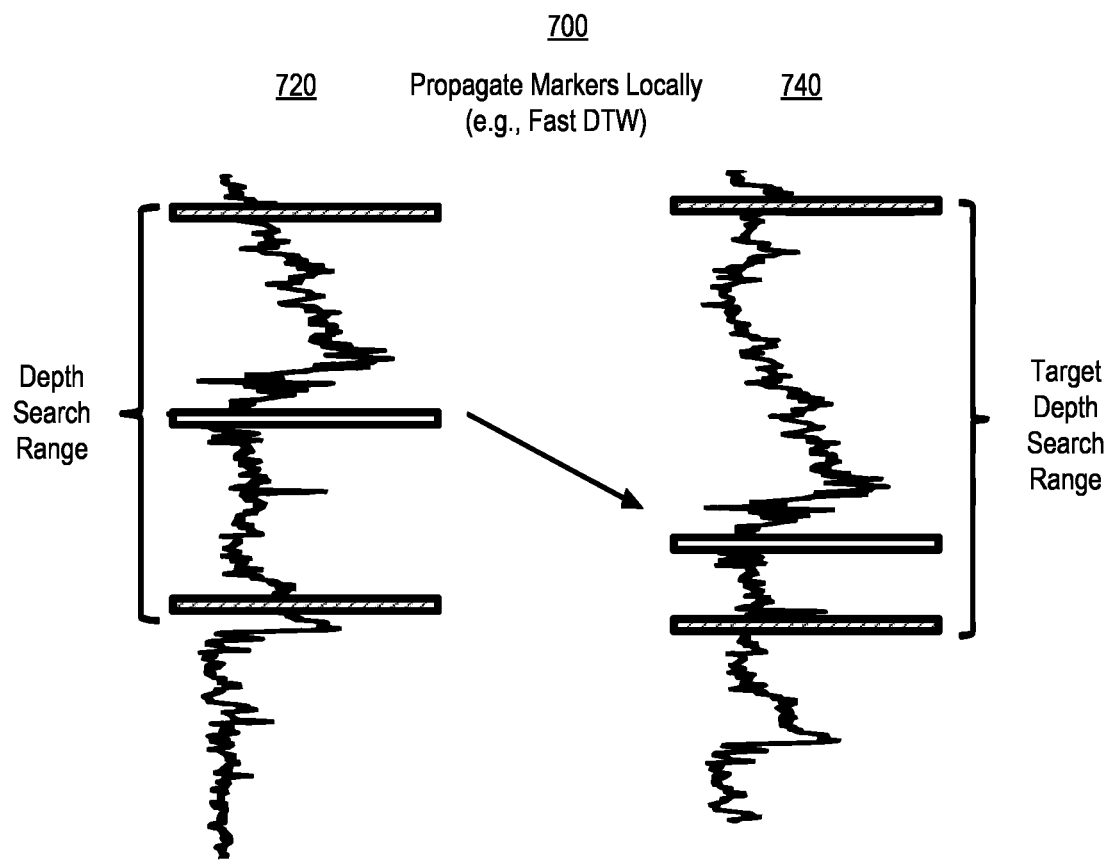
FIG. 7 illustrates an example of propagation via a fast dynamic time warping (FastDTW) approach.

FIG. 7 shows an example of a method 700 that involves propagation of a picked marker. In the example of FIG. 7, a FastDTW approach may be utilized. As shown, a position of a marker in a parent well log 720 is utilized to find a position for a marker in a child well log 740. As the two wells of the two well logs 720 and 740 are different wells with different trajectories in a subsurface geologic region, a formation top can be at different depths, for example, at depths that depend on coordinates such as latitude and longitude at a surface location. In the example of FIG. 7, the two well logs 720 and 740 can be depth series along a common depth dimension (e.g., true vertical depth, an elevation referenced depth, etc.). As shown, the marker of a formation top is at a deeper depth in the child well log 740 (e.g., a child as the marker is derived from the parent well log 720). Thus, where the depth search range is over a common depth range (e.g., a common TVD range), the formation of that formation top can be a descending formation in a direction from the well of the well log 720 to the well of the well log 740.

As to computational demands, computing a DTW demands $O(N^2)$ in general. Fast techniques for computing DTW include PrunedDTW, SparseDTW, FastDTW, and the MultiscaleDTW. A common task, retrieval of similar time series, can be accelerated by using lower bounds such as LB_Keogh or LB_Improved. As to FastDTW, consider Salvador et al., "FastDTW: Toward Accurate Dynamic Time Warping in Linear Time and Space". KDD Workshop on Mining Temporal and Sequential Data, pp. 70-80, 2004, which is incorporated by reference herein.

The aforementioned FastDTW algorithm can be a linear and accurate approximation of dynamic time warping (DTW). The FastDTW algorithm can implement a multi-level approach that recursively projects a warp path from a coarser resolution to a current resolution and refines it. While quadratic time and space complexity of DTW has limited its use to relatively small time series data sets, FastDTW can be run on relatively larger data sets. FastDTW can be, for example, an order of magnitude faster than DTW and it can complement one or more existing indexing methods that speed up time series similarity search and classification. Theoretically, FastDTW can be linear in time and space complexity.

A FastDTW mechanism can utilize a multilevel approach that includes various operations such as, for example, coarsening, projection and refinement. As to coarsening, it can shrink a time series into a smaller time series that represents a curve as accurately as possible with fewer data points. As to projection, it can find a minimum-distance warp path at a lower resolution, and use that warp path as an initial guess for a higher resolution's minimum-distance warp path. As to refinement, it can refine the warp path projected from a lower resolution through local adjustments of the warp path.

An example of a function for FastDTW is presented below in the form of example pseudocode below:

```
Function FastDTW( )
Input:      X—a TimeSeries of length |X|
            Y—a TimeSeries of length |Y|
            radius—distance to search outside of the projected
               warp path from the previous resolution
               when refining the warp path
Output:     1) A min. distance warp path between X and Y
            2) The warped path distance between X and Y
1| // The min size of the coarsest resolution.
2| Integer minTSsize = radius+2
3|
4| IF (|X| ≤ minTSsize OR |Y| ≤ minTSsize)
5| {
6|    // Base Case: for a very small time series run
7|    // the full DTW algorithm.
8|    RETURN DTW(X, Y)
9| }
10| ELSE
11| {
12|    // Recursive Case: Project the warp path from
13|    // a coarser resolution onto the current
14|    // current resolution. Run DTW along
15|    // the projected path (and also 'radius' cells
16|    // from the projected path).
17|    TimeSeries shrunkX = X.reduceByHalf( )
18|    TimeSeries shrunkY = Y.reduceByHalf( )
19|
20|    WarpPath lowResPath =
21|       FastDTW(shrunkX, shrunkY, radius)
22|
23|    SearchWindow window =
24|       ExpandedResWindow(lowResPath, X, Y,
25|          radius)
26|
27|    RETURN DTW(X, Y, window)
28| }
```

As shown in the foregoing example, the input to the function includes two time series and the radius parameter while the output of the function is a warp path and the distance between the two time series along that warp path. Line 2 determines the minimum length of a time series at the lowest resolution. This size can be dependent on the radius parameter and can determine the smallest possible resolution size for which decreasing the resolution further would be likely unproductive (e.g., a full dynamic time warping may be demanded at more than one resolution).

Again, FIG. 7 shows that a method can include propagating from one log to another, which may commence locally and extend globally. As an example, a method can include choosing a way to pick a search range. For example, consider using the location wells to create an adaptive search range. Such an approach can include computing a Minimum Spanning Tree (MST) on locations of wells.

A minimum spanning tree (MST) or minimum weight spanning tree is a subset of edges of a connected, edge-weighted (un)directed graph that connects vertices together, for example, without cycles and with a minimum possible total edge weight. A MST may be defined as a spanning tree whose sum of edge weights is as small as possible. More generally, an edge-weighted undirected graph (not necessarily connected) has a minimum spanning forest, which is a union of the minimum spanning trees for its connected.

An algorithm for a MST can be the Borůvka's algorithm, which proceeds in a sequence of stages where, in each stage, called Borůvka step, it identifies a forest F involving the minimum-weight edge incident to each vertex in the graph G, and then forms the graph as the input to the next step. Each Borůvka step takes linear time and, as the number of vertices is reduced by at least half in each step, Borůvka's algorithm takes O(m log n) time.

Another example algorithm is Prim's algorithm, which grows the MST (T) one edge at a time. Initially, T includes an arbitrary vertex. In each step, T is augmented with a least-weight edge (x,y) such that x is in T and y is not yet in T. By a "Cut" property, edges added to T are in the MST. The Prim's algorithm run-time is either O(m log n) or O(m+n log n), depending on the data-structures used.

Other examples of algorithms include Kruskal's algorithm; the reverse-delete algorithm, which is the reverse of Kruskal's algorithm; a comparison model, in which allowed operations on edge weights are pairwise comparisons; a combination of Borůvka's algorithm and the reverse-delete algorithm; and the soft heap, an approximate priority queue as Chazelle's algorithm.

Figure 8:
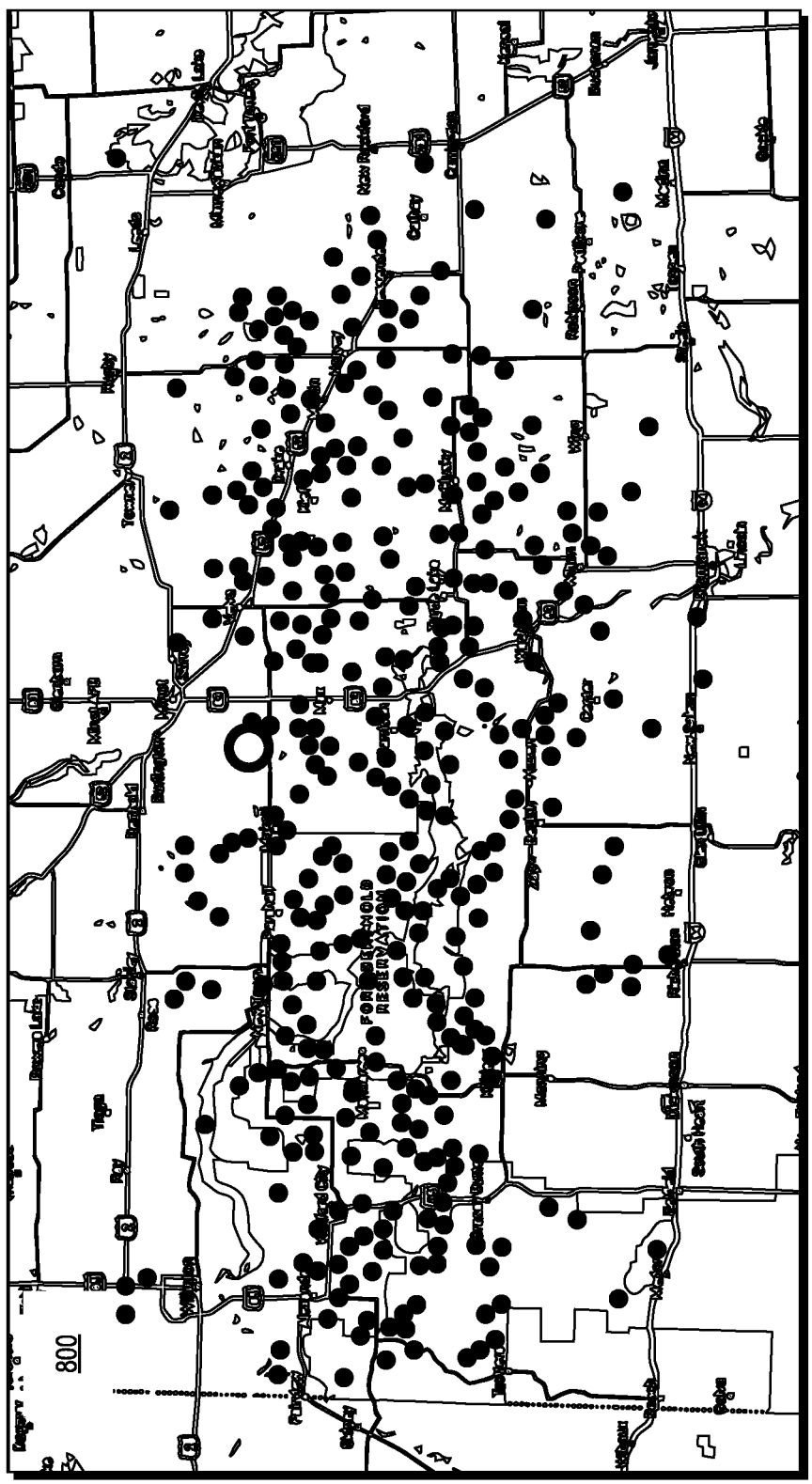
FIG. 8 illustrates an example of a map that includes various well locations and a location of a selected well.

FIG. 8 shows an example of a graphical user interface (GUI) 800 that includes a well identified by an open circle with a thick border, which may be selected using a graphical control feature. Other wells are indicated by small black circles. The GUI 800 shows a selected well (e.g., a parent well or seed well) and a set of wells to be analyzed, which may be referred to as child wells or children of the selected well (e.g., parent or seed). As an example, a method can include generating a minimum spanning tree (MST) on the wells identified by the small black circles, for example, where the well identified by the larger open circle may be considered to be a seed well (e.g., parent).

As an example, a method can include, from an input or seed log, propagating to other wells (well logs). As mentioned, such an approach may be proximity based as to neighbors or, for example, such an approach may aim to perform comparisons in parallel or in another manner where a coupled structure may be generated, optionally without linear progress from one well to another well.

Figure 9:
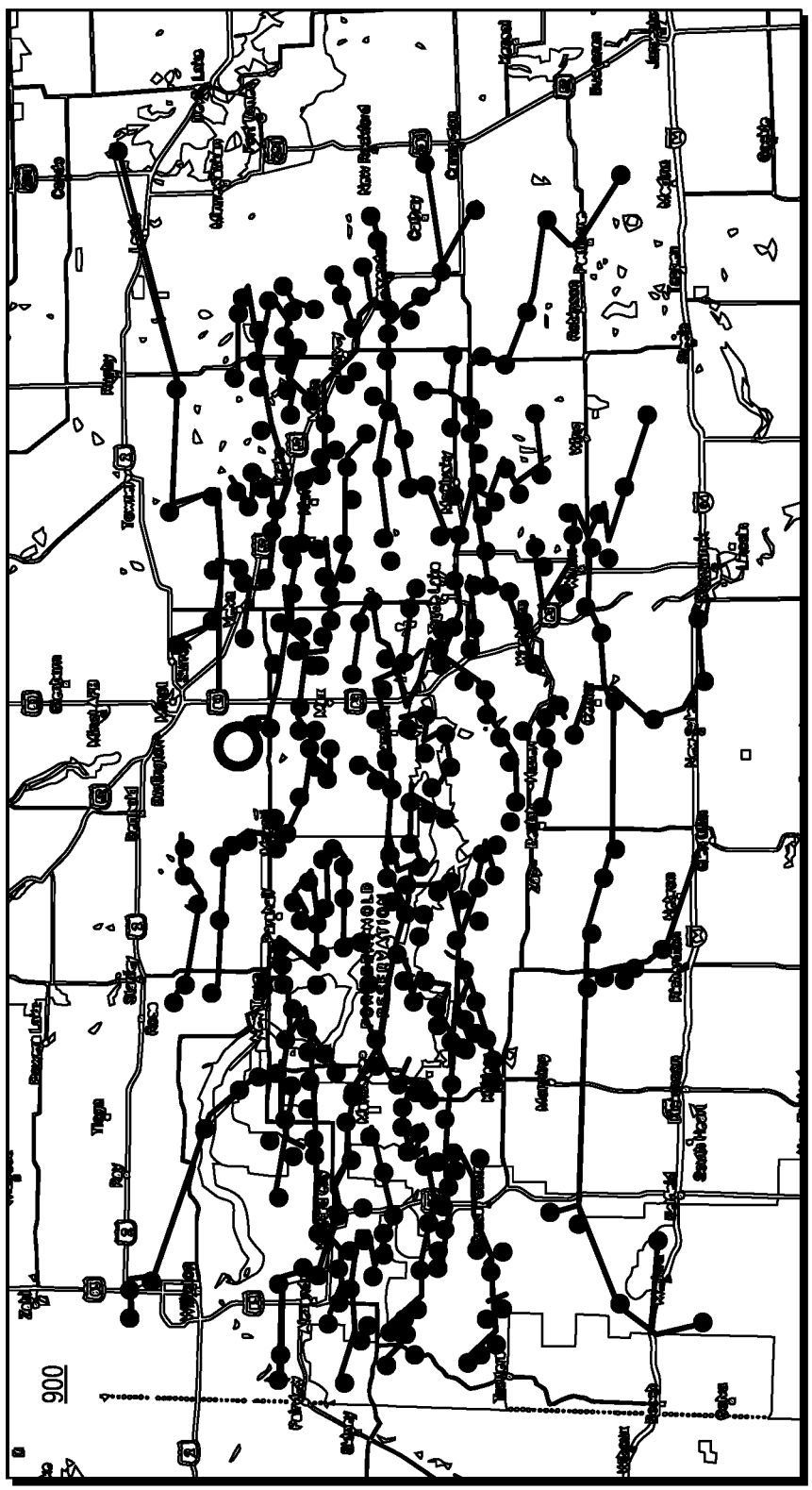
FIG. 9 illustrates the map of FIG. 8 where an example of a spanning tree that includes various well locations.
Figure 11:
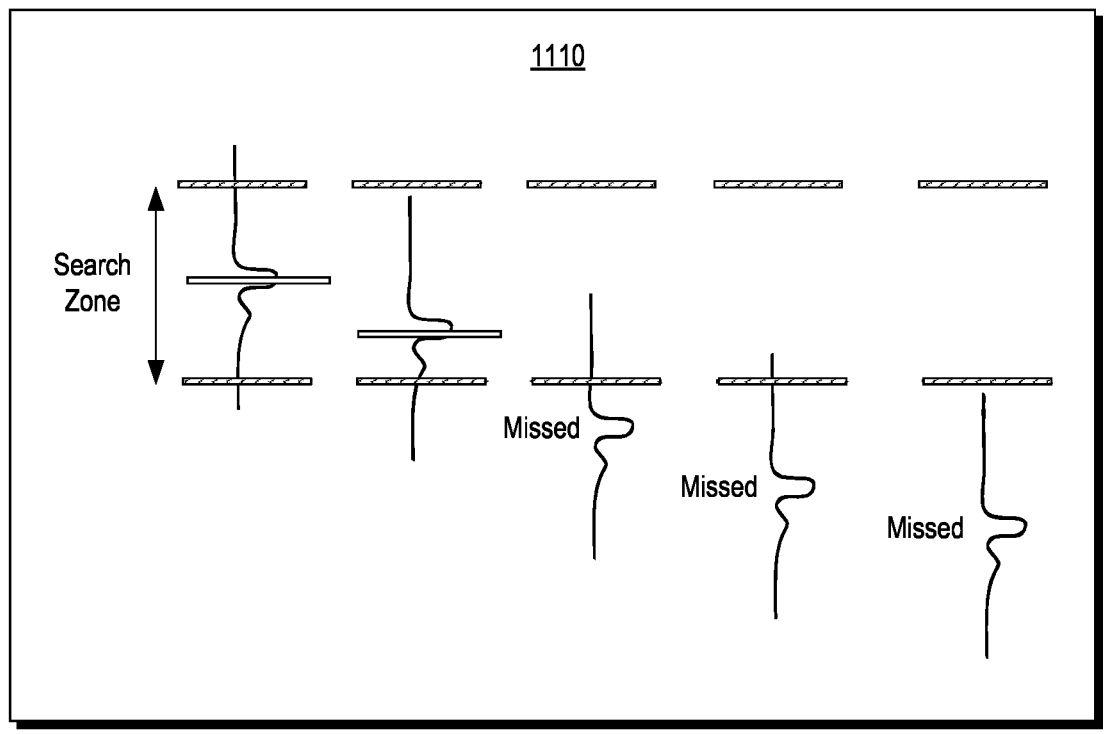
FIG. 11 illustrates an example of adjusting a search range.
Figure 11:
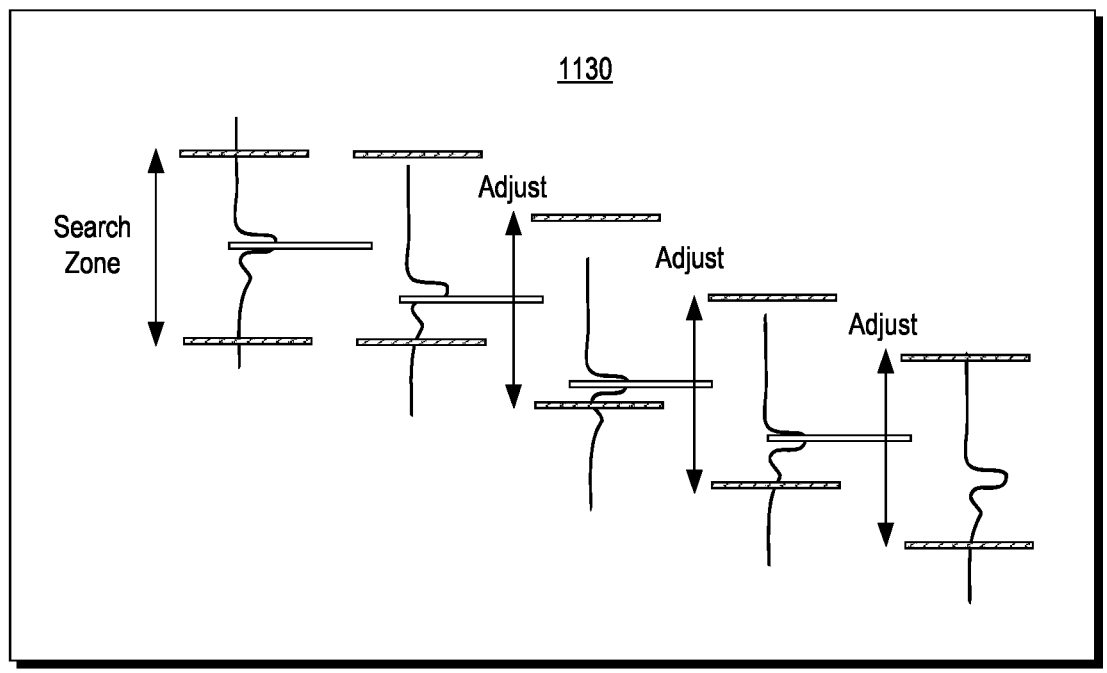

FIG. 9 shows an example of a graphical user interface (GUI) 900 that includes a map of the region of wells as in the GUI 800 of FIG. 8 where, for example, a method can adjust a search range as a picked marker is propagated (see, e.g., FIG. 11, etc.).

Figure 10:
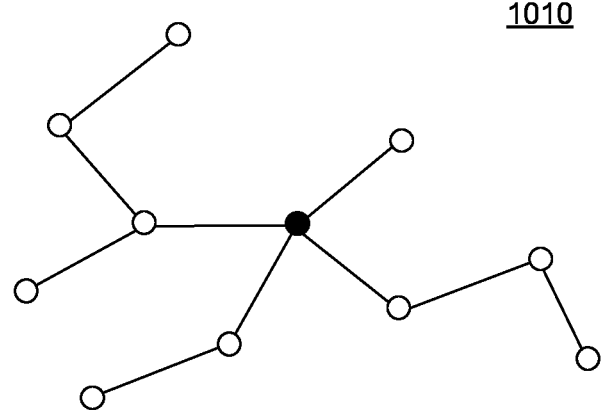
FIG. 10 illustrates an example of propagation with respect to a portion of a tree.
Figure 10:
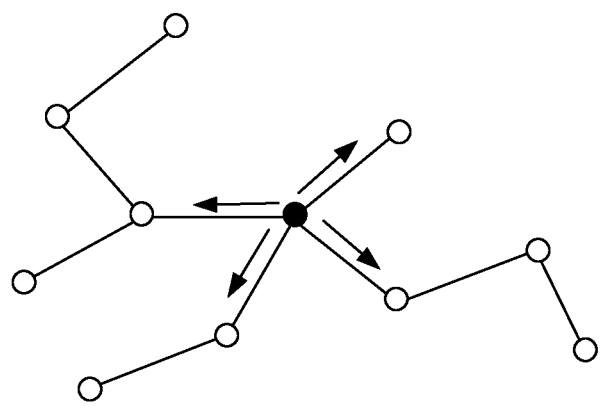
Figure 10:
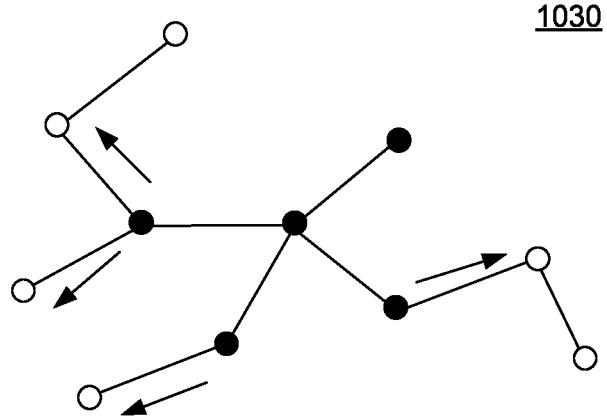

FIG. 10 shows an example of a tree in various stages or phases 1010, 1020 and 1030 where a seed can propagate via one or more branches where such one or more branches may further propagate. As shown in the selection stage 1010, a seed (e.g., or parent) is selected. In a first propagation stage 1020, the seed is propagated to four neighboring wells. In a second propagation stage 1030, three of the children are further propagated to one or more of their "outward" neighbors (e.g., in a direction generally outward from each of the children with respect to the parent or seed, which can define an inward direction.

FIG. 11 illustrates examples of method 1110 and 1130 where the method 1130 includes adjusting a search range (e.g., a search depth range) one or more times as a picked marker is propagated from one log of one well to one or more other logs or one or more other logs. As shown in FIG. 11 with respect to the method 1110, an approach may not take advantage of a well location and may miss the mapping for a number of wells (see, e.g., how the feature of the logs is below the search zone for the rightmost three logs). As shown in FIG. 11 with respect to the method 1130, an approach may include propagating a top to a neighbor and then using the new top to adjust a search range for the neighbor's top. Such an approach may be performed iteratively. In such an example, a "top" can be a marker (e.g., type of marker).

Figure 13:
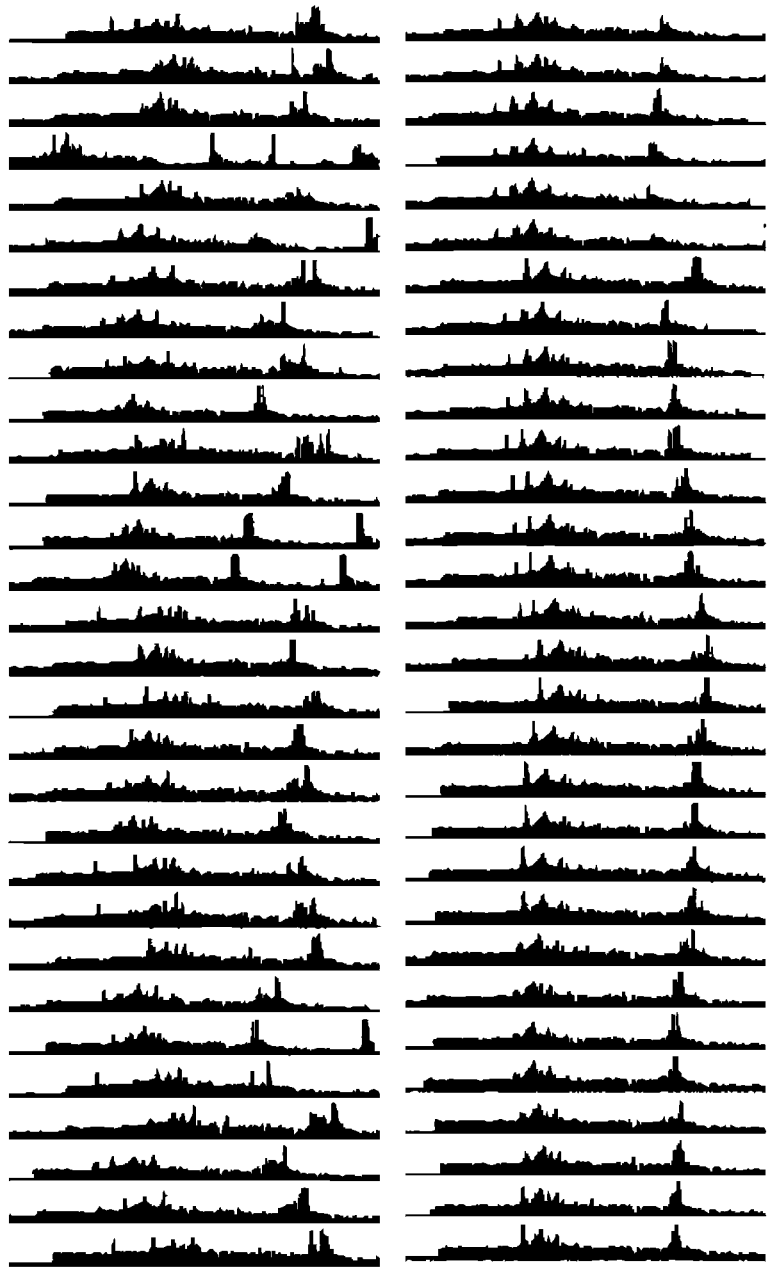
FIG. 13 illustrates examples of logs as organized randomly and by a spanning tree.

The method 1130 of FIG. 13 involves adjusting a search zone (e.g., a search depth range) using a marker, which can be a propagated marker that marks a portion of a log that includes sensor-based data with respect to a dimension such as a depth (e.g., true vertical depth, etc.). The method 1110 can include an inherent assumption that the formation top identified does not change to an extent that it would be outside of the search zone of the seed log of the seed well. As such, for the formation top to be properly propagated, a relatively large search zone is demanded. Where such a search zone is of equal dimensions above and below the seed marker of the seed log of the seed well, computational demands can increase and a risk of not being able to propagate still exists (e.g., a feature of a log being at a depth that is outside of the fixed search zone). In contrast, the method 1130 can adjust the search zone iteratively. Such an approach may retain dimensions of a search zone. While the example in FIG. 13 as to the method 1130 shows a search zone that is iteratively adjusted to deeper depths, a method can adjust a search zone iteratively to shallower depths and/or deeper depths in a manner that depends on where a marker is propagated in a parent well log (e.g., in a chain of parent to child, parent to child, etc.). As an example, well log markers (e.g., formation tops) may be referred to generationally such as grandparent, parent, child, grandchild, etc. As explained, a parent may be propagated to one or more children or may be a terminal parent where no further well logs are to be analyzed.

As an example, a method can optionally adjust one or more dimensions of a search zone (e.g., a search depth range). For example, where a well-to-well distance increases, a search zone dimension or dimensions may be increased and where a well-to-well distance decreases, a search zone dimension or dimensions may be decreased. As an example, a method can include utilizing depth data for a plurality of prior propagated markers, optionally with distances, to determine a search zone dimension or dimensions. For example, consider a standard deviation calculation that can generate a standard deviation, which, if small or decreasing, can reduce a search zone dimension or dimensions. In contrast, where a standard deviation is larger or increasing, can increase a search zone dimension or dimensions.

Referring again to FIGS. 8 and 9, FIG. 9 shows an example of a map of the region of wells as in FIG. 8 where a method can adjust a search range as a picked marker is propagated. The map of FIG. 9 illustrates such an approach from the perspective of logs that are "linked" via propagation.

As explained, while an algorithm can propagate a single pick, geology can be complex such that multiple picks make for a more robust result. In other words, a single pick may be confounded when propagating in an environment where there is changing geology and/or one or more other things an algorithm may not figure out without specific domain knowledge.

As an example, a method can include a multiple pick approach, which may be iterative. For example, after a single pick has been input, a method may output predictions for logs (see, e.g., the method 210 of FIG. 2). Such predictions may be of varying accuracy and/or certainty. As an example, a method can include issuing one or more notifications where, for example, a notification may be issued automatically to a user (e.g., a machine, a human, etc.) to focus on the log where choosing a revised pick would most improve the predictions and re-propagate the well tops after the user's revisions. Such an approach can, in turn, minimize a number of picks a human may have to make. As explained with respect to the method 210 of FIG. 2, a method can include a computation block for computing a confidence score for one or more predictions.

Figure 12:
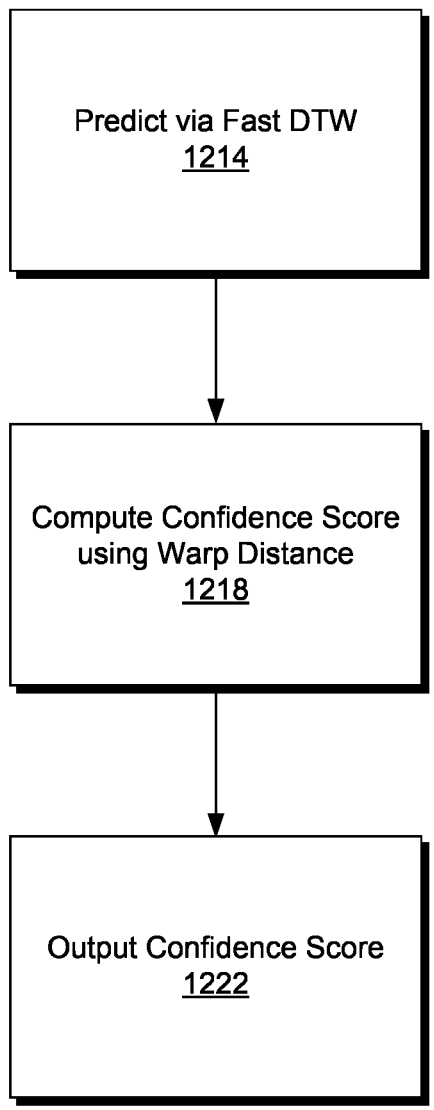
FIG. 12 illustrates an example of a method that includes calculating confidence based at least in part on a value of a FastDTW approach.

FIG. 12 shows an example of a method 1210 that may be implemented for computing a confidence metric (e.g., a confidence score). As shown, the method includes a prediction block 1214 for predicting formation top locations using a FastDTW algorithm, a computation block 1218 for computing a confidence score using a warp distance as determined via the FastDTW algorithm, and an output block 1222 for outputting a confidence score. As an example, a confidence score can be utilized for one or more purposes. For example, consider rendering a map with confidence score markers, indicators, etc. As another example, consider rendering one or more logs with formation tops where one or more of the formation tops may include a graphical indicator of confidence (e.g., uncertainty, certainty, etc.). Such an approach can facilitate a quality control workflow that aims to generate a model of a subsurface geographic region with respect to layers defined at least in part via formation tops using log information.

In the method 1210, where FastDTW is utilized, a warp distance is computed that measures a difference between log signatures (e.g., well log signatures). As shown, "a" can be a normalizing constant. As indicated, where the warp distance ("warp_dist") tends to zero, confidence tends to one and where the warp distance tends to infinity, confidence tends to 0. Such scores may be transformed to percentages (e.g., 0% and 100% confidence).

As an example, a method can include issuing a notification for a user to review a lowest confidence well. In such an example, once this pick has been confirmed or revised by the user, the method may iterate by repeating various actions to generate predictions stemming from this new pick. As mentioned, such iterations may continue until one or more criteria are met.

As an example, a method can include continuously monitoring log data for a field as they are available (e.g., from a data storage, sensor equipment, a network, etc.) where the data are received via an interface of a computer that can utilize one or more functions (e.g., FastDTW, etc.), and optionally input acquired via a graphical user interface (GUI), to generate a result (or results), and signaling a device to perform an operation based at least in part on the result (or results). In such an example, the operation can be a field operation that is to be performed by at least one piece of field equipment. In such an example, the result (or results) can pertain to the Earth as the log data include information about the Earth (e.g., as acquired by one or more sensors). More accurate and/or more timely information about the Earth can allow for signaling to a device or devices to operate more effectively with respect to the Earth (e.g., injection, production, measurement, drilling, casing, fracturing, etc.), which may be for the purpose of resource extraction from the Earth (e.g., extraction of fluid such as hydrocarbon fluid).

As an example, a method can include a multiple pick approach (e.g., upfront approach). In such an example, consider a number of input picks Y upfront (from older interpretations for example), which may be in the tens of picks (e.g., 10, 20, 30, 40, 50, 60, etc.). In such a method, a selection may be made as to a number of predictions to make for each unpicked wells (e.g., consider a number X less than approximately 10). In such an approach, for each unpicked well, the method can find its X nearest picked wells. Using this information, the method can create an MST for each of the Y input logs such that each unpicked logs will be in X MSTs. In such an example, the method can then propagate from each MST and, for example, pick the highest confidence wells.

As an example, a method can include visualization via one or more GUIs. For example, by taking a path along a branch in a tree, it is possible to visualize changes in depth of logs, which may help a user more readily identify mistakes or other errors.

FIG. 13 shows an example of randomly ordered logs 1310 versus an example of MST order of logs 1330 where the logs are illustrated with respect to true vertical depth (TVD). As shown, the MST order of logs 1330, when compared to the randomly ordered logs 1310, provides for a more comprehensible assessment of variations that may occur in formations tops for a plurality of wells in a region. As an example, a GUI can include a graphical control that can present logs according to a MST order such as in the example of FIG. 13.

Figure 14:
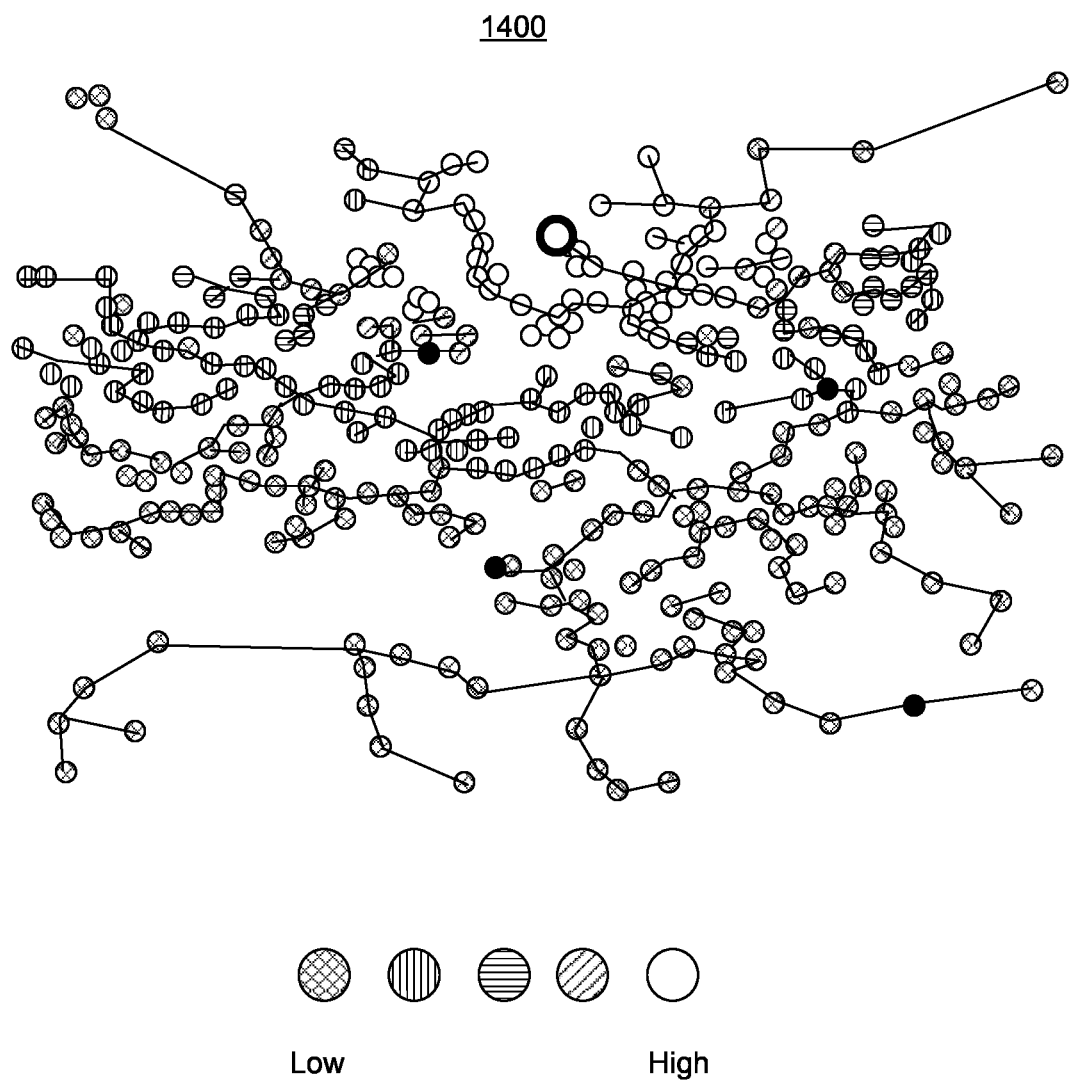
FIG. 14 illustrates an example of a graphical user interface (GUI) that includes connected wells with confidence information.

FIG. 14 shows an example of a confidence map GUI 1400 where hatching levels represents confidence levels (e.g., consider red, yellow, and green or other techniques) for a plurality of wells with one picked well (see open circle with thick border). The GUI 1400 can correspond to a map such as one of the maps of FIG. 8 or FIG. 9. In the example of FIG. 14, five confidence levels are illustrated; noting that more levels or fewer levels may be utilized (e.g., as part of a method parameter, which may be selectable). The levels can be, for example, from 0 to 1 or 0 to 100. The lowest level may be 0.0 to 0.2, the next level 0.2 to 0.4, the next level 0.4 to 0.6, the next level 0.6 to 0.8 and the last level 0.8 to 1.0. As shown, the wells with the highest level tend to be in a region about the picked well. Where distance increases, in some instances, the confidence level as to one or more propagated formation tops may decrease.

As shown, the GUI 1400 can provide an overview for a relatively large geographic region with a relatively large number of wells. A user may utilize such a GUI to relatively rapidly assess results of an automated propagation process. As an example, a user may utilize a graphical control of the GUI 1400 to select one of the wells and instruct a computational framework to perform propagation utilizing the selected one of the wells in addition to one or more prior selected wells. For example, in the example of the GUI 1400, a region includes various wells that have relatively low confidence levels. A user may select a well in that region and then actuate a graphical control to cause the computational framework to propagate using that selected well in combination with the prior selected well and/or results therefrom. For example, consider a process whereby the newly selected well propagates and determines a confidence score that can be compared to a prior computed confidence score to determine whether the newly selected well provides a more "confident" result. Such an approach may cause propagation (e.g., or one or more portions thereof) to terminate where the newly selected well does not improve the results as to one or more wells.

Figure 15:
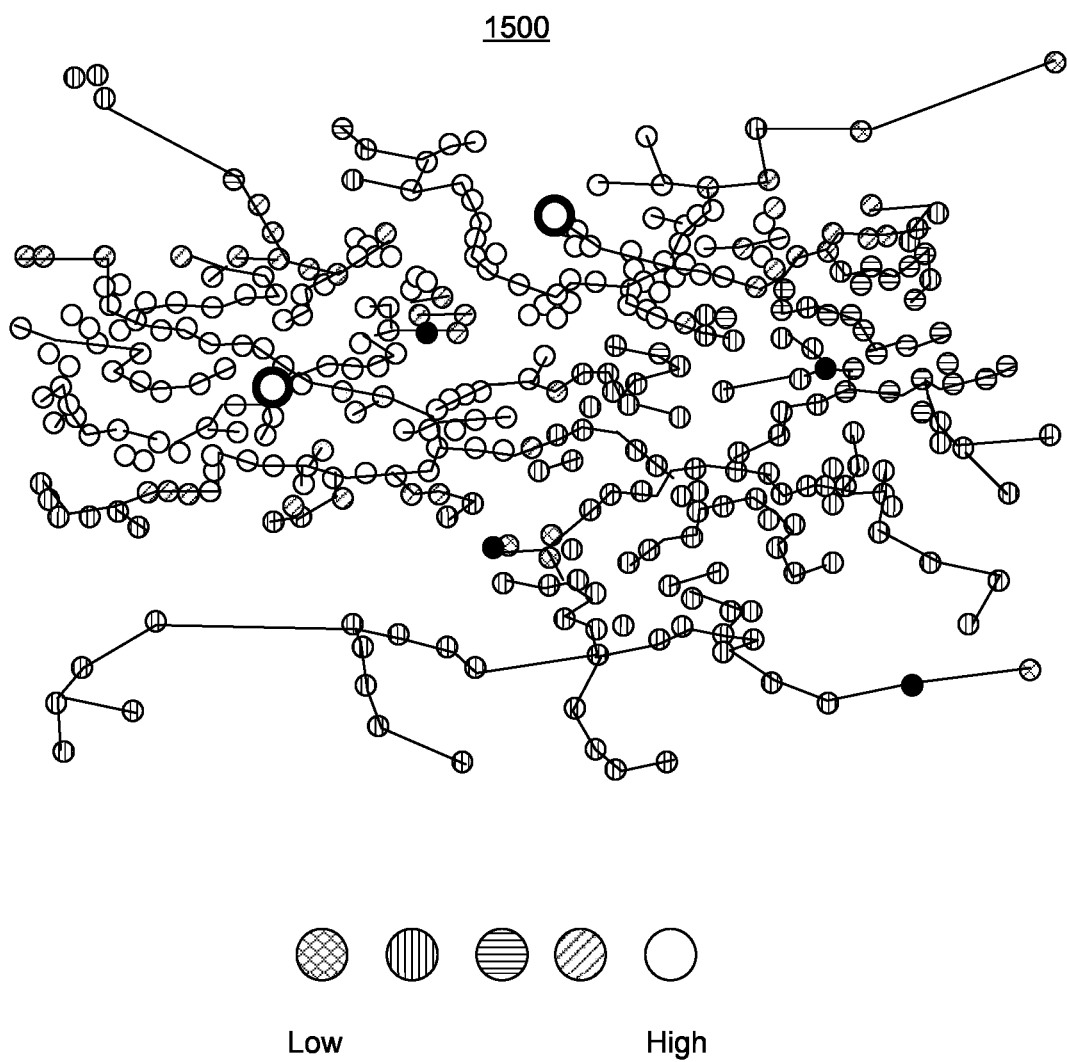
FIG. 15 illustrates an example of a graphical user interface (GUI) that includes connected wells with confidence information.

FIG. 15 shows an example of a confidence map GUI 1500 where the hatching confidence levels of FIG. 14 are shown for a plurality of wells with two picked wells (see the two open circles with thick borders). As shown in the example of FIG. 15, the selection of an additional seed well has improved the confidence level of results in region of the map. A user may inspect such confidence levels to determine whether to further process, edit, propagate, etc. As an example, a map may be generated responsive to execution of a method that includes one or more parent wells that propagate formation top(s) to one or more child wells (e.g., children).

As an example, one or more GUIs may be animated. For example, as a method executes via a computing device or computing system, information as to propagation may be rendered to a display such that a user can see how the method is propagating information. In such an example, the computing device or computing system may be interactive where a GUI allows a user to pick a feature on a log and then instruct the computing device or computing system to propagate that picked feature to one or more other logs, which may be associated with other wells in a field. As the propagation occurs, confidence information (e.g., confidence levels, etc.) may be rendered to a display and the user may select a well based at least in part on such information, for example, to cause the computing device or computing system to render a log associated with that well (e.g., a well log). As an example, a side by side rendering may be displayed such that a user can readily compare the log with the picked feature to the log that has been subject to propagation. In such an example, the user may decide to re-evaluate the propagation to that log and, for example, override by making a pick (e.g., a new pick, a new seed, etc.) for that log, which itself may optionally be propagated. Such a computer-implemented workflow can expedite an assessment of the Earth via acquired data (e.g., well log data). Such an assessment of the Earth can allow for issuing one or more signals to one or more devices, which may be field devices that can perform one or more operations at surface and/or downhole.

As an example, a GUI may render real-time propagation information such as connection links and confidence scores (e.g., levels, etc.) where the GUI can include a graphical control that may allow a user to terminate propagation or one or more portions thereof. For example, where low confidence levels are rendered for connection links of a propagation process in real-time, a user may click on a connection link to terminate it. Such an approach can be akin to trimming a branch of a growing tree. Such an approach can expedite propagation processing as to quality of results. In such an approach, while the propagation process is running, a graphical control can allow for selecting another seed and commencing propagation from that seed. For example, where a user terminates a branch (e.g., a connection link), the user may select a well of that branch or proximate thereto to be a seed. The process can then continue, for example, in parallel to the prior propagation process. As mentioned, one or more propagation processes may proceed in parallel. As an example, a computational framework may include a graphical control that can control computation speed, for example, to allow a user to intervene. As an example, the graphical control may be a slider control that allows a user to speed up and slow down computation speed. As an example, a graphical control can allow for pausing, rewinding and forwarding propagation.

Figure 16:
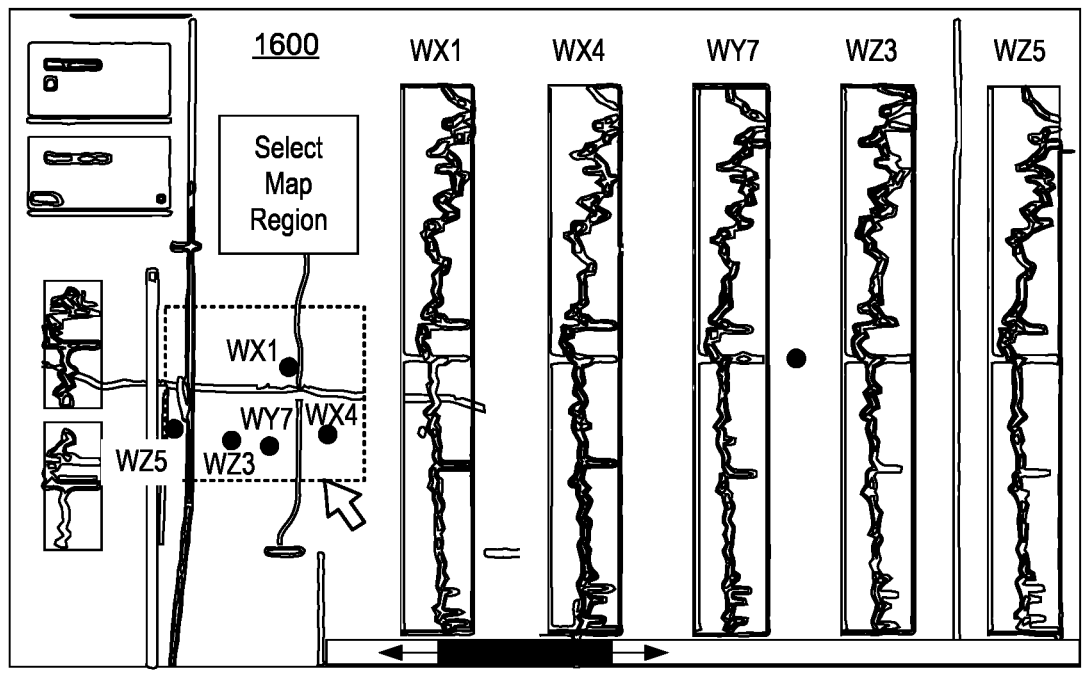
FIG. 16 illustrates an example of a graphical user interface (GUI) that includes a panel with logs for various wells.

FIG. 16 shows an example of a GUI 1600 with a map and logs. For example, a location or region may be selected on the map using a graphical control and one or more logs for one or more wells can be rendered. Where a region includes many wells, a scroll bar may be rendered to the display such that a user can scroll across a number of logs. As an example, the GUI 800 of FIG. 8, the GUI 900 of FIG. 9, etc., may include functionality as explained with respect to the GUI 1600 of FIG. 16. As an example, such functionality may be operable during execution of a propagation process. For example, a user may utilize one or more GUIs, graphical controls, etc., to assess results, "plant" a seed, etc., while a propagation process executes. In such an approach, a user can perform various tasks (e.g., quality control, etc.) during execution of a propagation process, which can make the user more productive (e.g., reduce a user's non-productive time).

Figure 17:
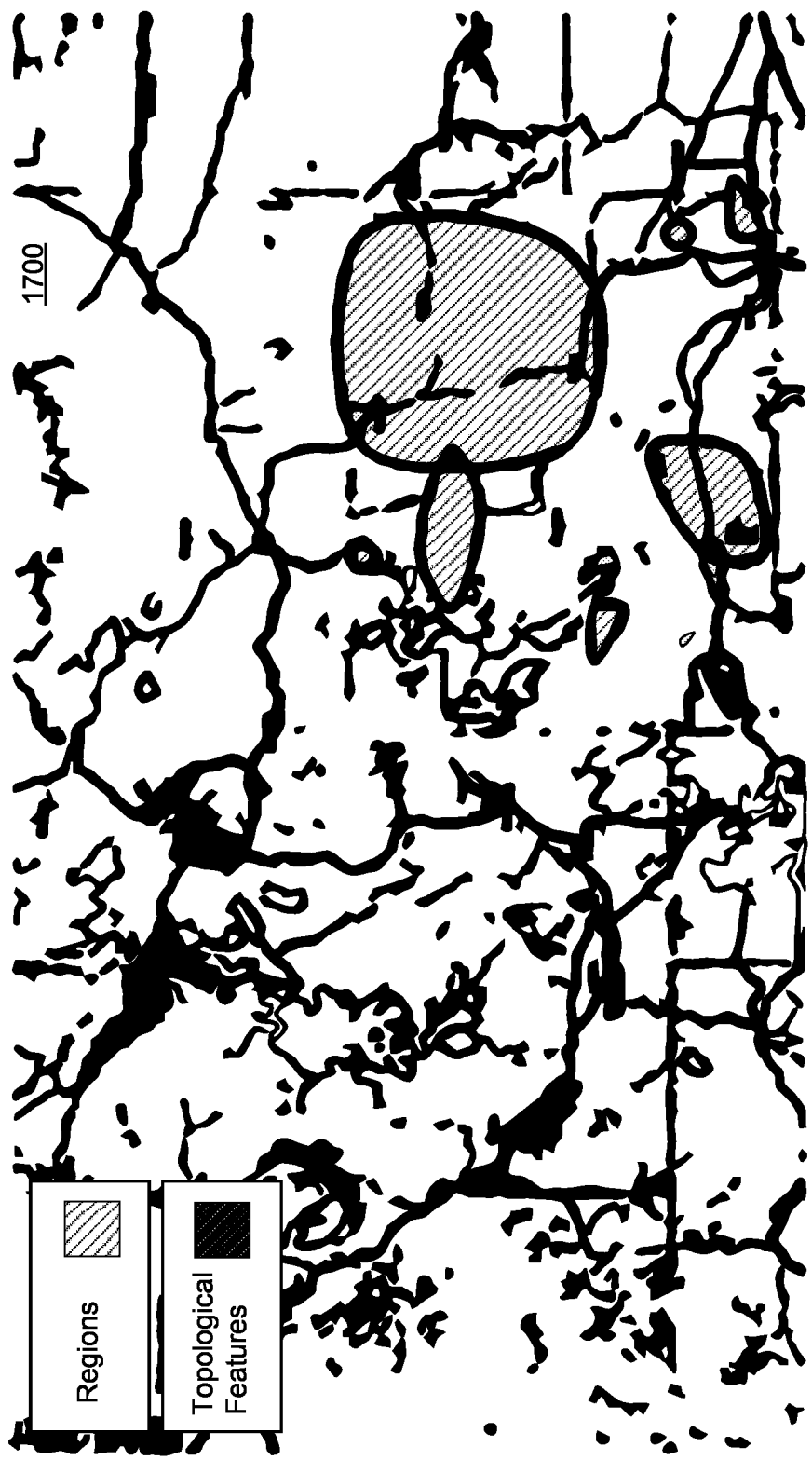
FIG. 17 illustrates an example of a graphical user interface (GUI) that includes a background map and well related information rendered thereon.

FIG. 17 shows an example of a GUI log view 1700. Various regions are identified as including logs (e.g., wells with logs). Such a GUI may be utilized to determine wells, region boundaries, etc., for performing a propagation process. As an example, a user may perform a search for a geographic region, see search results as in the GUI log view 1700 of FIG. 17 and then select one or more regions to perform propagation as to formation tops, etc.

FIGS. 18 to 41 show various examples of GUIs that illustrate various actions, which can be a portion of one or more workflows. In the example GUIs of FIGS. 18 to 41, various selections, actions, features, etc., are identified. In the examples, various distances are provided, which can depend on particular wells, fields, etc.

Figure 18:
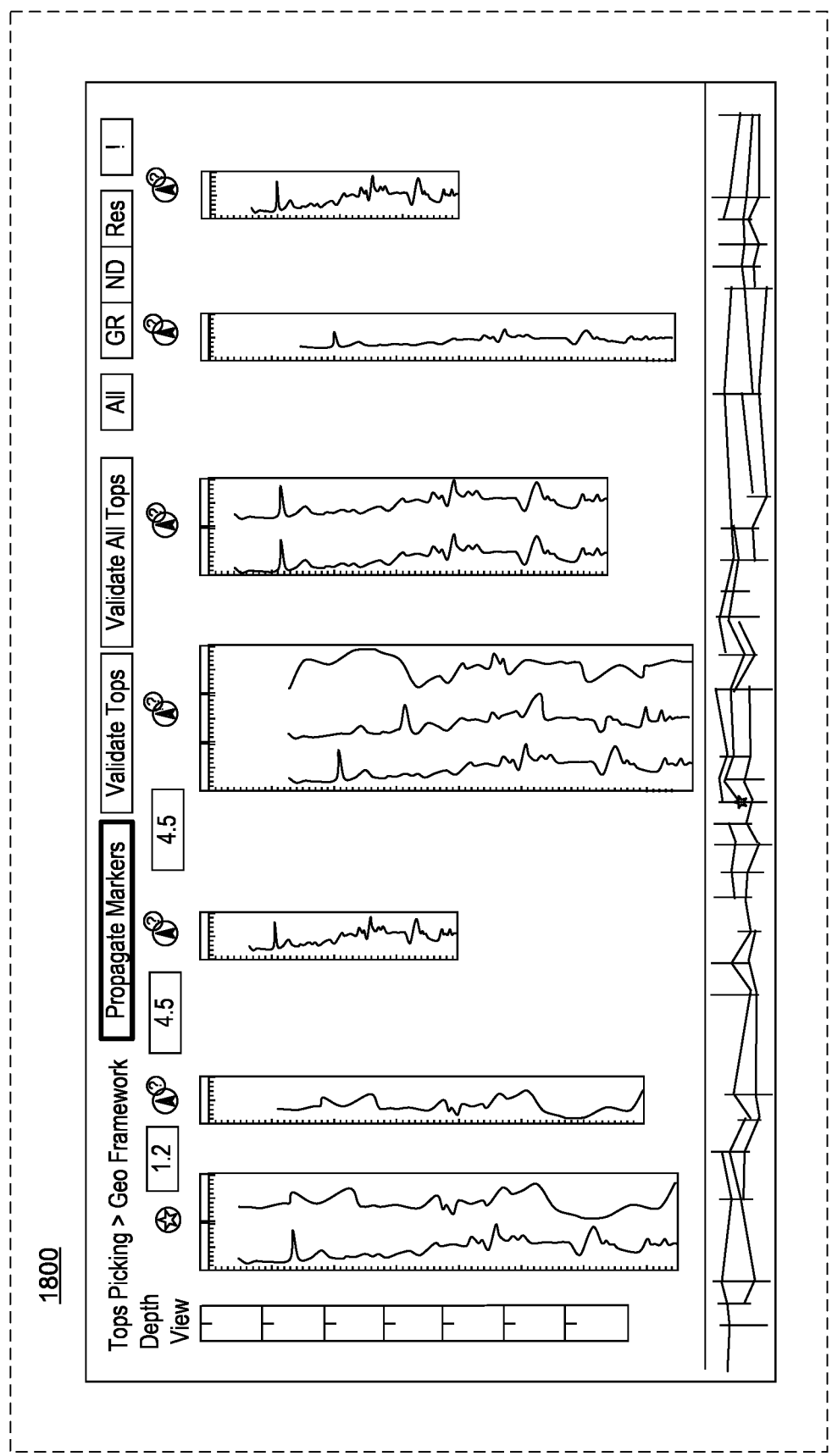
FIG. 18 illustrates an example of a graphical user interface (GUI) that includes various examples of logs for various wells where one of the wells is a selected well.

FIG. 18 illustrates an example of a graphical user interface (GUI) 1800 that includes various examples of logs for various wells where one of the wells is a selected well. The GUI 1800 includes a log panel and a strip panel where the log panel includes logs for a number of wells that correspond to wells in the strip panel. The strip panel is shown as including more wells than in the log panel. The strip panel can include an adjustable window or adjustable windows where logs for wells in the one or more adjustable windows can be rendered in the log panel. As shown some of the logs in the log panel include log information from one or more logging techniques (e.g., from different sensors, etc.). In the examples shown, the log panel includes a selected well with two individual logs, a well at a distance of 1.2 miles with a single log, a well at a distance of 4.5 miles with a single log, a well with a distance of 4.5 miles with three individual logs, a well with an unmarked distance with two individual logs, a well with an unmarked distance with a single log and a well with an unmarked distance with a single log.

The GUI 1800 also includes various graphical controls such as, for example, a propagate markers graphical control, a validate tops graphical control, a validate "all" tops graphical control, and log type selector graphical controls (e.g., "all", gamma ray (GR), neutron density (ND), resistivity (Res), etc.). As shown, the GUI 1800 can be part of a framework with a navigable architecture. As shown, the GUI 1800 can include a depth view graphic, which can include one or more graphical controls.

As an example, the GUI 1800 can be utilized to commence a method for propagating markers. For example, one or more markers of the selected well (see star symbol) can be propagated to one or more of the other wells via their corresponding one or more logs.

Figure 19:
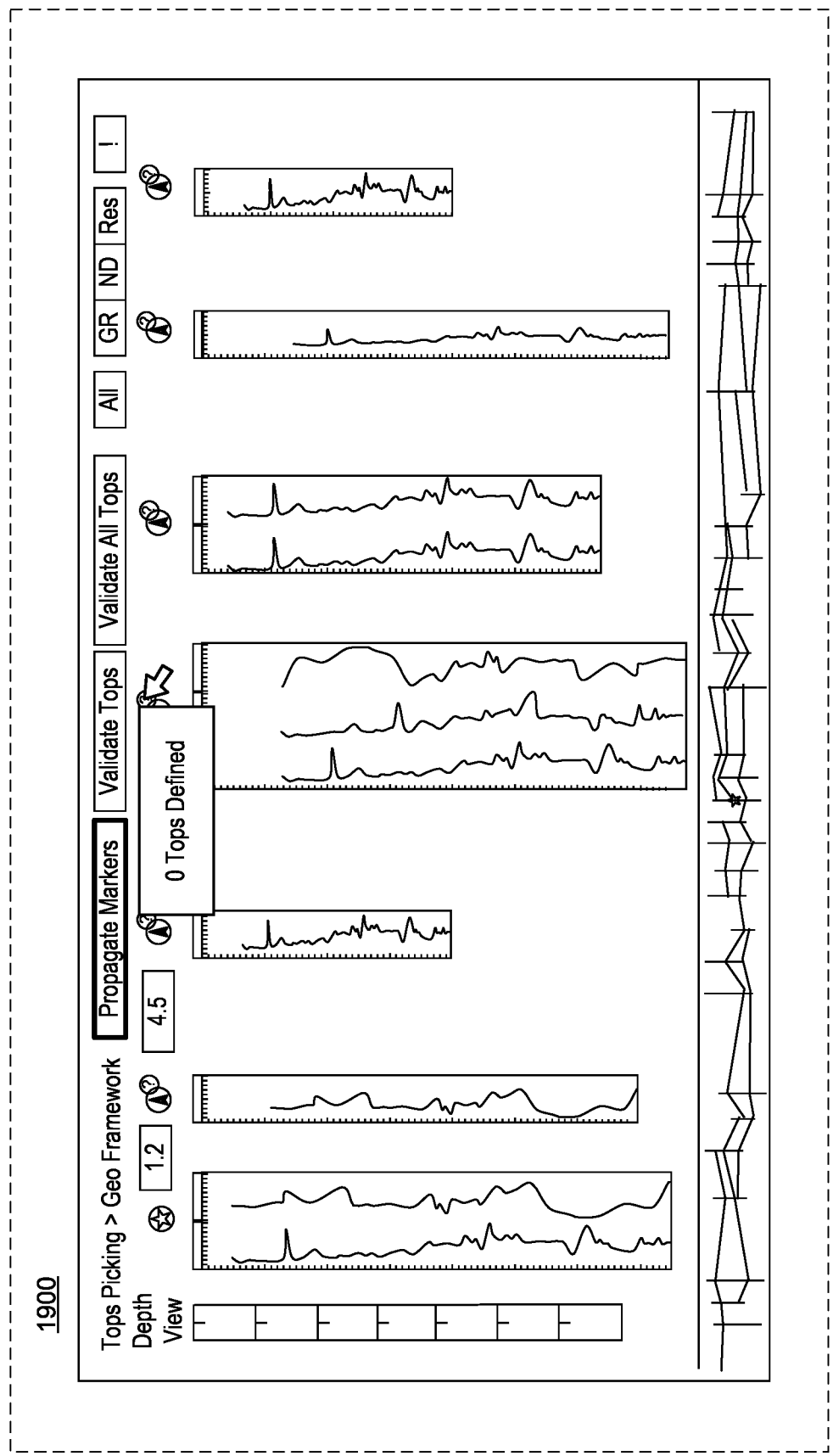
FIG. 19 illustrates an example of a graphical user interface (GUI) that includes the logs and wells of FIG. 18 and a graphical control associated with one of the wells.

FIG. 19 illustrates an example of a graphical user interface (GUI) 1900 that includes the logs and wells of FIG. 18 and a graphical control associated with one of the wells. Specifically, the graphical control indicates that a particular well with a number of logs does not have defined formation tops.

Formation tops can be defined via true vertical depths (TVD) in a well (e.g., measured in distance below a reference elevation) at which one or more of various formations may be found; noting, that in the case of the glacial drift, the "top" is actually the bottom or base of the drift where "base of drift" is the depth of the bedrock surface at the well. Various wells may have associated data in digital form and/or in "paper" form. For example, an old well may have a log recorded on paper. Various types of logs in one or more forms may be accessed from one or more databases, which can include one or more digital databases. As an example, a GUI can include one or more graphical controls for accessing digital log data for rendering to a display, for example, as log data with respect to depth (e.g., with respect to a reference elevation, etc.).

As an example, a database can include information such as elevations, formation codes, formation tops, method obtained, and reference point codes. Such information can be provided along with a location identifier, which may be a name, latitude and longitude, an American Petroleum Institute (API) number, etc. As an example, as to elevations, consider a parameter "Elev_KB", which is a drilling rig's kelly bushing (see, e.g., the kelly drive bushing 319) elevation, or a parameter "Elev_DF", which is a drilling floor elevation (e.g., of a drilling rig or a derrick). As to formation codes, consider, for example, American Association of Petroleum Geologists codes (AAPG_Cd) or one or more other types of codes. As to method obtained, such information can include logging related information (e.g., logging tool, etc.).

In the example of FIG. 19, the well with the three individual logs may be a well for which formation top identification (e.g., picking) has not yet occurred (e.g., or fully occurred) and, for example, for which an automated approach is to be implemented. For example, an automated approach can include propagating known formation log information from a selected well to a well with one or more logs where formation tops have not been identified or for which a re-identification is desired and/or further identification is desired. As an example, a tool may have associated processing equipment that may perform an initial, automated top picking. Where such information is available, the GUI 1900 may include a graphical control for rendering of previously picked information as to one or more formation tops. As explained, a propagation approach can act to "spread" across a geographic subsurface region to identify how a formation top or formation tops vary spatially over the geographic subsurface region. Such an approach can be, for example, a neighbor to neighbor approach.

Figure 20:
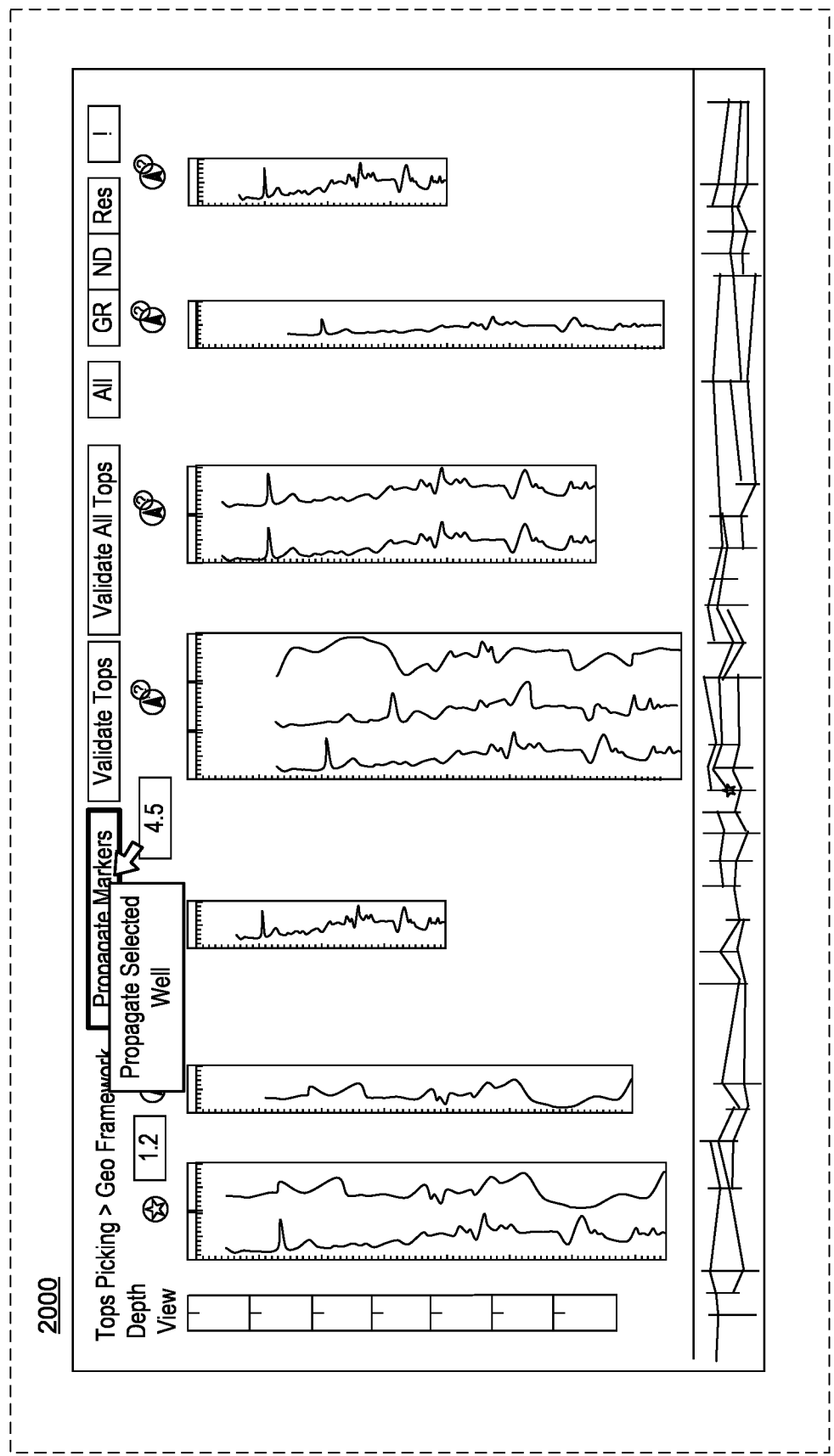
FIG. 20 illustrates an example of a graphical user interface (GUI) that includes the logs and wells of FIG. 18 and a graphical control for propagating information of the selected well to one or more of the other wells.

FIG. 20 illustrates an example of a graphical user interface (GUI) 2000 that includes the logs and wells of FIG. 18 and a graphical control for propagating information of the selected well to one or more of the other wells.

Figure 21:
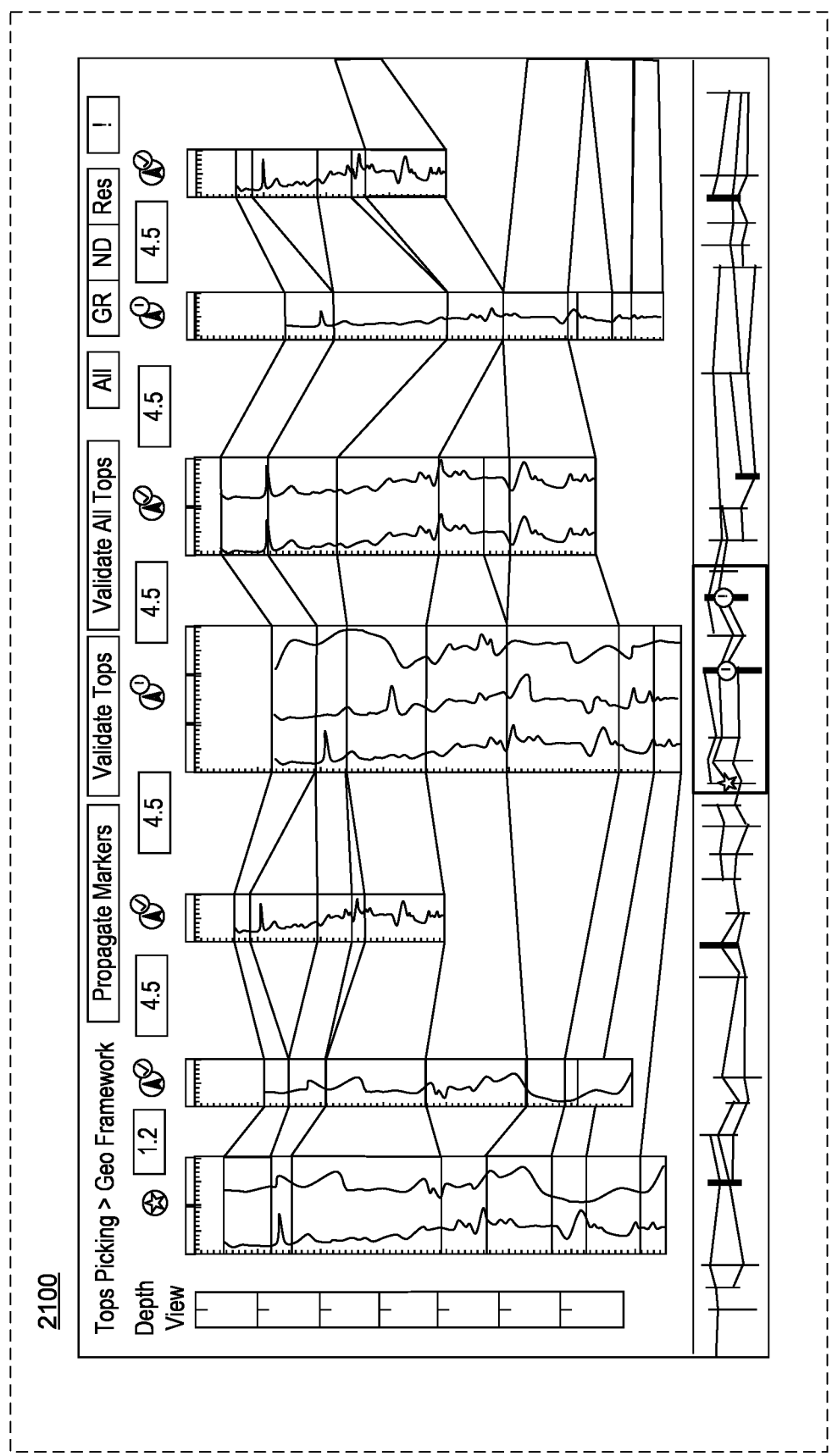
FIG. 21 illustrates an example of a graphical user interface (GUI) that includes the logs and wells of FIG. 18 where graphics indicate how information is propagated from the selected well to the other wells.

FIG. 21 illustrates an example of a graphical user interface (GUI) 2100 that includes the logs and wells of FIG. 18 where graphics indicate how information is propagated from the selected well to the other wells. Specifically, the GUI 2100 shows how formation tops of the selected well have been utilized as seeds for propagation across a subsurface geographic region that includes wells with logs where the logs are analyzed in a neighbor to neighbor approach to identify formation tops. As shown in FIG. 21, the GUI 2100 provides spatial information, as indicate via distance indicators for each of the wells (e.g., neighboring distances).

The GUI 2100 also provides information as to particular issues that may exist. For example, where uncertainty of a formation top of a well found by propagation is high, the GUI 2100 can render an indicator such as, for example, an exclamation point. In the example of FIG. 21, the GUI 2100 also renders well markers as thicker where uncertainty is an issue. While line thickness is illustrated, one or more other techniques may be utilized (e.g., color, blinking, etc.) to highlight one or more uncertainty issues. While the GUI 2100 is shown in black and white, colors may be utilized to represent formation information. For example, different layers may be represented via different colors.

Figure 22:
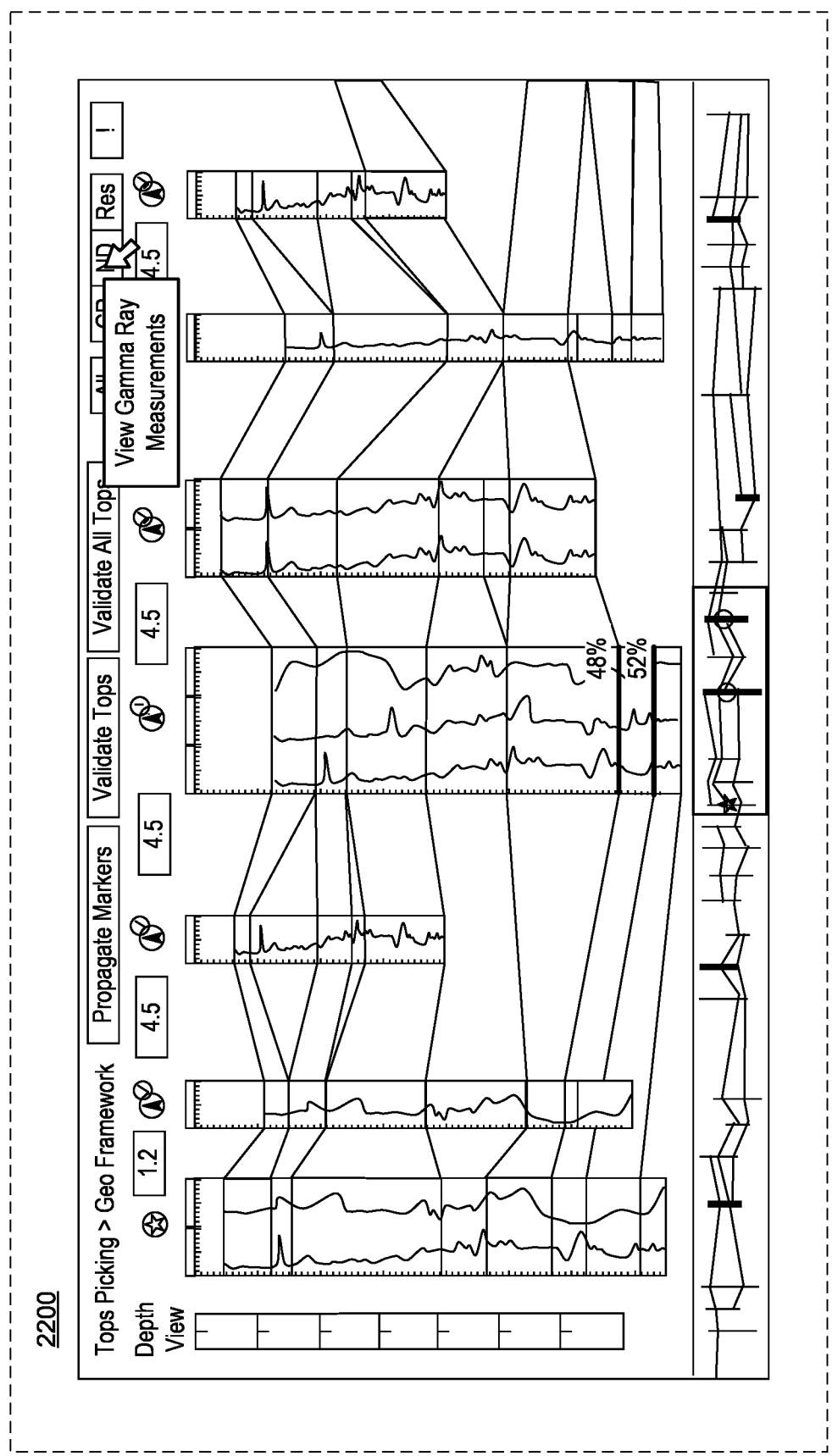
FIG. 22 illustrates an example of a graphical user interface (GUI) that includes the logs and wells and information of FIG. 21 and confidence information.

FIG. 22 illustrates an example of a graphical user interface (GUI) 2200 that includes the logs and wells and information of FIG. 21 and confidence information. FIG. 22 also shows selection of a graphical control for viewing gamma ray (GR) log data. For example, the confidence information (e.g., or uncertainty information or certainty information) may be for GR logs. For example, the propagation approach may utilize GR log information and the GUI 2200 can provide for rendering information associated with GR-based propagation.

Figure 23:
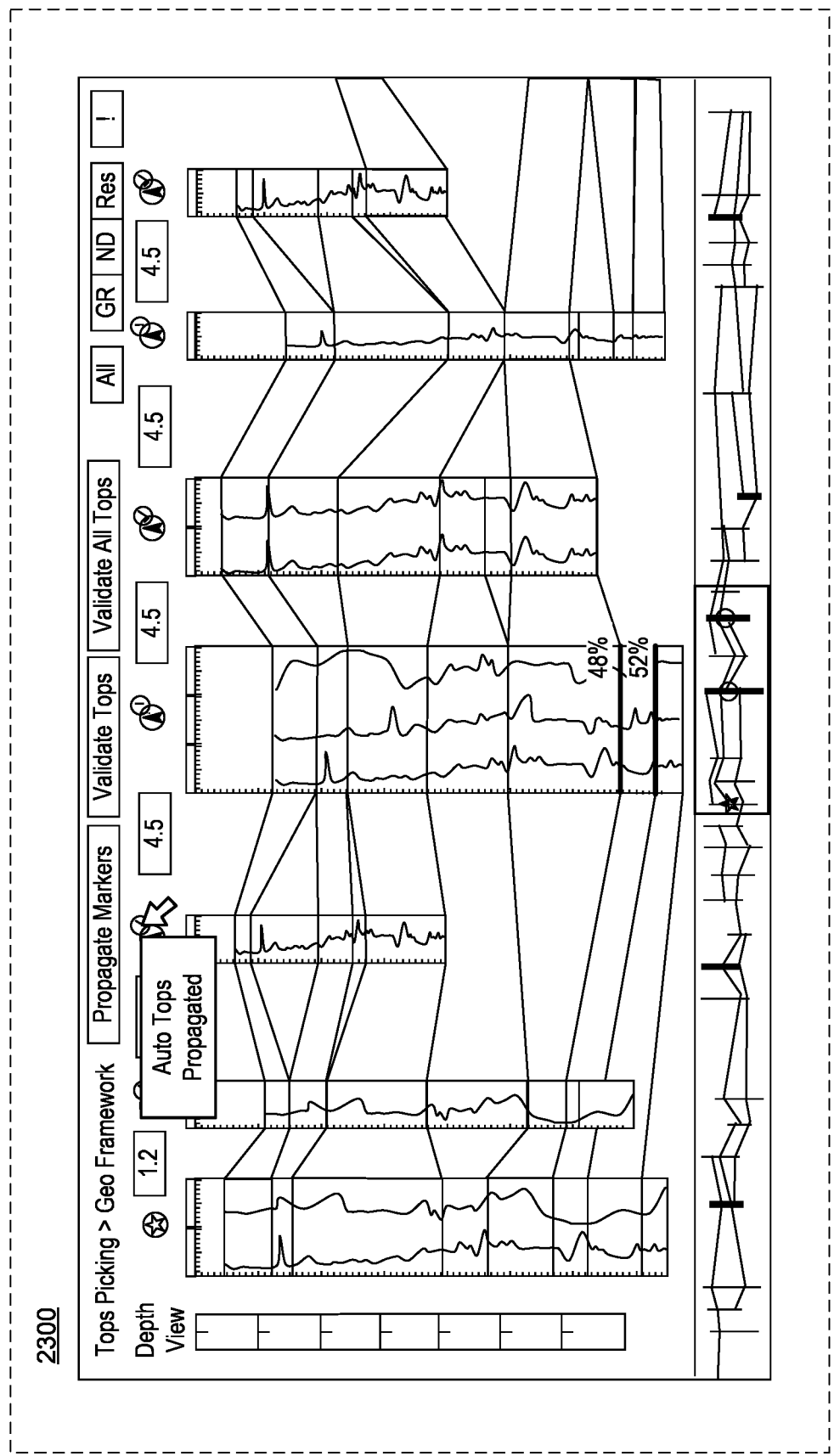
FIG. 23 illustrates an example of a graphical user interface (GUI) that includes the logs and wells and information of FIG. 22 and a graphical control for rendering information about tops of one of the wells.

FIG. 23 illustrates an example of a graphical user interface (GUI) 2300 that includes the logs and wells and information of FIG. 22 and a graphical control for rendering information about tops of one of the wells. Specifically, the GUI 2300 shows that one of the wells has its tops defined by automated propagation.

Figure 24:
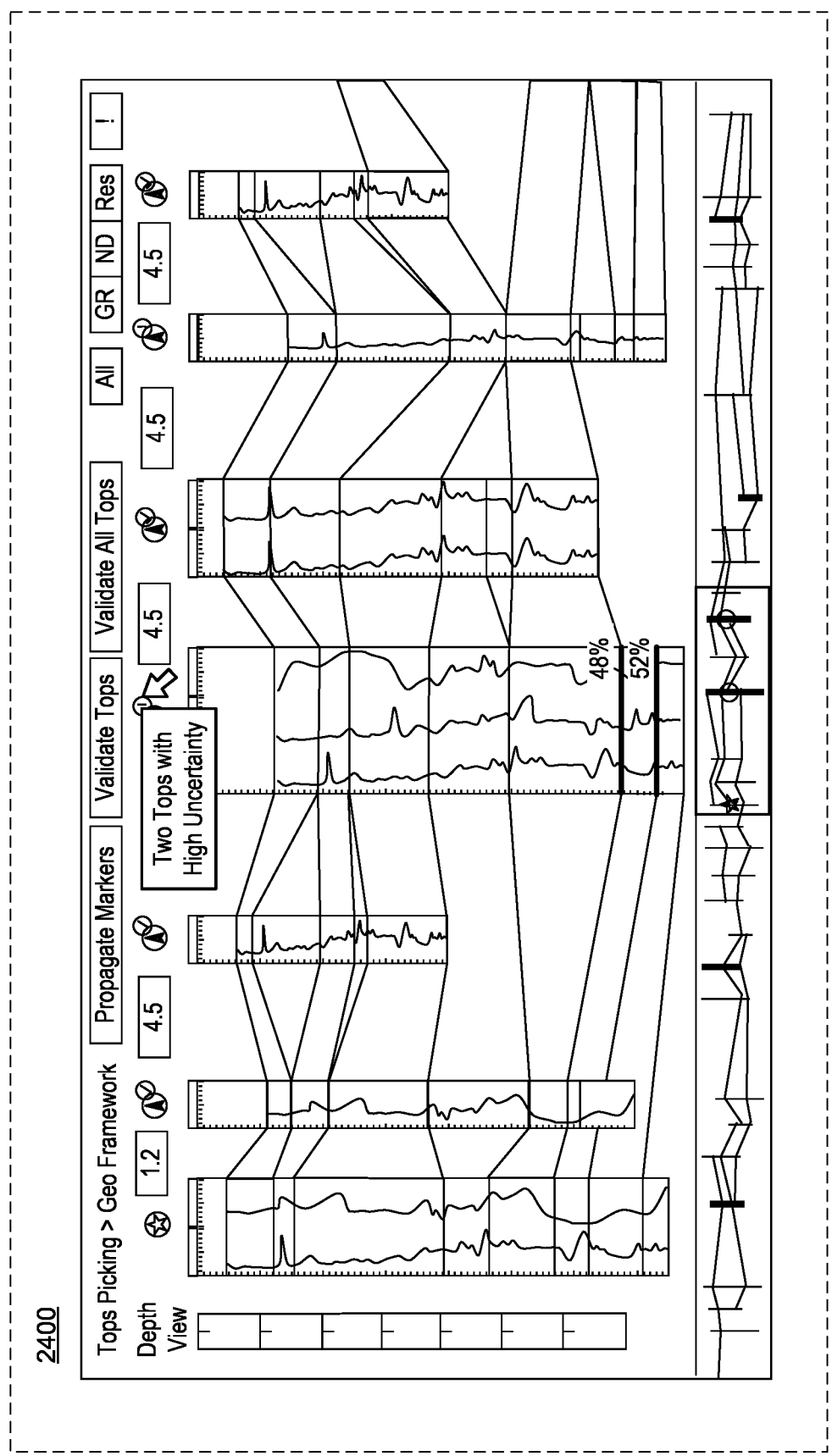
FIG. 24 illustrates an example of a graphical user interface (GUI) that includes the logs and wells and information of FIG. 22 and a graphical control for rendering uncertainty information about tops of one of the wells.

FIG. 24 illustrates an example of a graphical user interface (GUI) 2400 that includes the logs and wells and information of FIG. 22 and a graphical control for rendering uncertainty information about tops of one of the wells. Specifically, the GUI 2400 shows that one of the wells has two formation tops with high levels of uncertainty (e.g., above an uncertainty limit value). In the example of FIG. 24, the values are given in percent as 48% and 52%, which can be certainty values for respective depths of two formation tops. As an example, a limit may be set at approximately 75% certainty. Certainty may be a confidence score (see, e.g., FIG. 12) that is transformed from a range of 0 to 1 to a range of 0% to 100%. A certainty limit may be a confidence score limit that is transformed from a value within a range from 0 to 1 to a value in a range from 0% to 100%. The GUI 2400 of FIG. 24 also shows the particular well in the strip panel as having a thicker line that indicates that one or more formation tops are lacking certainty (e.g., confidence). In the strip panel, a star indicates the selected well in the log panel, which is identified with a star.

Figure 25:
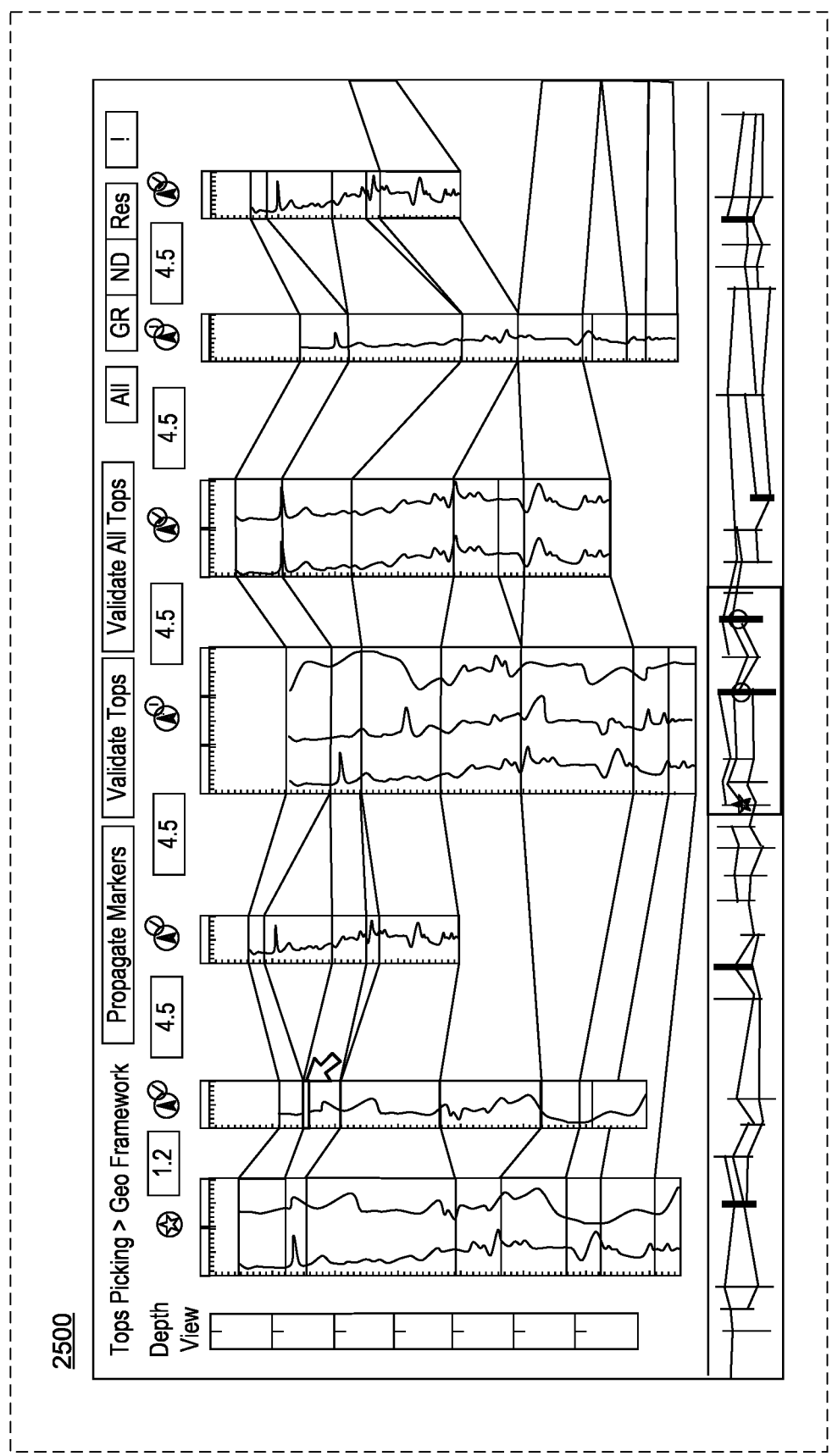
FIG. 25 illustrates an example of a graphical user interface (GUI) that includes the logs and wells of FIG. 24 and a graphical control that selects a portion of a log of one of the wells.

FIG. 25 illustrates an example of a graphical user interface (GUI) 2500 that includes the logs and wells of FIG. 24 and a graphical control that selects a portion of a log of one of the wells. Specifically, a formation top region of the well that is 1.2 miles from the well with the star is selected using the graphical control. The graphical control can allow user to edit (e.g., adjust) one or more formation tops, for example, to move a formation top up or down, to delete a formation top, to add a formation top, etc.

Figure 26:
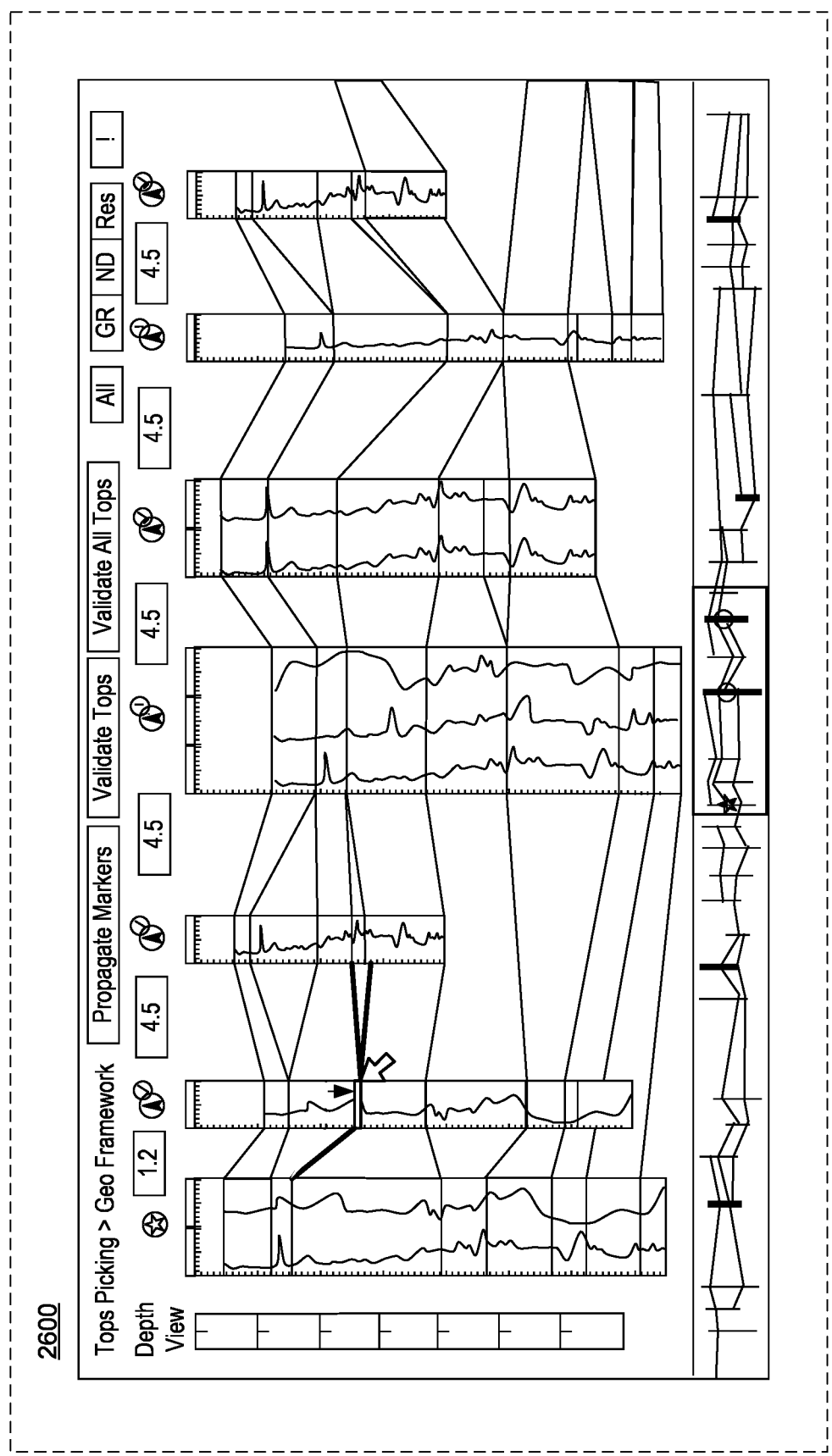
FIG. 26 illustrates an example of a graphical user interface (GUI) that includes the logs and wells of FIG. 25 and a graphical control that selects another portion of the log of the one of the wells.

FIG. 26 illustrates an example of a graphical user interface (GUI) 2600 that includes the logs and wells of FIG. 25 and the graphical control that is used to select another portion of the log of the one of the wells. As shown in the example of FIG. 26, one or more connections are adjusted responsive to use of the graphical control to edit the well. As shown, connections can be adjusted in multiple directions, from a parent well to a child well. The GUIs 2500 and 2600 illustrate a process of moving a formation top downwardly to a deeper depth, which may be performed with reference to one or more logs. For example, in the GUI 2500 the formation top that is adjusted is in a valley of the log and in the GUI 2600 the formation top is moved to correspond approximately to a peak of the log. In the GUIs 2500 and 2600, a user can visually inspect the formation tops and connections as well as one or more logs to determine that an adjustment is appropriate. The workflow in the GUIs 2500 and 2600 shows that one formation layer is made thicker via the adjustment of the selected formation top and that an adjacent formation layer is made thinner (i.e., the one immediately below) while the corresponding connections to the parent and the child are adjusted accordingly. While the workflow shows enlarging a formation layer and shrinking an adjacent formation layer or one or more other formation layer/formation top adjustments may be performed.

Figure 27:
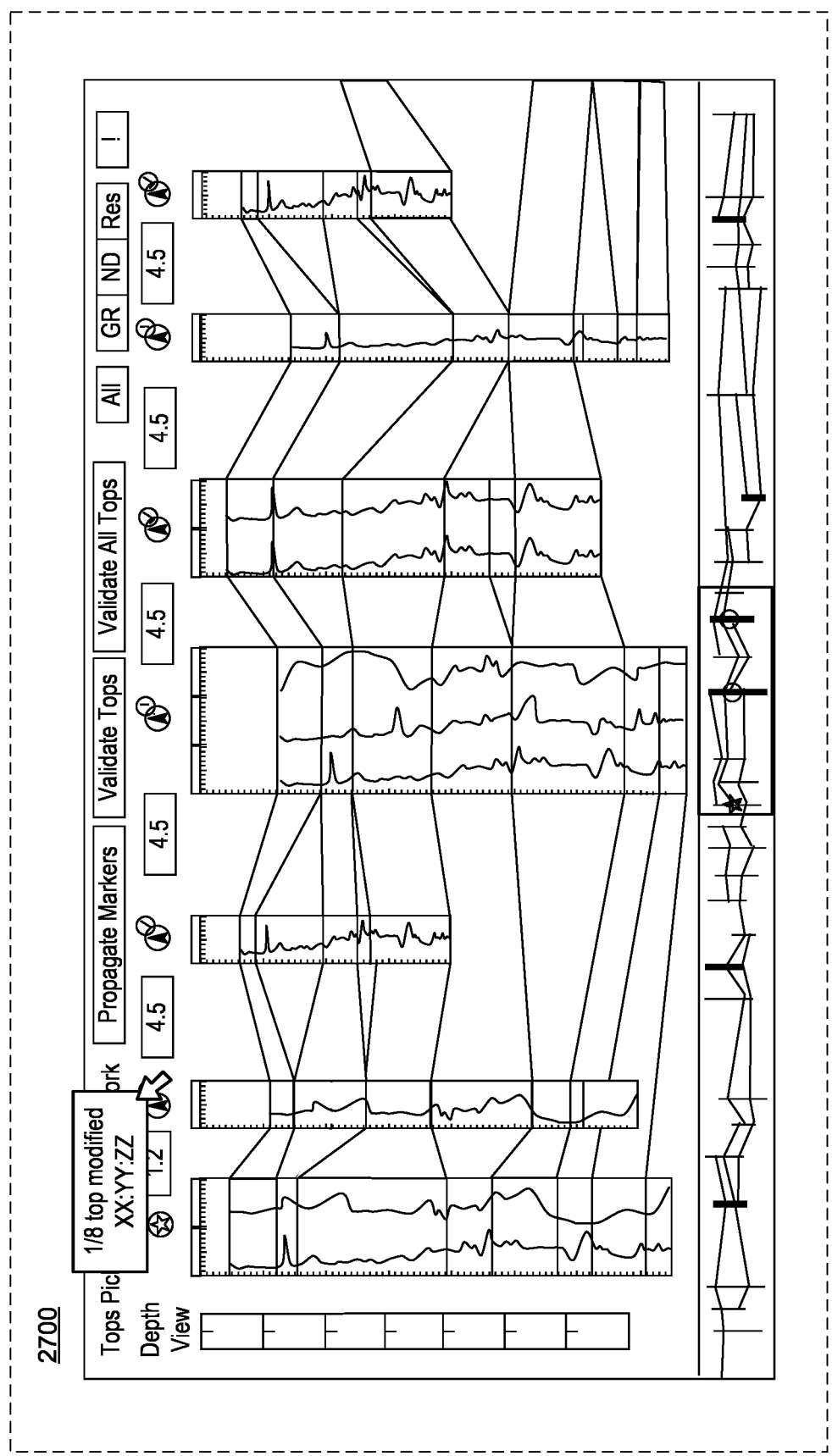
FIG. 27 illustrates an example of a graphical user interface (GUI) that includes the logs and wells of FIG. 26 and a graphical control for rendering information about a modified top of the one of the wells.

FIG. 27 illustrates an example of a graphical user interface (GUI) 2700 that includes the logs and wells of FIG. 26 and a graphical control for rendering information about a modified top of the one of the wells. As shown, the graphical control renders information concerning one of eight formation tops being modified on a particular date (e.g., and optionally a particular time, a particular user, etc.).

Figure 28:
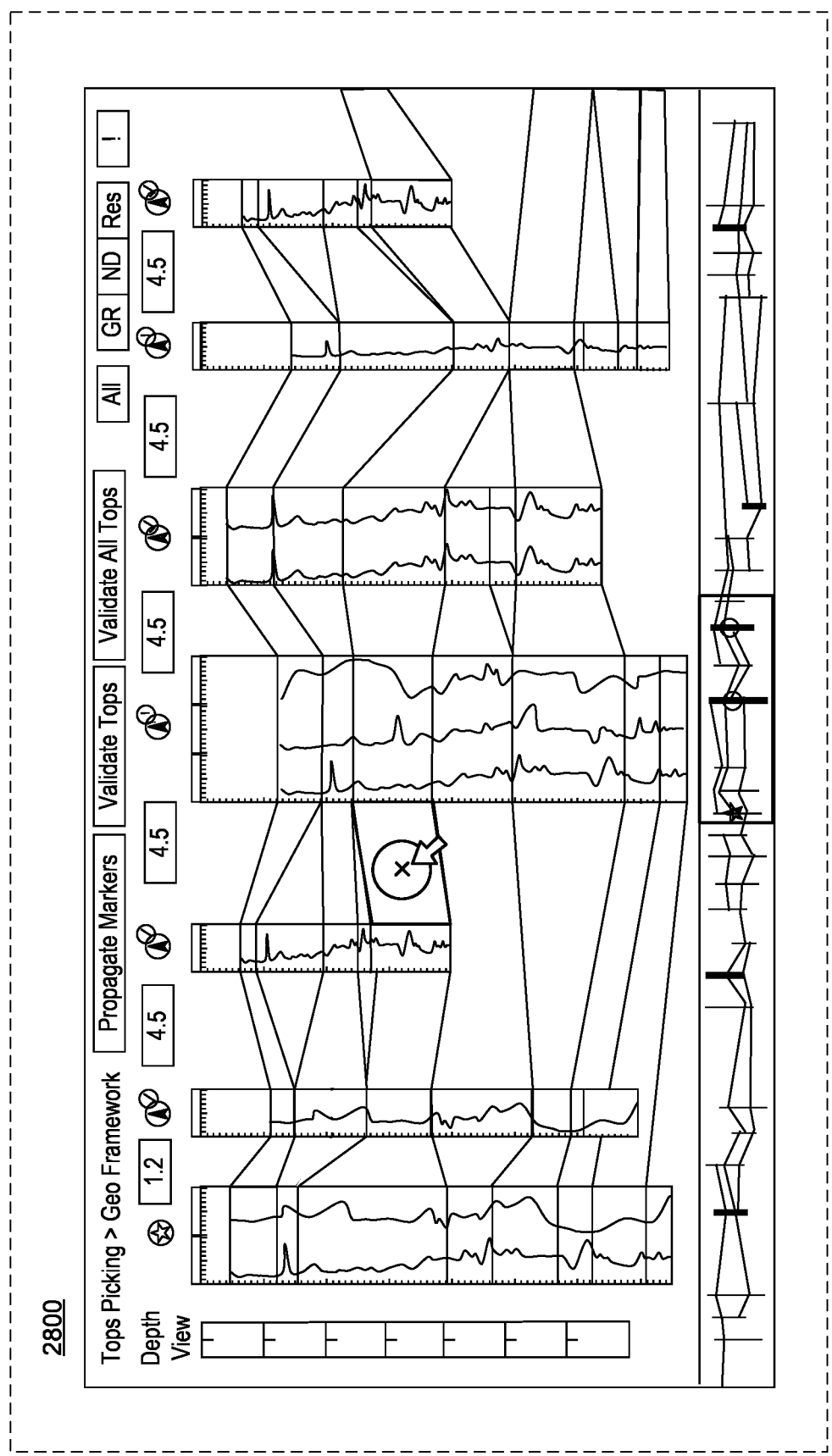
FIG. 28 illustrates an example of a graphical user interface (GUI) that includes various examples of logs for various wells of FIG. 27 and a graphical control for editing one or more connections between wells.

FIG. 28 illustrates an example of a graphical user interface (GUI) 2800 that includes various examples of logs for various wells of FIG. 27 and a graphical control for editing one or more connections between wells. Specifically, in the example of FIG. 28, a zone is selected that is a connection zone defined by an upper connection between formation tops in logs of two wells and a lower connection between formation tops in logs of two wells.

Figure 29:
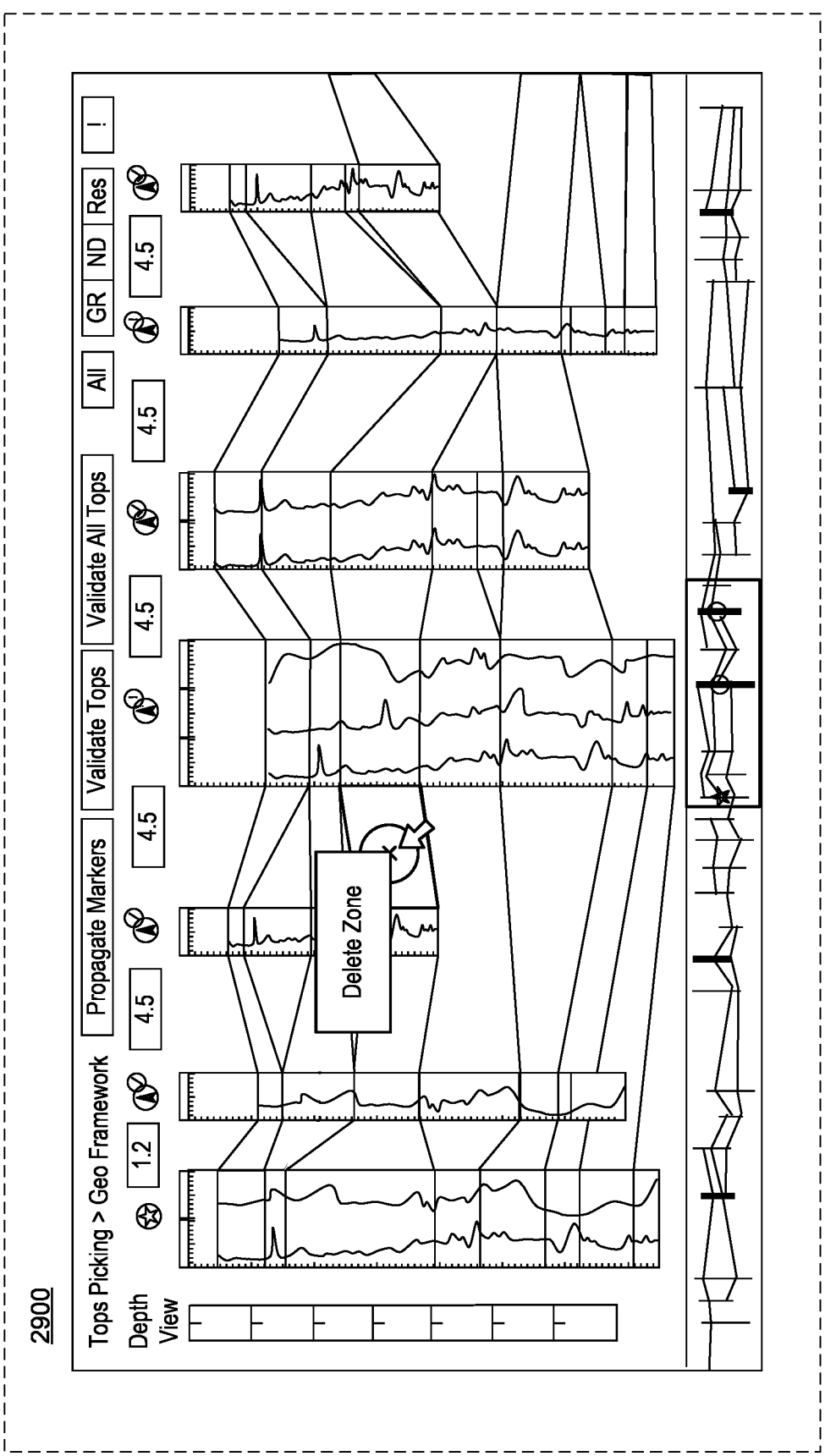
FIG. 29 illustrates an example of a graphical user interface (GUI) that includes various examples of logs for various wells of FIG. 28 and the graphical control for deleting one or more connections between wells.

FIG. 29 illustrates an example of a graphical user interface (GUI) 2900 that includes various examples of logs for various wells of FIG. 28 and the graphical control for deleting one or more connections between wells. For example, consider a right click of a mouse that can cause rendering of a menu with menu items as options for control actions where one action can be to delete a selected zone.

Figure 30:
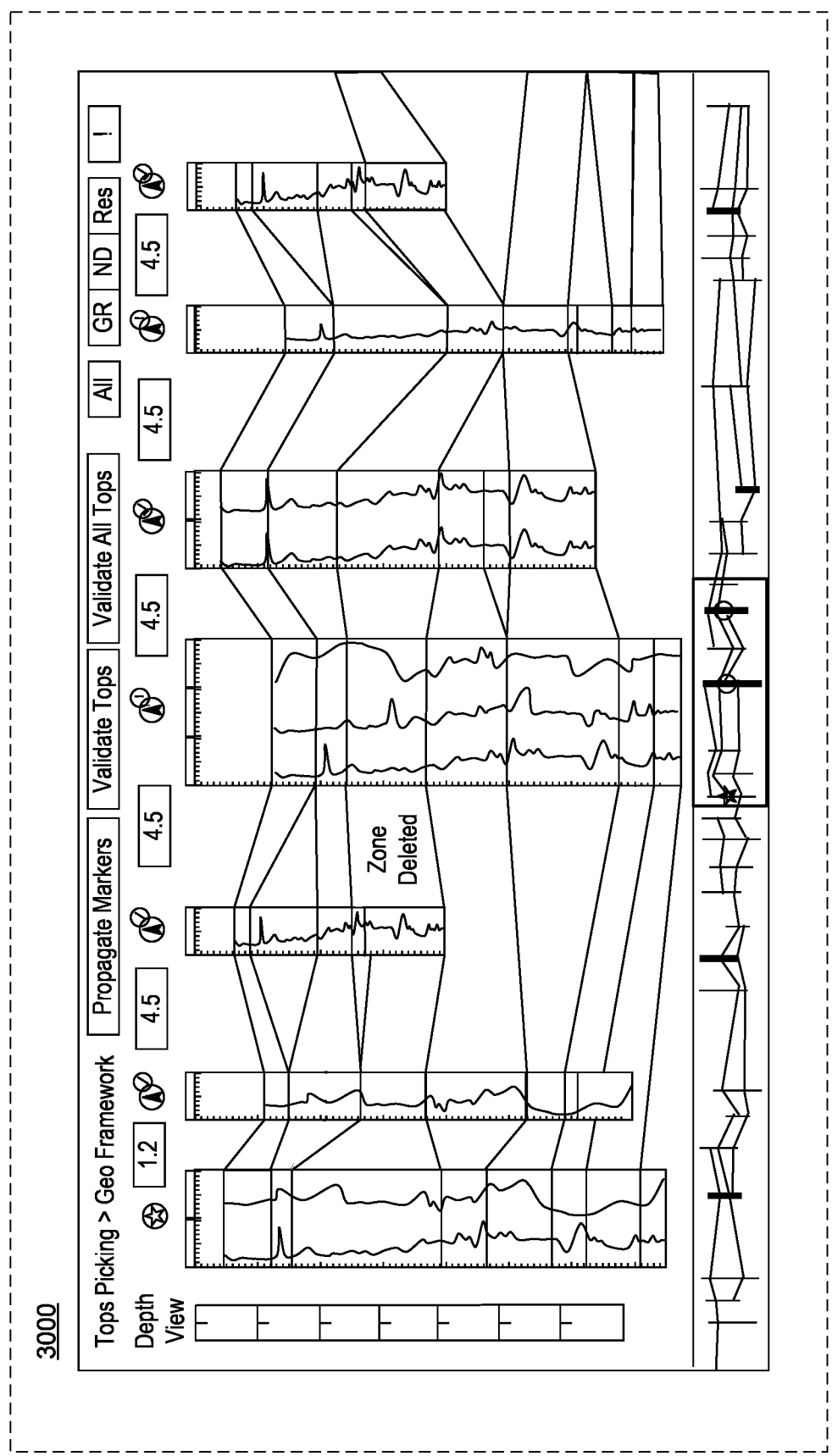
FIG. 30 illustrates an example of a graphical user interface (GUI) that includes various examples of logs for various wells of FIG. 29 where one or more connections are deleted between wells.

FIG. 30 illustrates an example of a graphical user interface (GUI) 3000 that includes various examples of logs for various wells of FIG. 29 where one or more connections are deleted between wells according to the deletion of the selected zone per a workflow as illustrated in the GUIs 2800 and 2900.

Figure 31:
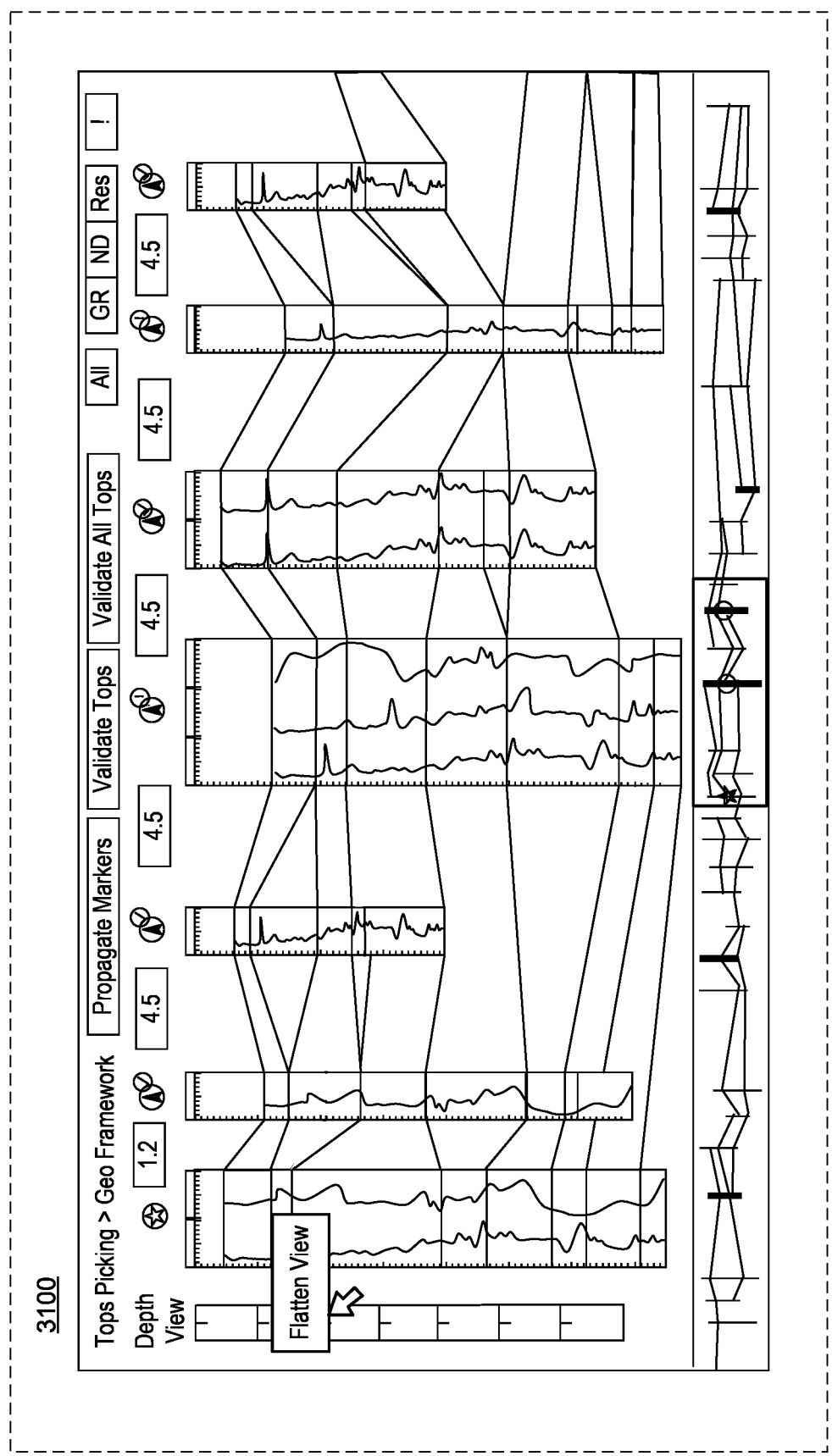
FIG. 31 illustrates an example of a graphical user interface (GUI) that includes the logs and wells of FIG. 26 and a graphical control for a flattening operation.

FIG. 31 illustrates an example of a graphical user interface (GUI) 3100 that includes the logs and wells of FIG. 26 and a graphical control for a flattening operation. The graphical control is illustrated as being performed with respect to the depth view of the GUI 3100.

Figure 32:
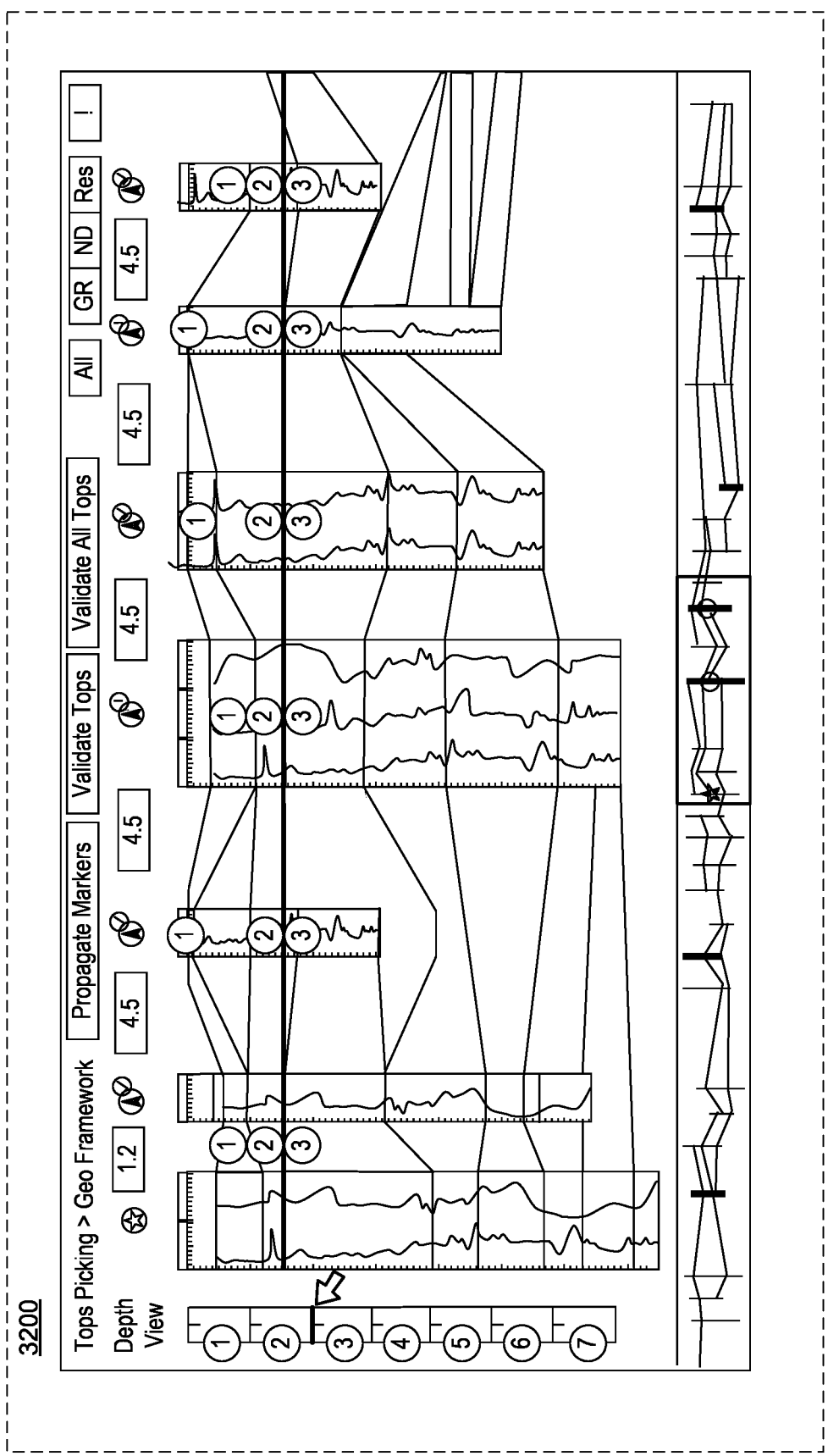
FIG. 32 illustrates an example of a graphical user interface (GUI) that includes the logs and wells of FIG. 31 as adjusted per the flattening operation.

FIG. 32 illustrates an example of a graphical user interface (GUI) 3200 that includes the logs and wells of FIG. 31 as adjusted per the flattening operation. Specifically, the depth view shows seven formation layers with corresponding formation tops. The graphical control has selected the formation top of the third layer, which can be an approximate formation bottom position of the second layer. In the flattening operation, the logs of the wells are adjusted such that the formation top of the third layer is rendered at a common position such that a horizontal line can be drawn across the logs, for example, to allow for visual inspection, quality control, etc., of the formation top selected (e.g., the boundary between the second and third formation layers).

Figure 33:
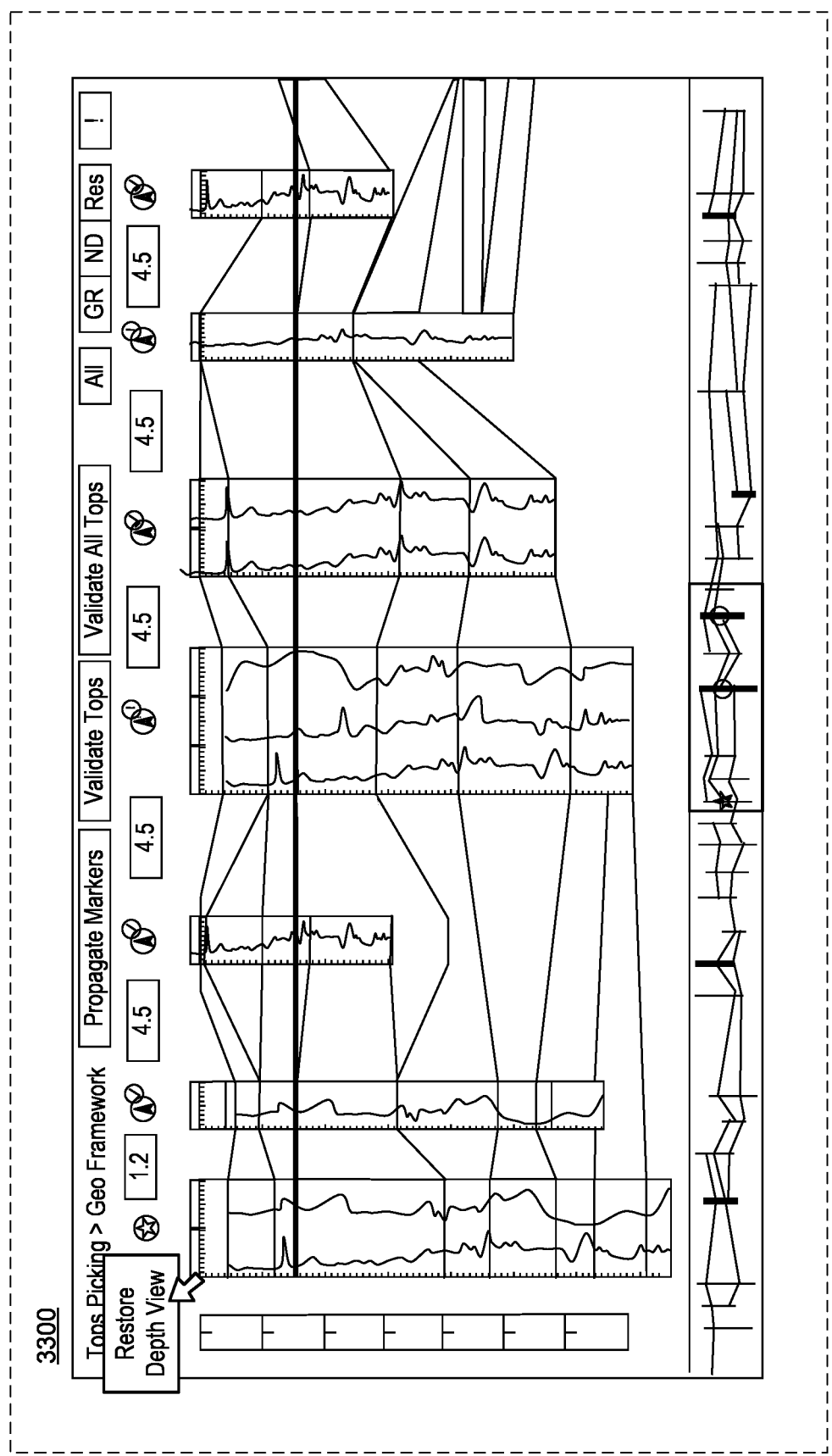
FIG. 33 illustrates an example of a graphical user interface (GUI) that includes the logs and wells of FIG. 32 and a graphical control for a restoration of a depth view operation.

FIG. 33 illustrates an example of a graphical user interface (GUI) 3300 that includes the logs and wells of FIG. 32 and a graphical control for a restoration of a depth view operation.

Figure 34:
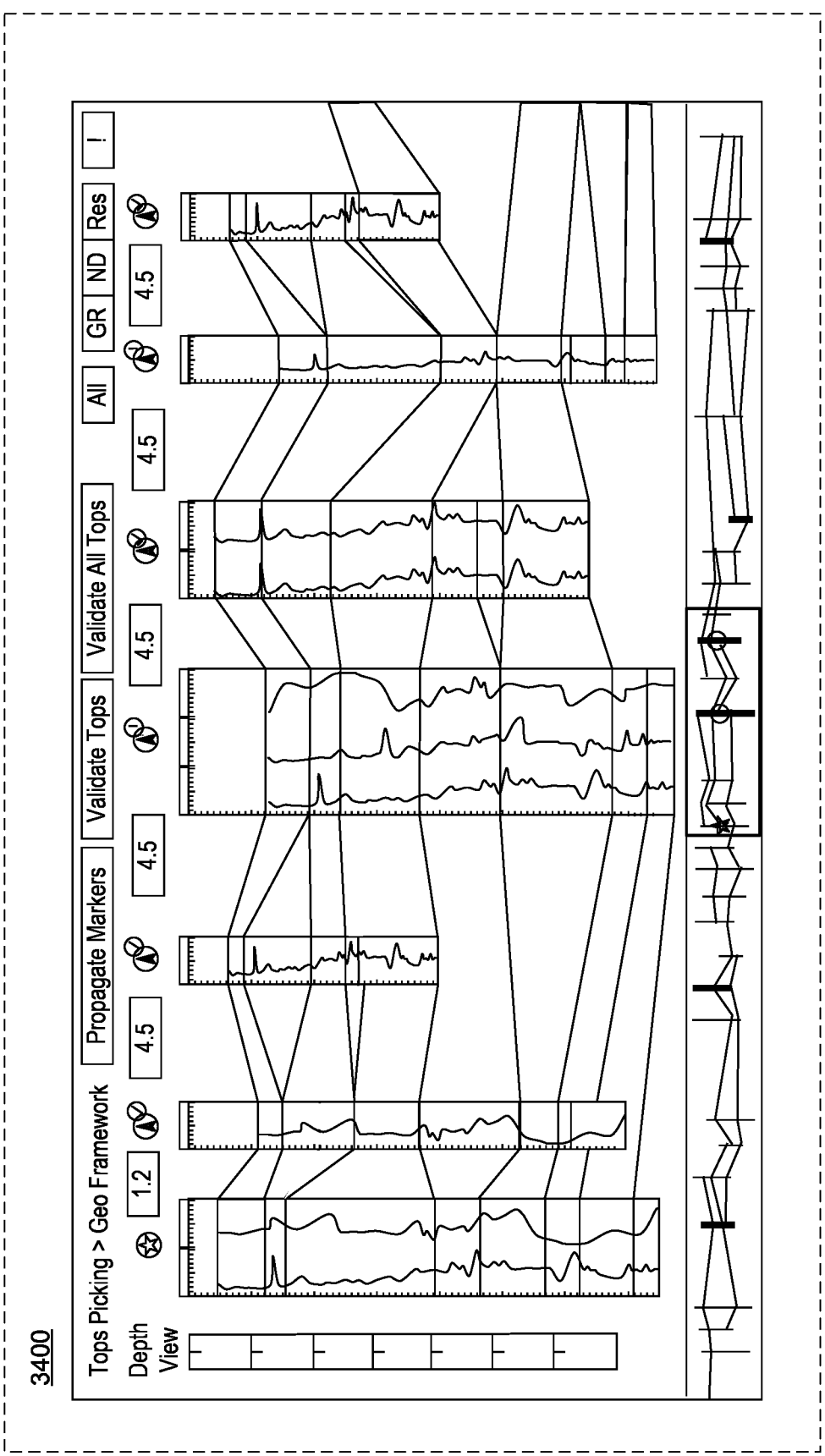
FIG. 34 illustrates an example of a graphical user interface (GUI) that includes the logs and wells of FIG. 33 as restored per the restoration of the depth view operation.

FIG. 34 illustrates an example of a graphical user interface (GUI) 3400 that includes the logs and wells of FIG. 33 as restored per the restoration of the depth view operation.

Figure 35:
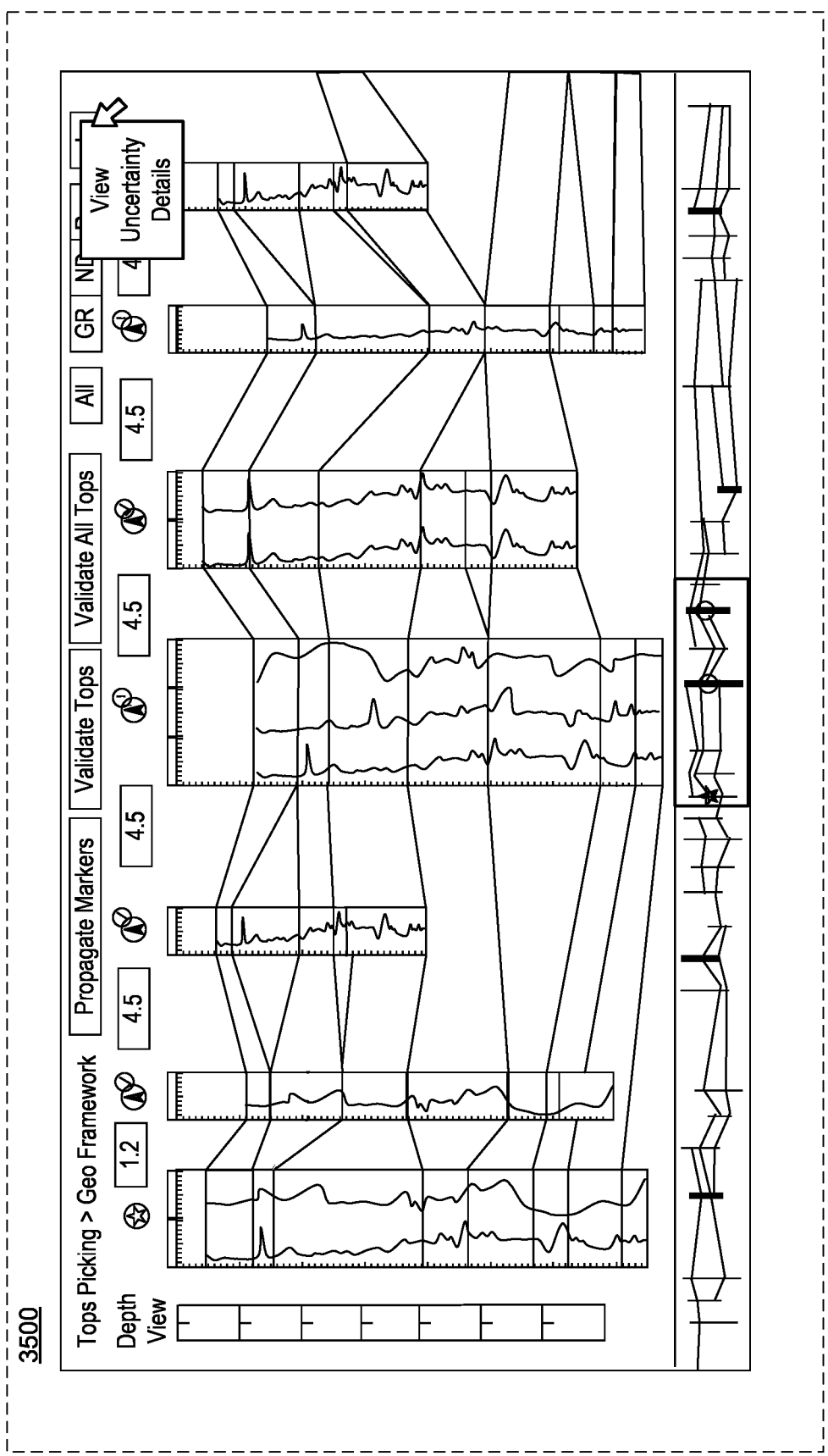
FIG. 35 illustrates an example of a graphical user interface (GUI) that includes the logs and wells of FIG. 26 and a graphical control for uncertainty information.

FIG. 35 illustrates an example of a graphical user interface (GUI) 3500 that includes the logs and wells of FIG. 26 and a graphical control for uncertainty information, which can be confidence information (e.g., confidence scores, etc.).

Figure 36:
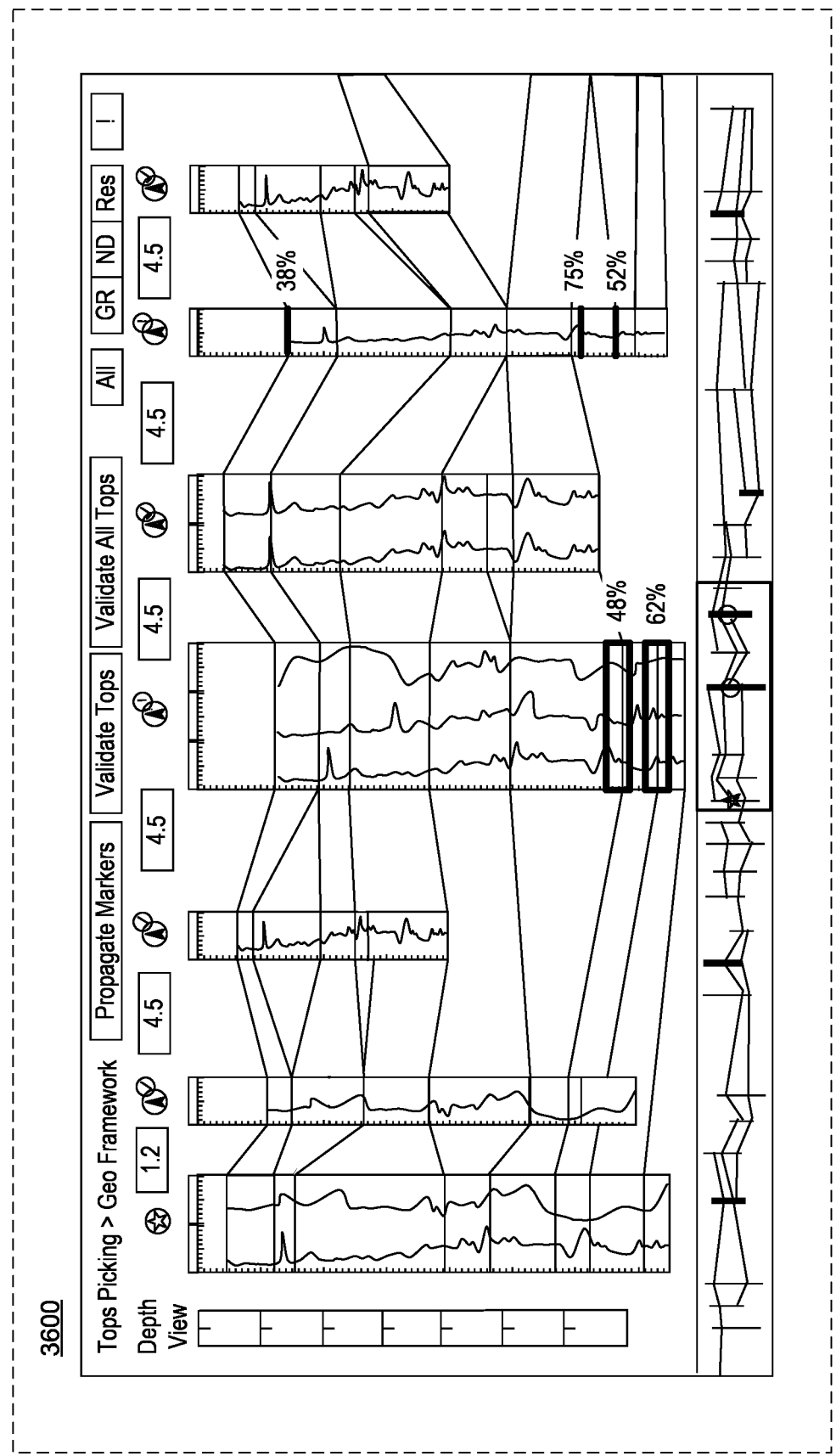
FIG. 36 illustrates an example of a graphical user interface (GUI) that includes the logs and wells of FIG. 35 and rendered uncertainty information.

FIG. 36 illustrates an example of a graphical user interface (GUI) 3600 that includes the logs and wells of FIG. 35 and rendered uncertainty information. As shown in the example of FIG. 36, the information may be rendered for a formation top and/or a formation top region. Various examples of values are shown, which, as explained, can be based on confidence scores (see, e.g., FIG. 12). Such information can facilitate quality control operations that can aim to more accurately determine locations of formations in a subsurface geographic region. As an example, a user may select a log and perform editing of one or more formation tops. As mentioned, a tool may include equipment that can perform an automated process or, for example, a framework may include one or more features for processing a log to identify a formation top and a location of the formation top. A user may perform a workflow that utilizes the GUI 3600 for one or more actions to more accurately generate locations of formation tops in a subsurface geographic region that includes a plurality of wells.

Figure 37:
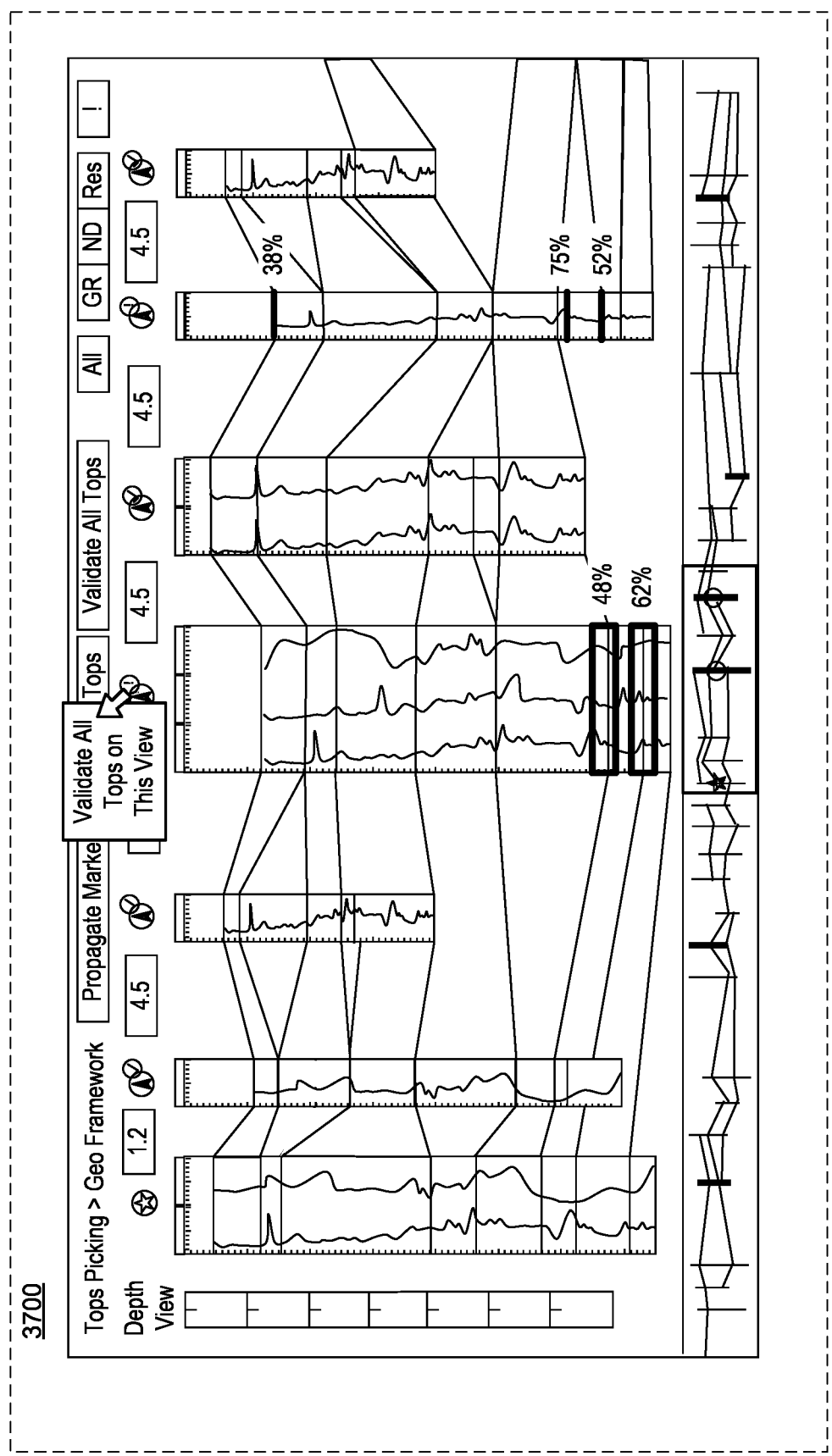
FIG. 37 illustrates an example of a graphical user interface (GUI) that includes the logs and wells of FIG. 36 and a graphical control for validating tops in the rendered view.

FIG. 37 illustrates an example of a graphical user interface (GUI) 3700 that includes the logs and wells of FIG. 36 and a graphical control for validating tops in the rendered view. As mentioned, the strip panel can include an adjustable window where wells in the window are rendered in the log panel. In the example of FIG. 37, the validation control can be utilized to validate the wells in the log panel. A workflow may include moving the window of the strip panel such that another view is rendered to the log panel with one or more different wells. A workflow may be an iterative process where a user can adjust a strip panel window to perform operations as to a plurality of formation tops for a plurality of wells in a geographic region.

Figure 38:
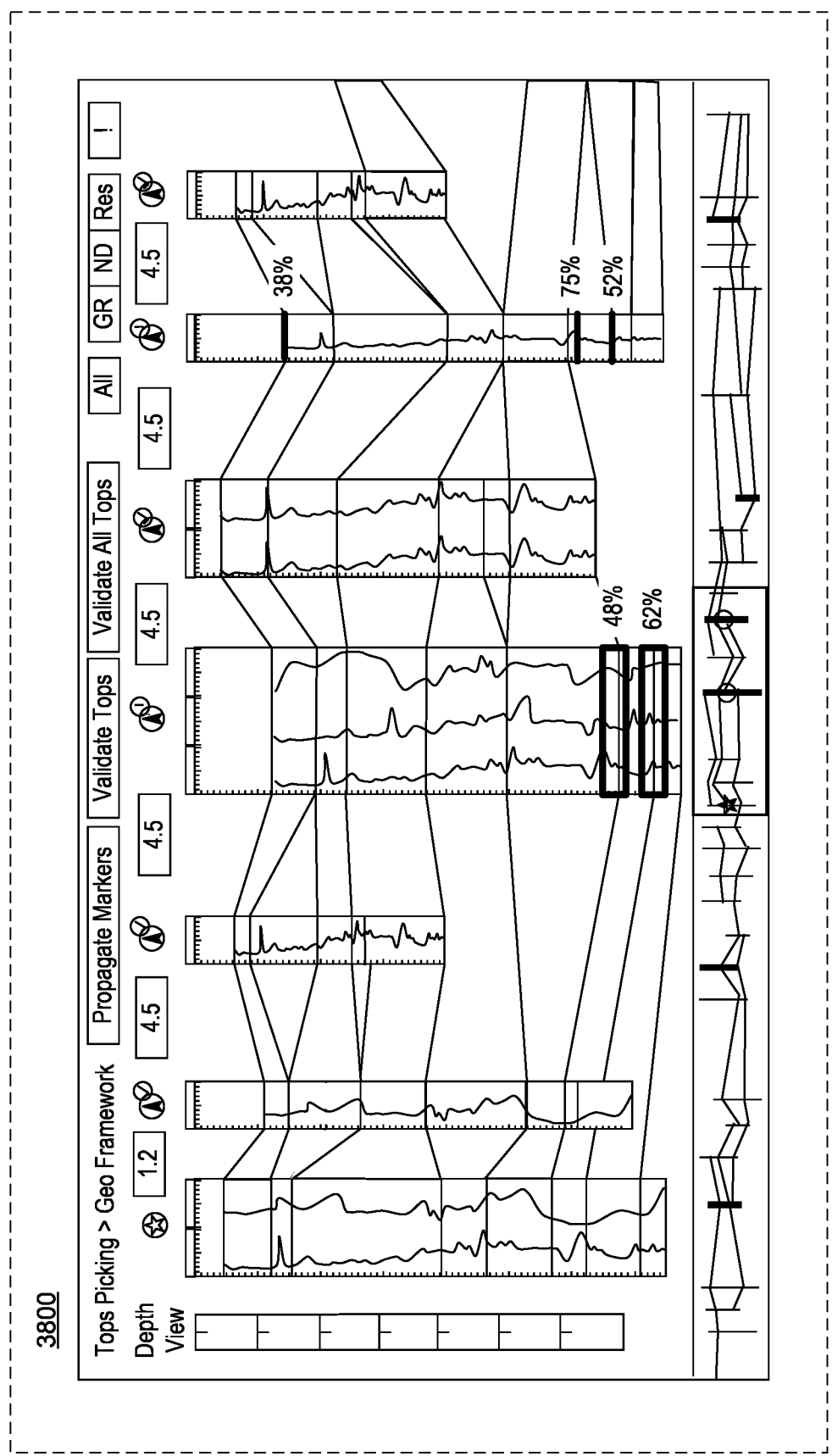
FIG. 38 illustrates an example of a graphical user interface (GUI) that includes examples of logs and wells in a log panel that correspond to logs and wells in a strip panel that includes an adjustable window.

FIG. 38 illustrates an example of a graphical user interface (GUI) 3800 that includes examples of logs and wells in a log panel that correspond to logs and wells in a strip panel that includes an adjustable window.

Figure 39:
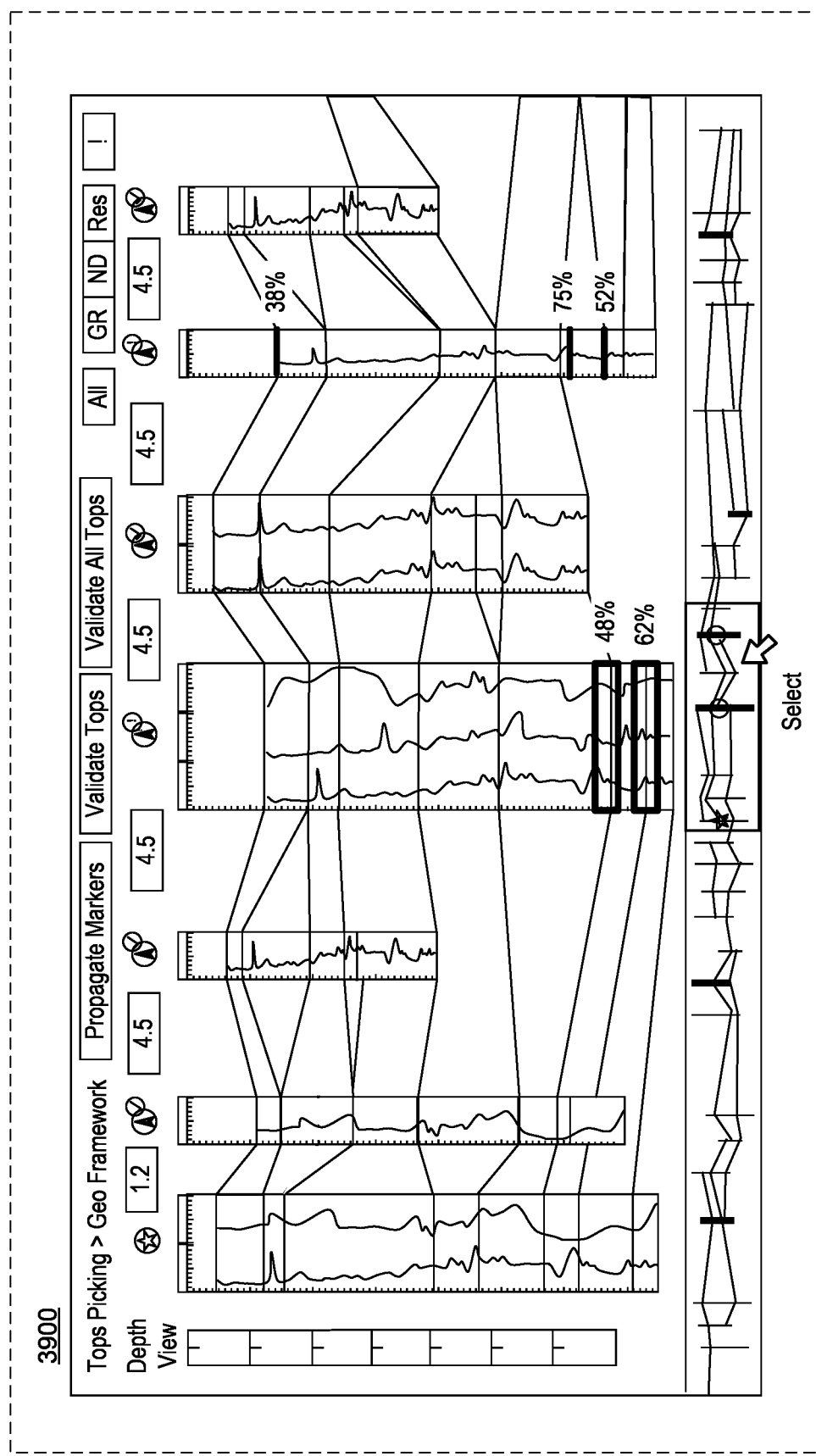
FIG. 39 illustrates an example of a graphical user interface (GUI) that includes examples of logs and wells in the log panel of FIG. 38 that correspond to logs and wells in the strip panel of FIG. 38 and a graphical control for adjusting the adjustable window.

FIG. 39 illustrates an example of a graphical user interface (GUI) 3900 that includes examples of logs and wells in the log panel of FIG. 38 that correspond to logs and wells in the strip panel of FIG. 38 and a graphical control for adjusting the adjustable window.

Figure 40:
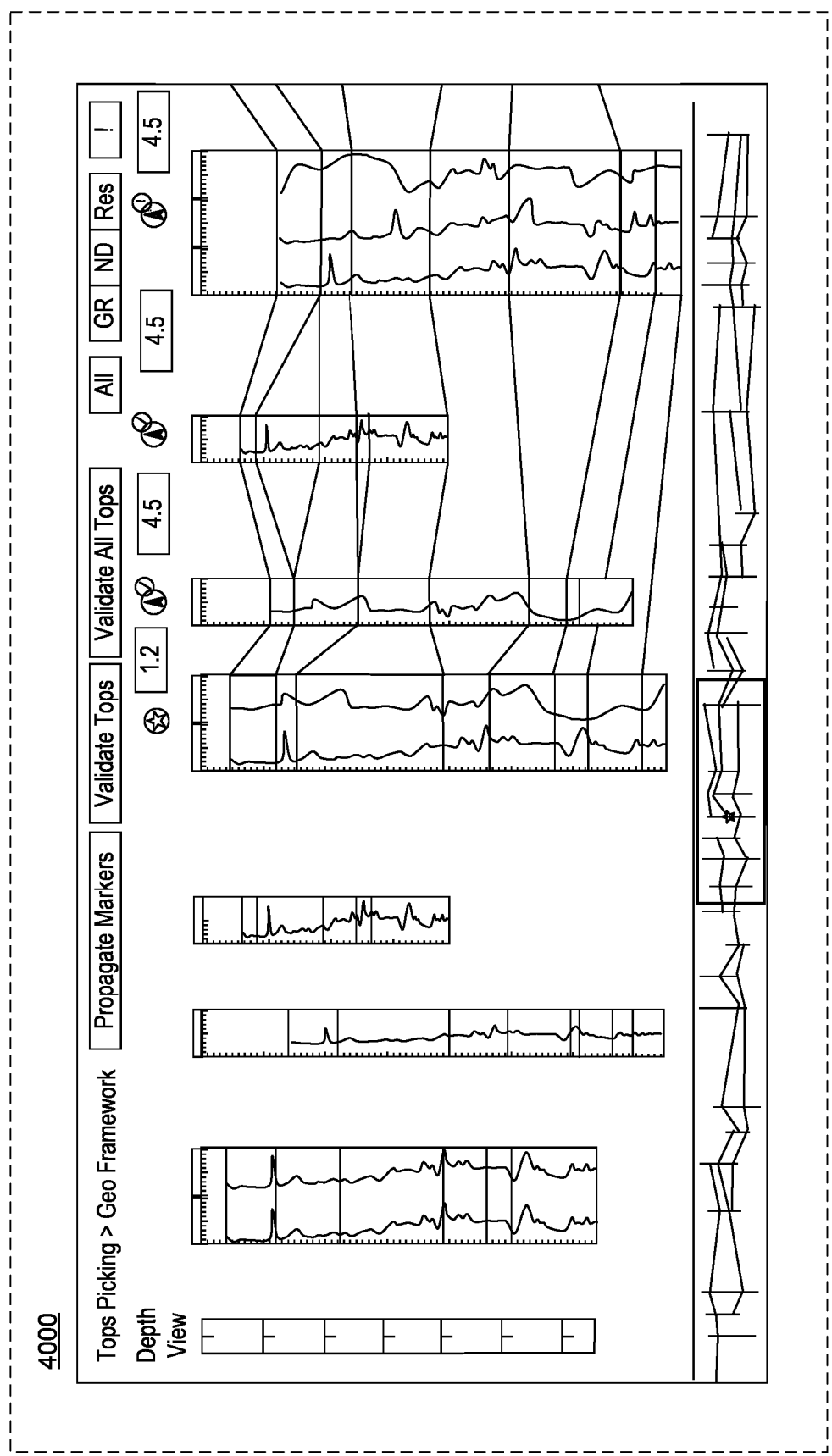
FIG. 40 illustrates an example of a graphical user interface (GUI) that includes examples of logs and wells in a log panel that correspond to logs and wells in the strip panel of FIG. 38 as selected via adjustment of the adjustable window.

FIG. 40 illustrates an example of a graphical user interface (GUI) 4000 that includes examples of logs and wells in a log panel that correspond to logs and wells in the strip panel of FIG. 38 as selected via adjustment of the adjustable window.

Figure 41:
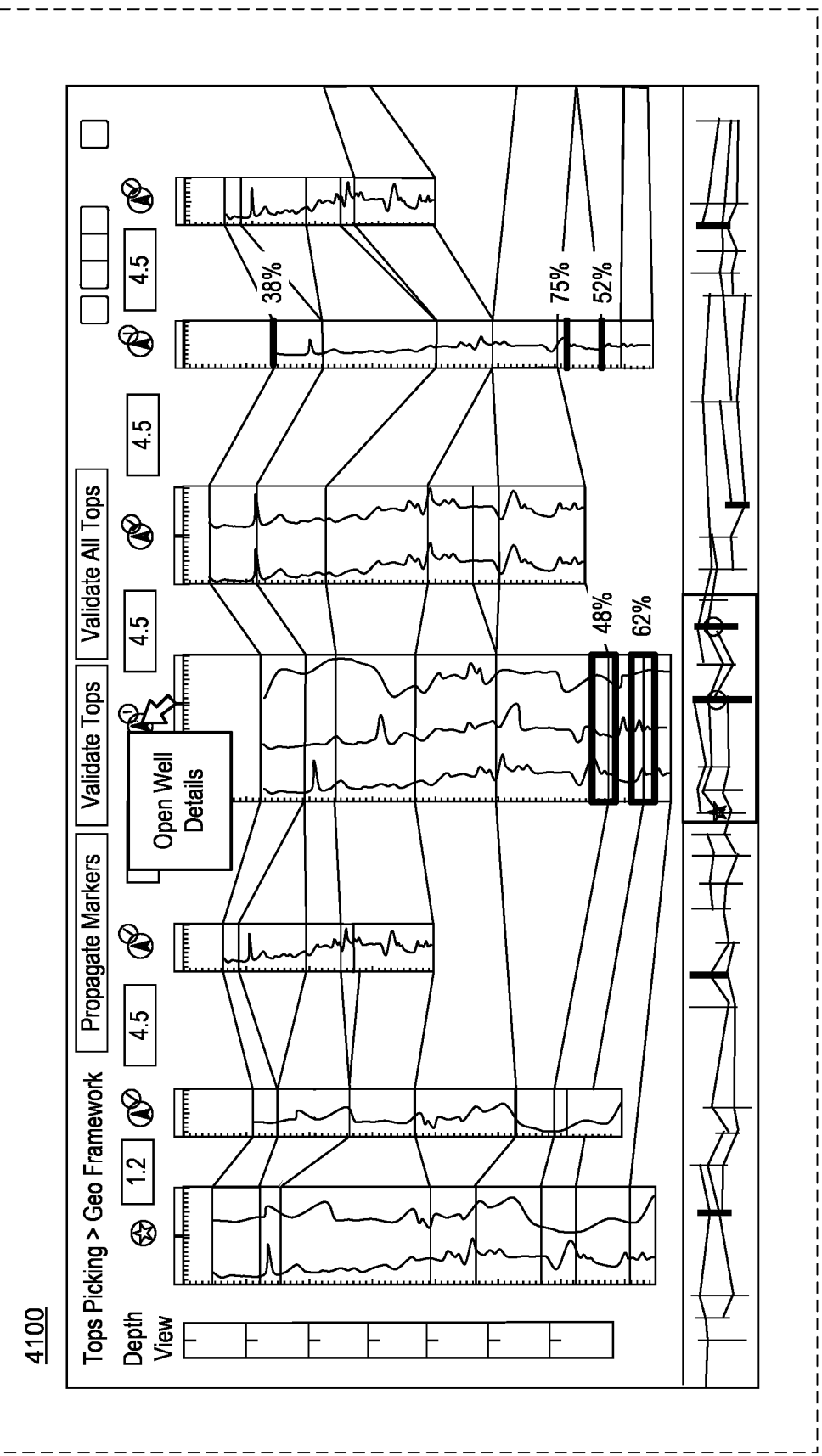
FIG. 41 illustrates an example of a graphical user interface (GUI) that includes examples of logs and wells and a graphical control for accessing details of a selected well.

FIG. 41 illustrates an example of a graphical user interface (GUI) 4100 that includes examples of logs and wells and a graphical control for accessing details of a selected well. For example, such a graphical control can include accessing details and rendering the details to the GUI 4100 and/or another GUI.

As an example, a map can include markers that change colors to represent confidence (e.g., consider red, yellow and green). And, as an example, a user may intervene during propagation. For example, if a user sees too many red and yellow confidence levels being rendered for wells, a graphical control of a user interface may be utilized to halt (e.g., pause) a propagation process. The user may then examine various wells and associated logs (see, e.g., one or more of FIGS. 18 to 41). A user may identify a problem with a particular log of a particular well and then rectify that problem (e.g., via an adjustment) and then recommence the propagation. For example, a particular branch may include a parent that causes children to be of lower confidence. A user may adjust one or more formation tops of that parent and cause an automated propagation routine to recommence with the adjusted one or more formation tops of the parent. A GUI may then render confidence levels to a display where the user can determine if the adjustment to the parent rectified the confidence problems with the children (e.g., child wells as shown in FIG. 10, etc.).

As an example, as to propagation, one or more approaches may be taken, which may be in 2D or 3D and may differ for each pick. Propagation may be via a line to another well or expanding surface or volume or other. While nearest and/or direct neighbor are mentioned, an approach may utilize one or more other criteria for expanding. For example, consider two leases that are adjacent and where a propagation workflow is to be limited to wells of one of the leases. In such an approach, a lease boundary may be a criterion for propagation. As an example, a natural boundary such as a river, a fault, etc., may be utilized as a boundary criterion (or criteria) for propagation.

As an example, as to parallel execution, a 1D log may have multiple picks that propagate in parallel and, for multiple wells, there may be multiple seeds that propagate in parallel. As mentioned, information generated during parallel execution can cross-inform, whether how to adjust one pick based on another pick and/or how to propagate from one seed based on how another seed is propagating (noting that one seed may be in one formation and the other seed in another formation where they should propagate to a common boundary at a common depth).

As an example, a computational framework may be suitable for use in analyzing data for a field with many wells and formations that have unknown boundaries. As an example, data can be 1 D data where a value is provided at a depth. As an example, data may be or include gamma ray data. As an example, an approach can be robust to differences in gamma ray data from tool to tool, noting that some scaling or other pre-processing may be employed.

As an example, a computational framework may include features that can provide feedback to a user such as a human user. For example, a system can tell a user that a pick was a poor one or that a pick was a good one. As an example, a user (e.g., a human user) may assign confidence to a pick and a system can give feedback to see if the user was accurate and/or the system may utilize the assigned confidence in making propagation decisions/boundary decisions/etc. In such an example, a GUI can include a field or other control tool that can facilitate assignment of a confidence (e.g., at the time of a pick, etc.).

As an example, a method can include, for a marker on a well log associated with a well, propagating the marker to a plurality of other well logs associated with respective wells. In such an example, propagating can include an adjustable depth search range. As an example, such an adjustable depth search range may be automatically adjustable. As an example, propagating can include computing a warp distance. In such an example, a method can include computing a confidence score based at least in part on the warp distance. As an example, propagating can include implementing a FastDTW algorithm that computes the warp distance. As an example, a warp distance can be a measure of a difference between data of two well logs.

As an example, well logs can include data acquired by at least one sensor operatively coupled to a downhole tool. Such data may be signal data and/or signal-data based output of a device (e.g., a scientific instrument, a sensor device, field equipment, etc.).

As an example, well logs can include data with respect to depth where, for example, depth is true vertical depth.

As an example, a method can include computing confidence scores for individual correlations between pairs of well logs. In such an example, the method can include identifying a lowest confidence score as associated with one of the wells and issuing a notification that identifies the one of the wells. In such an example, the method can include defining a marker on the well log for the one of the wells and for the marker on the well log associated with the well, propagating the marker to a plurality of other well logs associated with respective wells.

As an example, a method can include propagating that includes generating a minimum spanning tree (MST). In such an example, a marker can be a seed of the MST. As an example, a marker may be based on information received via a GUI that is rendered to a display operatively coupled to a computing device or system where, for example, interpretation of one or more well logs may be performed, optionally with input from a user that can utilize an input mechanism (e.g., a touchscreen, a voice command, a mouse, a stylus, etc.) to generate information (e.g., a pick, a marker, etc.) for a well log or well logs rendered to the display.

As an example, a method can include, for a plurality of markers on a well log associated with a well, propagating the plurality of markers to a plurality of other well logs associated with respective wells. In such an example, the plurality of markers may correspond to different types of well log measurements (e.g., different types of sensors, etc.). As an example, a plurality of markers can correspond to different true vertical depths of a well log.

As an example, a method can include, for a plurality of markers on a plurality of well logs associated with a plurality of wells, propagating the plurality of markers to a plurality of other well logs associated with respective wells.

As an example, a system can include a processor; memory operatively coupled to the processor; and processor-executable instructions stored in the memory to instruct the system to, for a marker on a well log associated with a well, propagate the marker to a plurality of other well logs associated with respective wells. In such an example, the system can include instructions to render a graphical user interface (GUI) to a display of the system where the GUI may include features to render one or more logs and, for example, to zoom-in, zoom-out, scroll through logs, etc., and to identify and mark one or more portions of a log (e.g., to pick a portion of a log). In such an example, a marked portion of a log may be utilized by the system to propagate and, for example, to output results of such propagation, which can provide for a better and/or more timely understanding of the Earth. As an example, the system may include an interface that can issue one or more signals to one or more pieces of equipment that can instruct the equipment to perform one or more actions as to a portion of the Earth as may be represented at least in part by one or more logs (e.g., as subjected to propagation, etc.).

As an example, one or more computer-readable storage media can include computer-executable instructions executable to instruct a computing system to, for a marker on a well log associated with a well, propagate the marker to a plurality of other well logs associated with respective wells.

Figure 42:
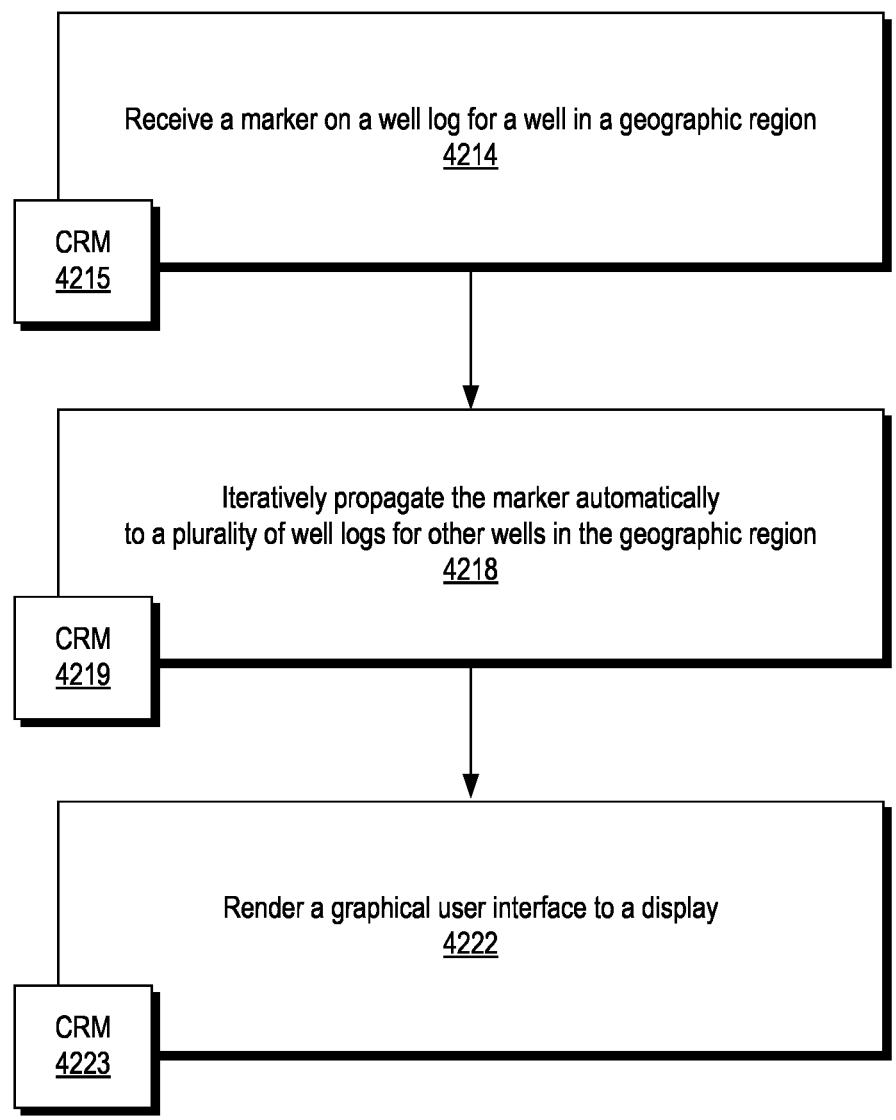
FIG. 42 illustrates an example of a method.

FIG. 42 shows an example of a method 4210 that includes a reception block 4214 for receiving a marker on a well log for a well in a geographic region; and a propagation block 4218 for iteratively propagating the marker automatically to a plurality of well logs for other wells in the geographic region. The method 4210 can also include a render block 4222 for rendering a graphical user interface to a display (see, e.g., FIGS. 5 to 41, etc.).

The method 4210 is shown in FIG. 42 in association with various computer-readable media (CRM) blocks 4215, 4219, and 4223. Such blocks generally include instructions suitable for execution by one or more processors (or cores) to instruct a computing device or system to perform one or more actions. While various blocks are shown, a single medium may be configured with instructions to allow for, at least in part, performance of various actions of the method 4210. As an example, a CRM block can be a computer-readable storage medium that is non-transitory, not a carrier wave and not a signal. As an example, such blocks can include instructions that can be stored in memory and can be executable by one or more of processors. As an example, blocks may be provided as one or more sets of instructions, such as the one or more sets of instructions 466 of the system 460 of FIG. 4.

As an example, a marker can be a formation top marker that marks a formation top of a formation in the geographic region where a well includes a wellbore that is defined at least part by a portion of the formation (e.g., a bore wall of the wellbore).

As an example, a method for propagating can include computing a warp distance. Such a method can include computing a confidence score based at least in part on the warp distance. As an example, a warp distance can be computed using a computational algorithm such as a dynamic time warping algorithm. Such computational algorithm can be applied, for example, in a spatial domain that can be a multidimensional spatial domain (e.g., 2D, 3D, etc.). For example, wellbores can be described using multidimensional coordinates in a 3D spatial domain that includes a depth dimension (e.g., a vertical depth dimension) where well log data can be along a depth dimension scale and where wellbores may be separated by one or more lateral dimensions. As an example, propagating can include implementing a fast dynamic time warping (FastDTW) computational algorithm using one or more processors to compute warp distance. As an example, warp can be a measure of a difference between data of two well logs.

As an example, a method can include propagating that includes adjusting an adjustable depth search range. For example, consider determining an upper depth search range limit and a lower depth search range limit using a depth of a propagated marker that is based on a received marker (e.g., a seed marker). Such a propagated marker may be directly or indirectly based on a received marker (e.g., depending on generational relationship). As an example, a method can include determining an upper depth search range limit by adding an upper limit parameter value to a depth of a propagated marker and determining a lower depth search range limit by subtracting a lower limit parameter value from the depth of the propagated marker. As an example, a method can include propagating a propagated marker that is based on a received marker to a feature of one of a plurality of well logs where the feature is at a depth within the adjustable depth search range.

As an example, well logs can include data (e.g., values) with respect to a vertical depth. For example, a well log can include data values organized with respect to vertical depth, which may be along a vertical depth scale. Such a scale can be a linear vertical depth scale. In such an example, an adjustable depth search range may move upwardly and/or downwardly as a marker is propagate. For example, where the marker is for a formation top, if the formation top descends from one well log to another well log, the adjustable depth search range can be adjusted to descend downwardly. For example, if a depth search range spans approximately 400 meters, for a well log X6, the range may be from 1200 meters to 1600 meters and, for another well log X7, the range may be from 1250 meters to 1650 meters. In such an example, the adjustable depth search range has been adjusted by 50 meters. As to propagated marker based adjustment, consider a marker in the well log X6 being at 1450 meters, which is 250 meters below 1200 meters and 150 meters above 1600 meters. As the marker is not centered at 1400 meters, the depth search range for the well log X7 can be adjusted downwardly such that it is centered at 1450 meters. If a marker can be identified in the well log X7, its depth can be utilized to make an adjustment in the adjustable search range for yet another well log (e.g., X8).

As an example, a method can include computing confidence scores for individual correlations between pairs of well logs. In such an example, a method can include identifying a lowest confidence score as associated with a well (e.g., a well log) and issuing a notification that identifies the well. For example, consider the GUI 2400 of FIG. 24, which includes visual indicia that indicates that one or more confidence scores may be low. As an example, a lowest confidence score may be identified such that a user can be notified of a worst case scenario that may be deserving of attention. As explained with respect to the GUIs 1400 and 1500, a method can include receiving an additional marker (e.g., an additional seed), which may be utilized to improve confidence for marker propagation (e.g., formation top identification) in a geographic region. As an example, a user may interact with a GUI to cause a system to receive an additional marker for a lowest confidence score well (e.g., well log). As an example, a method can optionally include identifying a lowest confidence score well (e.g., well log) and receiving an additional marker as a seed where the seed can be propagated to improve confidence within a geographic region.

As an example, a method can include propagating by generating a minimum spanning tree (MST). Such an approach can include receiving a marker of a well log of a well and using the marker as a seed to generate the MST where the MST includes other well (e.g., well logs) in a geographic region. As an example, a method can include receiving a seed and growing a MST in a geographic region where propagation is to be performed, for example, to identify depths of a top of a formation that spans at least a portion of the geographic region.

As an example, a method can include rendering a map to a display where the map includes graphical indicators for wells. In such an example, each of the graphical indicators can indicate a well location and a confidence metric for a propagated well log marker (e.g., optionally rendered in real-time during execution of a propagation method). As an example, a confidence metric can be a color, a blinking rate, a shading level, a number, etc.

As an example, a method can include rendering a graphical user interface to a display where the graphical user interface includes well logs that include markers that indicate formation tops. As an example, such a method can include, responsive to receipt of an instruction to render confidence metrics, rendering at least one confidence metric in association with at least one of the markers that indicates at least one of the formation tops.

As an example, a system can include a processor; memory operatively coupled to the processor; and processor-executable instructions stored in the memory to instruct the system to: receive a marker on a well log for a well in a geographic region; and iteratively propagate the marker automatically to a plurality of well logs for other wells in the geographic region.

As an example, one or more computer-readable storage media can include computer-executable instructions executable to instruct a computing system to: receive a marker on a well log for a well in a geographic region; and iteratively propagate the marker automatically to a plurality of well logs for other wells in the geographic region.

As an example, a workflow may be associated with various computer-readable medium (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium that is non-transitory, not a carrier wave and not a signal. As an example, blocks may be provided as one or more sets of instructions, for example, such as the one or more sets of instructions 466 of the system 460 of FIG. 4.

Figure 43:
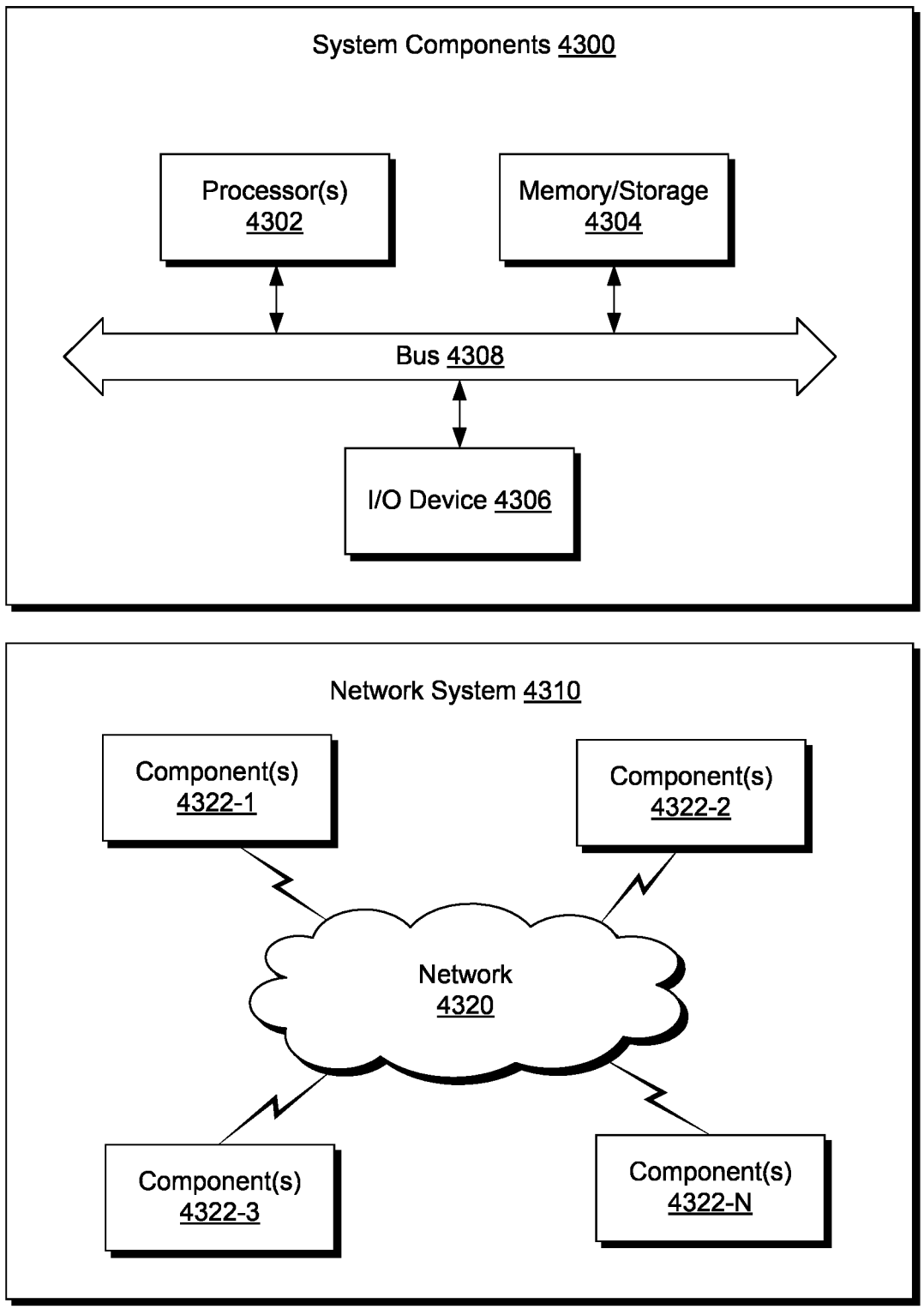
FIG. 43 illustrates example components of a system and a networked system.

FIG. 43 shows components of an example of a computing system 4300 and an example of a networked system 4310. The system 4300 includes one or more processors 4302, memory and/or storage components 4304, one or more input and/or output devices 4306 and a bus 4308. In an example embodiment, instructions may be stored in one or more computer-readable media (e.g., memory/storage components 4304). Such instructions may be read by one or more processors (e.g., the processor(s) 4302) via a communication bus (e.g., the bus 4308), which may be wired or wireless. The one or more processors may execute such instructions to implement (wholly or in part) one or more attributes (e.g., as part of a method). A user may view output from and interact with a process via an I/O device (e.g., the device 4306). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 4310. The network system 4310 includes components 4322-1, 4322-2, 4322-3, . . . 4322-N. For example, the components 4322-1 may include the processor(s) 4302 while the component(s) 4322-3 may include memory accessible by the processor(s) 4302. Further, the component(s) 4322-2 may include an I/O device for display and optionally interaction with a method. The network 4320 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method, comprising:
   identifying a first formation top in a first well log of a plurality of well logs for a plurality of wells in a geographic region;
   defining a first marker on the first well log based on the first formation top;
   iteratively propagating the first marker automatically to a second well log of the plurality of well logs;
   rendering a graphical user interface to a display, wherein the graphical user interface displays the second well log comprising a second marker that indicates a second formation top;
   determining a confidence score for the second well log based on the second marker;
   adjusting a visual indicator associated with the second marker based on the confidence score for the second well log; and
   responsive to the adjusting, rendering the visual indicator associated with the second marker based on the confidence score.

2. The method of claim 1, further comprising:
   determining one or more distances between the plurality of wells associated with the plurality of well logs; and
   rendering one or more distance indicators onto the graphical user interface based on the one or more distances.

3. The method of claim 1, wherein the visual indicator comprises a line thickness, a color, a blink effect, or a combination thereof.

4. The method of claim 1, further comprising:
   computing a warp distance associated with the plurality of wells; and
   iteratively propagating the first marker automatically to the second well log of the plurality of well logs based on the warp distance.

5. The method of claim 1, further comprising:
   determining whether a second well of the plurality of wells that is associated with the second well log includes an identified formation top; and
   iteratively propagating the first marker automatically to the second well log in response to determining the second well does not include the identified formation top.

6. The method of claim 1, further comprising:
  determining that the confidence score associated with the second well log is below a threshold; and
  iteratively propagating the second marker automatically to the second well log of the plurality of well logs in response to determining the confidence score is below the threshold.

7. The method of claim 1, wherein the plurality of well logs comprises data with respect to a vertical depth.

8. A system comprising:
  a processor;
  memory operatively coupled to the processor; and
  processor-executable instructions stored in the memory and executable by the processor to instruct the system to:
    identify a first formation top in a first well log of a plurality of well logs for a plurality of wells in a geographic region;
    define a first marker on the first well log based on the first formation top;
    iteratively propagate the first marker automatically to a second well log of the plurality of well logs;
    render a graphical user interface to a display, wherein the graphical user interface displays the second well log comprising a second marker that indicates a second formation top;
    determine a confidence score for the second well log based on the second marker;
    adjust a visual indicator associated with the second marker based on the confidence score for the second well log; and
    responsive to the adjustment, render the visual indicator associated with the second marker based on the confidence score.

9. The system of claim 8, wherein the second marker that indicates the second formation top comprises the first marker propagated to the second well log.

10. The system of claim 8, wherein the processor-executable instructions further instruct the system to:
  determine that the confidence score associated with the second well log is below a threshold; and
  iteratively propagate the second marker automatically to the second well log of the plurality of well logs if the confidence score is below the threshold.

11. The system of claim 8, wherein the processor-executable instructions further instruct the system to determine a warp distance corresponding to a difference between data of two well logs of the plurality of well logs.

12. The system of claim 11, wherein the processor-executable instructions further instruct the system to determine the confidence score based at least in part on the warp distance corresponding to the difference between the data of the two well logs of the plurality of well logs.

13. The system of claim 11, wherein the iteratively propagating comprises implementing a fast dynamic time warping (FastDTW) computational algorithm using the processor.

14. The system of claim 8, wherein the iteratively propagating comprises generating a minimum spanning tree (MST), wherein the first marker is a seed of the MST.

15. One or more non-transitory computer-readable storage media comprising computer-executable instructions configured thereupon that are executable to instruct a computing system to perform a method comprising:
  identifying a first formation top in a first well log of a plurality of well logs for a plurality of wells in a geographic region;
  defining a first marker on the first well log based on the first formation top;
  iteratively propagating the first marker automatically to a second well log of the plurality of well logs;
  rendering a graphical user interface to a display, wherein the graphical user interface displays the second well log comprising a second marker that indicates a second formation top;
  determining a confidence score for the second well log based on the second marker;
  adjusting a visual indicator associated with the second marker based on the confidence score for the second well log; and
  responsive to the adjusting, rendering the visual indicator associated with the second marker based on the confidence score.

16. The one or more non-transitory computer-readable storage media of claim 15, wherein the plurality of well logs comprises data with respect to a vertical depth.

17. The one or more non-transitory computer-readable storage media of claim 15, wherein the iteratively propagating comprises adjusting an adjustable depth search range or generating a minimum spanning tree (MST).

18. The one or more non-transitory computer-readable storage media of claim 15, wherein the iteratively propagating comprises determining an upper depth search range limit and a lower depth search range limit using a depth corresponding to the first marker.

19. The one or more non-transitory computer-readable storage media of claim 15, further comprising:
  determining that the confidence score associated with the second well log is below a threshold; and
  iteratively propagating the second marker automatically to the second well log of the plurality of well logs in response to determining the confidence score is below the threshold.

* * * * *